United States Patent
Ito et al.

(10) Patent No.: US 11,937,079 B2
(45) Date of Patent: Mar. 19, 2024

(54) COMMUNICATION TERMINAL, CORE NETWORK DEVICE, CORE NETWORK NODE, NETWORK NODE, AND KEY DERIVING METHOD

(71) Applicant: NEC Corporation, Tokyo (JP)

(72) Inventors: Hironori Ito, Tokyo (JP); Sivakamy Lakshminarayanan, Chennai (IN); Anand Raghawa Prasad, Tokyo (JP); Sivabalan Arumugam, Chennai (IN); Sheeba Backia Mary Baskaran, Chennai (IN)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/650,997

(22) PCT Filed: Sep. 27, 2018

(86) PCT No.: PCT/JP2018/036074
§ 371 (c)(1),
(2) Date: Mar. 26, 2020

(87) PCT Pub. No.: WO2019/065897
PCT Pub. Date: Apr. 4, 2019

(65) Prior Publication Data
US 2020/0280849 A1    Sep. 3, 2020

(30) Foreign Application Priority Data
Sep. 27, 2017 (IN) .............................. 201711034337

(51) Int. Cl.
*H04W 12/041*    (2021.01)
*H04L 9/40*    (2022.01)
*H04W 12/06*    (2021.01)

(52) U.S. Cl.
CPC ........... *H04W 12/041* (2021.01); *H04L 63/18* (2013.01); *H04W 12/06* (2013.01)

(58) Field of Classification Search
CPC . H04W 12/06; H04W 12/041; H04W 12/047; H04L 63/18; H04L 63/0892; H04L 9/0861
See application file for complete search history.

(56) References Cited

U.S. PATENT DOCUMENTS 9,686,675 B2 * 6/2017 Ketheesan ............ H04W 12/06
9,942,938 B2 * 4/2018 Pragada ................ H04W 76/14
(Continued)

FOREIGN PATENT DOCUMENTS

CN    104871595 A    8/2015
CN    106465106 A    2/2017
(Continued)

OTHER PUBLICATIONS

Faccin et al. "Mechanisms for establishing user plane connectivity for Non-3GPP Access"; U.S. Appl. No. 62/476,429, filed Mar. 24, 2017. (Year: 2017).*

(Continued)

*Primary Examiner* — Kari L Schmidt
(74) *Attorney, Agent, or Firm* — Sughrue Mion, PLLC

(57) ABSTRACT

A communication terminal capable of preventing a reduction in security level that is caused at the time of establishing multiple connections via 3GPP Access and Non-3GPP Access. A communication terminal according to the present disclosure includes: a communication unit configured to communicate with gateway devices disposed in a preceding stage of a core network device via an Untrusted Non-3GPP Access; and a key derivation unit configured to derive a second security key used for security processing of a message transmitted using a defined protocol with the gateway (Continued)

device, from a first security key used for security processing of a message transmitted using a defined protocol with the core network device.

4 Claims, 62 Drawing Sheets

(56) References Cited

U.S. PATENT DOCUMENTS

| | | | |
|---|---|---|---|
| 2009/0043901 A1 | 2/2009 | Mizikovsky et al. | |
| 2010/0054472 A1* | 3/2010 | Barany | H04L 63/123 713/168 |
| 2010/0111308 A1 | 5/2010 | Forsberg et al. | |
| 2011/0002465 A1* | 1/2011 | Ahn | H04L 9/0844 380/272 |
| 2011/0142239 A1* | 6/2011 | Suh | H04W 12/041 380/270 |
| 2013/0044709 A1* | 2/2013 | Adjakple | H04W 76/15 370/329 |
| 2014/0241317 A1* | 8/2014 | Jamadagni | H04W 76/15 370/329 |
| 2015/0092942 A1 | 4/2015 | Wager et al. | |
| 2015/0334597 A1 | 11/2015 | Peisa et al. | |
| 2017/0006469 A1* | 1/2017 | Palanigounder | H04L 9/0891 |
| 2017/0289019 A1* | 10/2017 | Faccin | H04L 61/2007 |
| 2017/0303259 A1* | 10/2017 | Lee | H04W 28/16 |
| 2018/0062847 A1* | 3/2018 | Mildh | H04W 12/033 |
| 2018/0084414 A1* | 3/2018 | Lee | H04W 12/0433 |
| 2018/0184297 A1* | 6/2018 | Mohamed | H04W 12/04 |
| 2018/0220364 A1 | 8/2018 | Li et al. | |
| 2018/0279400 A1* | 9/2018 | Faccin | H04W 76/18 |
| 2018/0343249 A1* | 11/2018 | Hahn | H04L 63/0869 |
| 2019/0253888 A1* | 8/2019 | Jerichow | H04W 12/04 |
| 2019/0274038 A1* | 9/2019 | Wu | H04W 36/0033 |
| 2019/0387401 A1* | 12/2019 | Liao | H04W 12/082 |
| 2019/0394833 A1* | 12/2019 | Talebi Fard | H04W 68/005 |
| 2020/0059783 A1* | 2/2020 | Wifvesson | H04W 8/08 |
| 2020/0092710 A1* | 3/2020 | Kim | H04W 8/06 |
| 2020/0178076 A1* | 6/2020 | Ben Henda | H04L 63/12 |
| 2020/0228987 A1* | 7/2020 | Ben Henda | H04W 12/10 |
| 2021/0076238 A1* | 3/2021 | Zhou | H04W 28/0268 |
| 2021/0168601 A1* | 6/2021 | Ben Henda | H04W 12/037 |
| 2021/0235268 A1* | 7/2021 | Wu | H04W 12/03 |

FOREIGN PATENT DOCUMENTS

| | | | |
|---|---|---|---|
| JP | 2010-536241 A | 11/2010 | |
| JP | 2017-063422 A | 3/2017 | |
| WO | 2016/160256 A1 | 10/2016 | |
| WO | 2017/049461 A1 | 3/2017 | |
| WO | WO-2019020161 A1 * | 1/2019 | H04W 12/106 |
| WO | WO-2019020193 A1 * | 1/2019 | H04L 63/0869 |

OTHER PUBLICATIONS

Jyrki T. J. Penttinen, "Security Aspects of Telecommunications: 3GPP Mobile Networks," in The Telecommunications Handbook: Engineering Guidelines for Fixed, Mobile and Satellite Systems , Wiley, 2013, pp. 641-668. (Year: 2013).*
Oscar Lasierra, et al. European 5G Security in the Wild: Reality versus Expectations. In Proceedings of the 16th ACM Conference on Security and Privacy in Wireless and Mobile Networks (WiSec '23). Association for Computing Machinery, New York, NY, USA, 13-18. (Year: 2023).*
X. Zhang, A. Kunz and S. Schröder, "Overview of 5G security in 3GPP," 2017 IEEE Conference on Standards for Communications and Networking (CSCN), Helsinki, Finland, 2017, pp. 181-186. (Year: 2017).*
"3rd Generation Partnership Project; Technical Specification Group Services and System Aspects; Study on Architecture for Next Generation System (Release 14)", 3GPP TR 23.799 v2.0.0, Nov. 2016, pp. 1-523.
"3rd Generation Partnership Project; Technical Specification Group Services and System Aspects; Study on the security aspects of the next generation system (Release 14)", 3GPP TR 33.899 V1.2.0, Jun. 2017, 586 pages.
"PCR to TR 33.899: Consolidated Key Hierarchy for NextGen networks", NEC, 3GPP TSG SA WG3 (Security) Meeting #86, S3-170386 rev of S3-170163, Feb. 6-10, 2017, 4 pages, Sophia Antipolis (France).
"Interim Agreement on inputs for key derivation", NEC, 3GPP TSG SA WG3 (Security) Meeting #88, S3-172047 revision of S3-17xabc, Aug. 7-11, 2017, 2 pages, Dalli, China.
International Search Report for PCT/JP2018/036074 dated Dec. 25, 2018 (PCT/ISA/210).
Indian Office Action for IN Application No. 202017017663 dated Jun. 30, 2021.
Extended European Search Report for EP Application No. EP18862007.4 dated Apr. 30, 2021.
Ericsson, "New solution for the protection of multiple NAS connections (KI #1.7)", 3GPP Draft, S3-171594, 3GPP TSG SA WG3 (Security) Meeting #87, May 15-19, 2017, Slovenia.
Chinese Office Action for CN Application No. 201880076438.4 dated Sep. 5, 2022 with English Translation.
Ericsson, "Discussion on security for multiple NAS connections (KI #1.7)", 3GPP TSG SA WG3 (Security) Meeting #87, S3-171274, May 9, 2017.
CN Office Communication for CN Application No. 201880076438.4, dated Apr. 27, 2023 with English Translation.

* cited by examiner

COMMUNICATION TERMINAL, CORE NETWORK DEVICE, CORE NETWORK NODE, NETWORK NODE, AND KEY DERIVING METHOD

CROSS REFERENCE TO RELATED APPLICATIONS

This application is a National Stage of International Application No. PCT/JP2018/036074 filed Sep. 27, 2018, claiming priority based on Indian Patent Application No. 201711034337 filed Sep. 27, 2017, the disclosure of which is incorporated herein in its entirety by reference.

TECHNICAL FIELD

The present disclosure relates to a communication terminal, a core network device, a core network node, a network node, and a key deriving method.

BACKGROUND ART

In 3GPP (3rd Generation Partnership Project), specifications of a communication system called 5G (hereinafter, referred to as 5GS (5G System)) have been considered. The 5GS includes 3GPP Access and Non-3GPP Access as an access network. In addition, the Non-3GPP Access includes Trusted Non-3GPP Access and Untrusted Non-3GPP Access. The 3GPP Access is a network including devices in which functions or specifications are specified in 3GPP. The Non-3GPP Access is a network including devices in which functions or specifications are not specified in 3GPP. The Trusted Non-3GPP Access is a network that is recognized as a reliable access network by communication common carriers. The Untrusted Non-3GPP Access is a network that is not recognized as a reliable access network by communication common carriers.

Handover processing between 3GPP Access and Non-3GPP Access is disclosed in Non Patent Literature 1.

CITATION LIST

Non Patent Literature

Non Patent Literature 1: 3GPP TR 23.799 V2.0.0 (2016-11)

SUMMARY OF INVENTION

Technical Problem

Non Patent Literature 1 discloses the handover processing between 3GPP Access and Non-3GPP Access, but does not disclose a security mechanism when a UE of a communication terminal establishes multiple connections via 3GPP Access and Non-3GPP Access. Therefore, there is a problem that a security level is reduced in the multiple connections using 3GPP Access and Non-3GPP Access.

In consideration of the above problem, an object of the present disclosure is to provide a communication terminal, a core network device, and a key deriving method capable of preventing a reduction in security level that is caused at the time of establishing multiple connections via 3GPP Access and Non-3GPP Access.

Solution to Problem

A communication terminal according to a first aspect of the present disclosure includes: a communication unit configured to communicate with gateway devices disposed in a preceding stage of a core network device via an Untrusted Non-3GPP Access; and a key derivation unit configured to derive a second security key used for security processing of a message transmitted using a defined protocol with the gateway device, from a first security key used for security processing of a message transmitted using a defined protocol with the core network.

A core network device according to a second aspect of the present disclosure includes: a communication unit configured to communicate with a communication terminal via gateway devices disposed in a preceding stage of a core network device and an Untrusted Non-3GPP Access; and a key derivation unit configured to derive a second security key used for security processing of a message transmitted using a protocol defined between the communication terminal and the gateway device, from a first security key used for security processing of a message transmitted using a defined protocol with the communication terminal.

A key deriving method according to a third aspect of the present disclosure includes: communicating with gateway devices disposed in a preceding stage of a core network device via an Untrusted Non-3GPP Access; and deriving a second security key used for security processing of a message transmitted using a defined protocol with the gateway device, from a first security key used for security processing of a message transmitted using a defined protocol with the core network.

Advantageous Effects of Invention

According to the present disclosure, it is possible to provide a communication terminal, a core network device, a core network node, a network node, and a key deriving method capable of preventing a reduction in security level that is caused at the time of establishing multiple connections via 3GPP Access and Non-3GPP Access.

DESCRIPTION OF EMBODIMENTS (First Example Embodiment)

Figure 1:
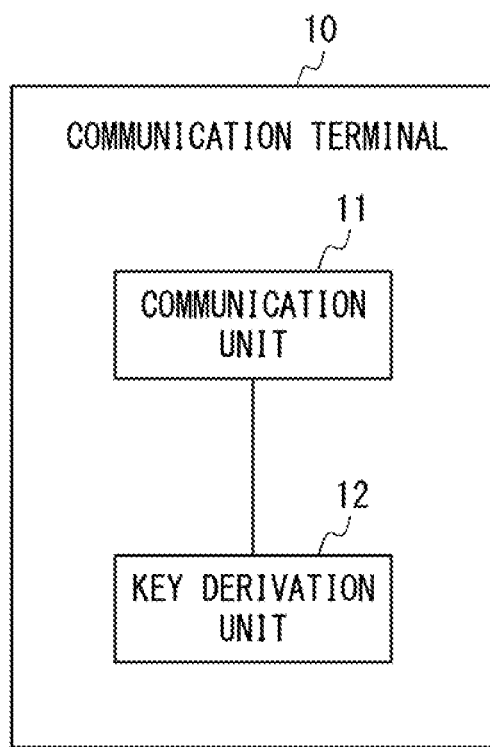
FIG. 1 is a configuration diagram of a communication terminal according to a first example embodiment.

Embodiments of the present disclosure will be described below with reference to the drawings. First, a configuration example of a communication terminal 10 according to a first example embodiment will be described with reference to FIG. 1. The communication terminal 10 may be a computer device that operates by a processor executing a program stored in a memory. The communication terminal 10 may be a mobile phone terminal, a smartphone terminal, or a tablet terminal. Alternatively, the communication terminal 10 may be an IoT (Internet Of Things) terminal or an MTC (Machine Type Communication) terminal. Alternatively, the communication terminal 10 may be a UE (User Equipment) used as a general term for communication terminals in 3GPP.

The communication terminal 10 includes a communication unit 11 and a key derivation unit 12. The communication unit 11 and the key derivation unit 12 may be software or modules in which processing is executed by a processor executing a program stored in a memory. Alternatively, the communication unit 11 and the key derivation unit 12 may be hardware such as a circuit or a chip.

The communication unit 11 communicates with a gateway device, which is disposed in a preceding stage of a core network device 20, via an Untrusted Non-3GPP Access. The core network device 20 is a device disposed in a core network. The gateway device is a device that is disposed in the core network and includes an instance, an interface, or a reference point between the gateway device and the Untrusted Non-3GPP Access. The communication unit 11 can also communicate with the core network device 20 via a 3GPP Access.

The key derivation unit 12 derives a security key for gateway device used for security processing of a message transmitted using a defined protocol with the gateway device. The key derivation unit 12 derives a security key for gateway device from a security key for core network device used for security processing of a message transmitted using a defined protocol with the core network device.

Figure 2:
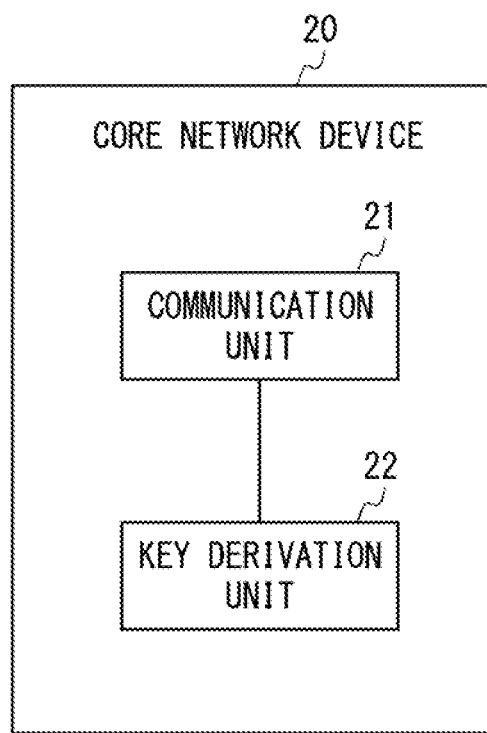
FIG. 2 is a configuration diagram of a core network device according to a first example embodiment.

Subsequently, a configuration example of the core network device 20 according to the first example embodiment will be described with reference to FIG. 2. The core network device 20 may be a computer device that operates by a processor executing a program stored in a memory. The core network device 20 may be a server device, for example.

The core network device 20 includes a communication unit 21 and a key derivation unit 22. The communication unit 21 and the key derivation unit 22 may be software or modules in which processing is executed by a processor executing a program stored in a memory. Alternatively, the communication unit 21 and the key derivation unit 22 may be hardware such as a circuit or a chip.

The communication unit 21 communicates with the communication terminal 10 via the gateway device and the Untrusted Non-3GPP Access. Since the key derivation unit 22 is the same as the key derivation unit 12, a detailed description thereof will not be presented.

As described above, when communicating with each other via the Untrusted Non-3GPP Access, the communication terminal 10 and the core network device 20 according to the first example embodiment can derive the security key for gateway device. Specifically, the communication terminal 10 and the core network device 20 can derive the security key for gateway device using the security key for core network device. Thus, the security key for gateway device can be applied to the message transmitted in the Untrusted Non-3GPP Access. As a result, a reduction in security level can be prevented even when multiple connections including the Untrusted Non-3GPP Access are established.

(Second Example Embodiment)

Figure 3:
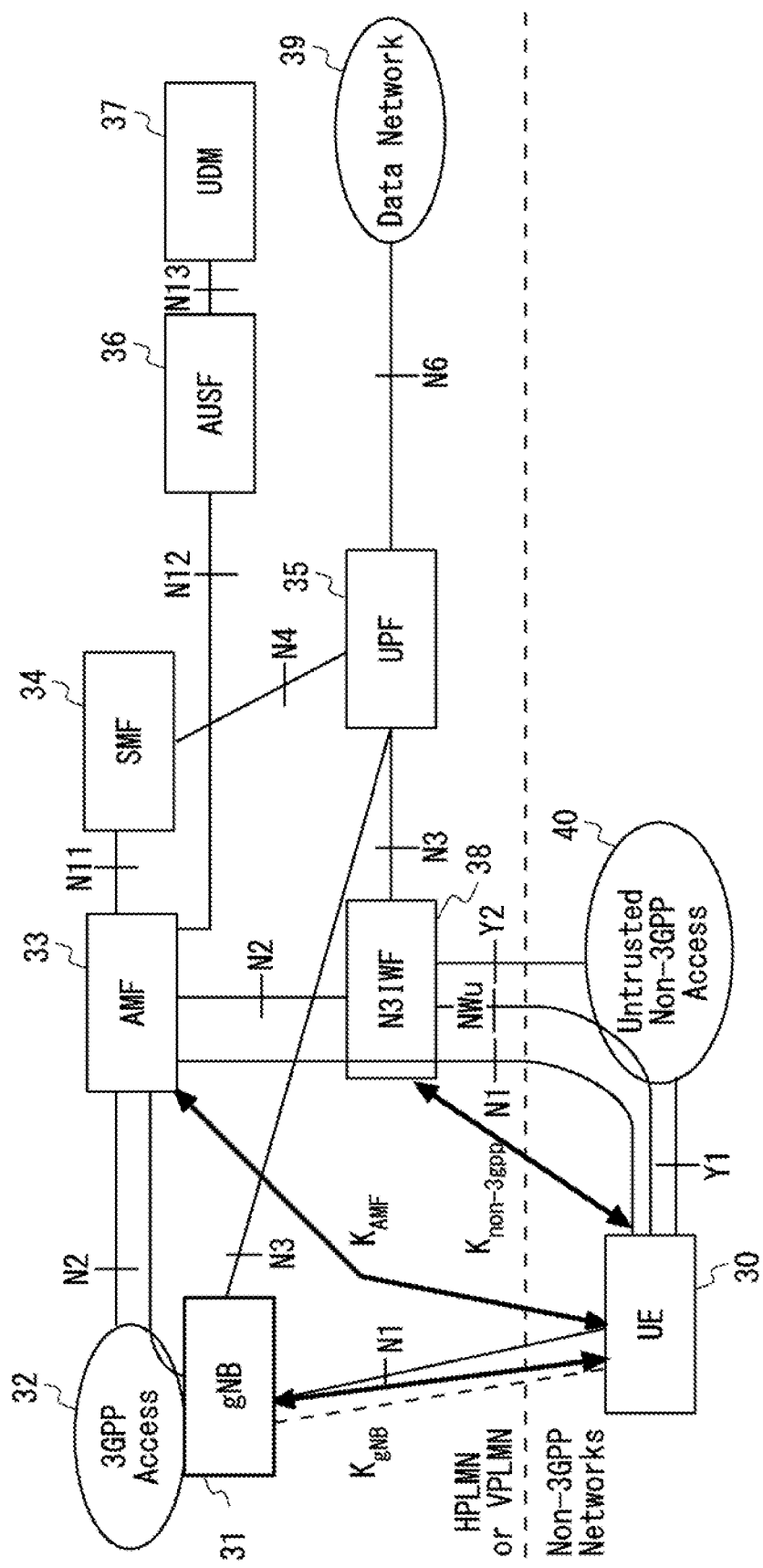
FIG. 3 is a configuration diagram of a communication system according to a second example embodiment.

Subsequently, a configuration example of a communication system according to a second example embodiment will be described with reference to FIG. 3. FIG. 3 shows that the communication system includes an HPLMN (Home Public Land Mobile Network) or a VPLMN (Visited Public Land Mobile Network) and a Non-3GPP network. A UE 30 can communicate with an AMF 33 of the HPLMN or the VPLMN via both the HPLMN or the VPLMN and the Non-3GPP Access.

The HPLMN or the VPLMN includes a 3GPP Access 32, an AMF (Access and Mobility management Function) entity 33 (hereinafter, referred to as an AMF 33), an SMF (Session Management Function) entity 34 (hereinafter, referred to as an SMF 34), a UPF (User Plane Function) entity 35 (hereinafter, referred to as a UPF 35), an AUSF (Authentication Server Function) entity 36 (hereinafter, referred to as an AUSF 36), a UDM (Unified Data Management) entity 37 (hereinafter, referred to as a UDM 37), an N3IWF (Non-3GPP Inter Working Function) entity 38 (hereinafter, referred to as an N3IWF 38), and a Data Network 39.

In the 3GPP Access 32, a gNB (g Node B) 31 is disposed. The gNB 31 is equivalent to a base station.

The AMF 33, the SMF 34, the UPF 35, the AUSF 36, the UDM 37, and the N3IWF 38 constitute a core network. The core network constituted by the AMF 33, the SMF 34, the UPF 35, the AUSF 36, the UDM 37, and the N3IWF 38 may be referred to as, for example, 5GC (5G Core).

The AMF 33 performs mobility management related to the UE 30. Further, the AMF 33 performs authentication processing related to the UE 30 in cooperation with the AUSF 36 and the UDM 37. The SMF 34 performs session management related to the UE 30. The UPF 35 relays U (User)-Plane data transmitted between the UE 30 and the Data Network 39. The U-Plane data may be referred to as user data.

The N3IWF 38 communicates with the UE 30 via the Untrusted Non-3GPP Access 40. The N3IWF 38 connects different networks to each other and relays control data or C (Control)-Plane data related to the UE 30 transmitted between the UE 30 and the AMF 33. The different networks may be, for example, a HPLM and a Non-3GPP Network, or a VPLMN and a Non-3GPP Network.

An N1 interface is defined between the UE 30 and the AMF 33. An N2interface is defined between the 3GPP Access 32 and the AMF 33. An N2interface is also defined between the AMF 33 and the N3IWF 38. An N3interface is defined between the N3IWF 38 and the UPF 35. An N3interface is also defined between the gNB 31 and the UPF 35. An N4interface is defined between the SMF 34 and the UPF 35. An N6interface is defined between the UPF 35 and the Data Network 39. An N11 interface is defined between the AMF 33 and the SMF 34. An N12 interface is defined between the AMF 33 and the AUSF 36. An N13 interface is defined between the AUSF 36 and the UDM 37. An Y1 interface is defined between the UE 30 and the Untrusted Non-3GPP Access 40. An NWu interface is defined between the UE 30 and the N3IWF 38. The term "interface" may be paraphrased as an instance or a reference point.

A security key KgNB is used for security processing related to a message transmitted between the UE 30 and the gNB 31. A security key Knon-3gpp is used for security processing related to a message transmitted between the UE 30 and the N3IWF 38. A security key KAMF is used for security processing related to a message transmitted between the UE 30 and the AMF 33.

Figure 4:
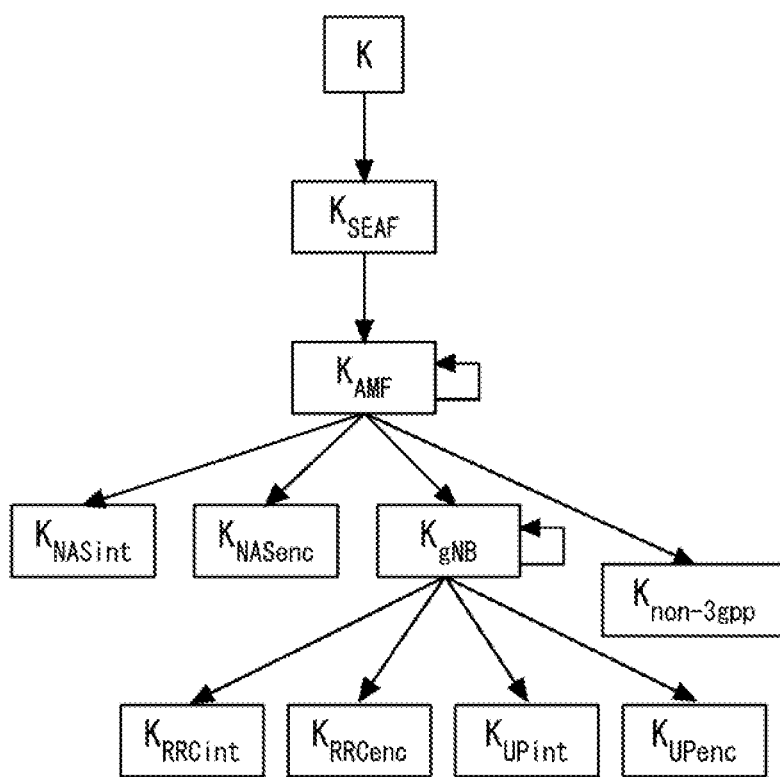
FIG. 4 is a diagram showing a Key hierarchy according to the second example embodiment.

Subsequently, a Key hierarchy according to the second example embodiment will be described with reference to FIG. 4. The Key hierarchy shown in FIG. 4 is applied to a multiple NAS (Non-Access Stratum) that enables the UE 30 to communicate with the AMF 33 via a plurality of access networks. In addition, the Key hierarchy shown in FIG. 4 indicates a security key generated in the UE 30 and the 5GC.

The security key KSEAF is derived from a security key K that is mutually authenticated between the UE 30 and the AUSF 36. The security key K may be referred to as a long-term key. The security key KSEAF is transmitted to the AMF 33. The security key KAMF is derived from the security key KSEAF. A security key KNASint used for integrity protection and a security key KNASenc used for encryption are derived from the security key KAMF. The security key KNASint and the security key KNASenc may be referred to as a NAS security key.

The security key KgNB is derived from the security key KAMF. A security key KRRCint, a security key KRRCenc, a security key KUPint, and a security key KUPenc are derived from the security key KgNB. The security key KRRCint and the security key KRRCenc are used to protect an RRC message transmitted between the UE 30 and the 3GPP Access 32. The security key KUPint and the security key KUPenc are used to protect U-Plane data transmitted between the UE 30 and the 3GPP Access 32.

The security key Knon-3gpp is derived from the security key KAMF. The security key Knon-3gpp is used to protect a message transmitted between the UE 30 and the N3IWF 38. The security key KAMF and the KgNB may be updated at handover. In addition, the security key Knon-3gpp may be derived from the security key KSEAF.

A Key hierarchy different from that shown in FIG. 4 will be described below with reference to FIG. 5. The Key hierarchy shown in FIG. 5 differs from the Key hierarchy shown in FIG. 4 in that a security key KNAS_N3Gint and a KNAS_N3Genc are derived from the security key KAMF.

In an existing network such as LTE (Long Term Evolution), only one NAS connection is established between the UE 30 and the core network. On the other hand, in 5 G, multiple connections are established between the UE 30 and 5GC. Specifically, the AMF 33 establishes NAS connections independently of the UE 30 performing communication via the 3GPP Access 32 and the UE 30 performing communication via the Untrusted Non-3GPP Access 40.

In the Key hierarchy of FIG. 4, the same NAS security key is used in both the NAS connection established via the 3GPP Access 32 and the NAS connection established via the Untrusted Non-3GPP Access 40.

Figure 5:
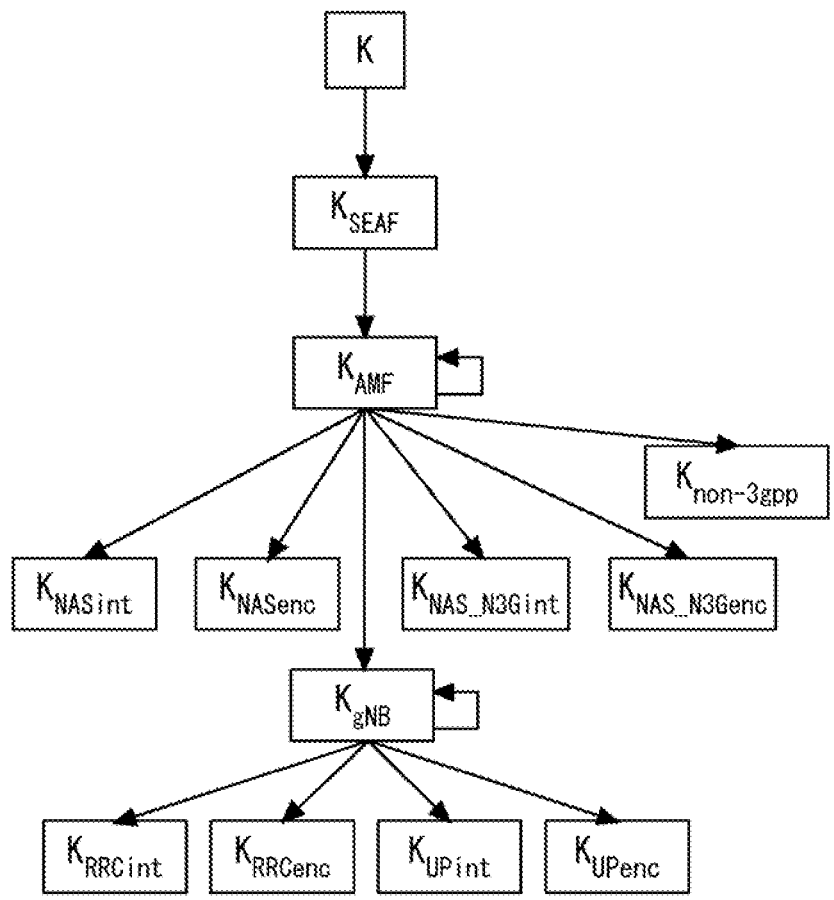
FIG. 5 is a diagram showing a Key hierarchy according to the second example embodiment.

On the other hand, in the Key hierarchy of FIG. 5, a security key KNAS_N3Gint and a KNAS_N3Genc are derived. Therefore, the NAS security key used in the NAS connection established via the 3GPP Access 32 is different from the NAS security key used in the NAS connection established via the Untrusted Non-3GPP Access 40.

Figure 6:
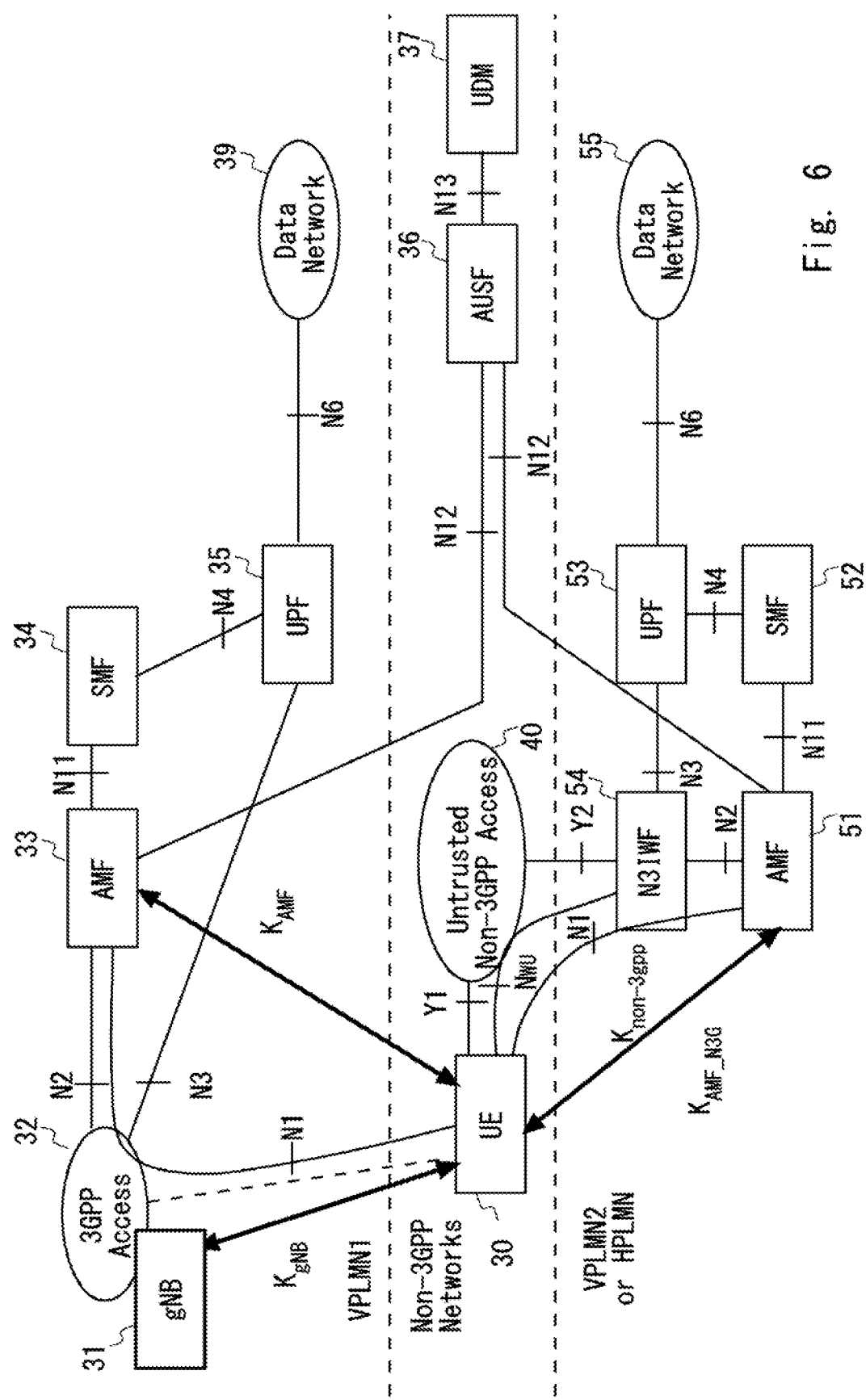
FIG. 6 is a configuration diagram of a communication system according to the second example embodiment.

Next, a configuration example of a communication system different from that in FIG. 3 will be described with reference to FIG. 6. FIG. 6 shows that the UE 30 has established multiple connections between VPLMN1 and VPLMN2 or HPLMN. The VPLMN1 includes a gNB 31, a 3GPP Access 32, an AMF 33, an SMF 34, a UPF 35, and a Data Network 39. The VPLMN2 includes an AMF 51, an SMF 52, a UPF 53, an N3IWF 54, and a Data Network 55. Further, an AUSF 36 and a UDM 37 may be included in the HPLMN.

FIG. 6 shows that the AMF 33 establishing the NAS connection via the 3GPP Access 32 with the UE 30 is different from the AMF 51 establishing the NAS connection via the Untrusted Non-3GPP Access 40 with the UE 30.

Figure 7:
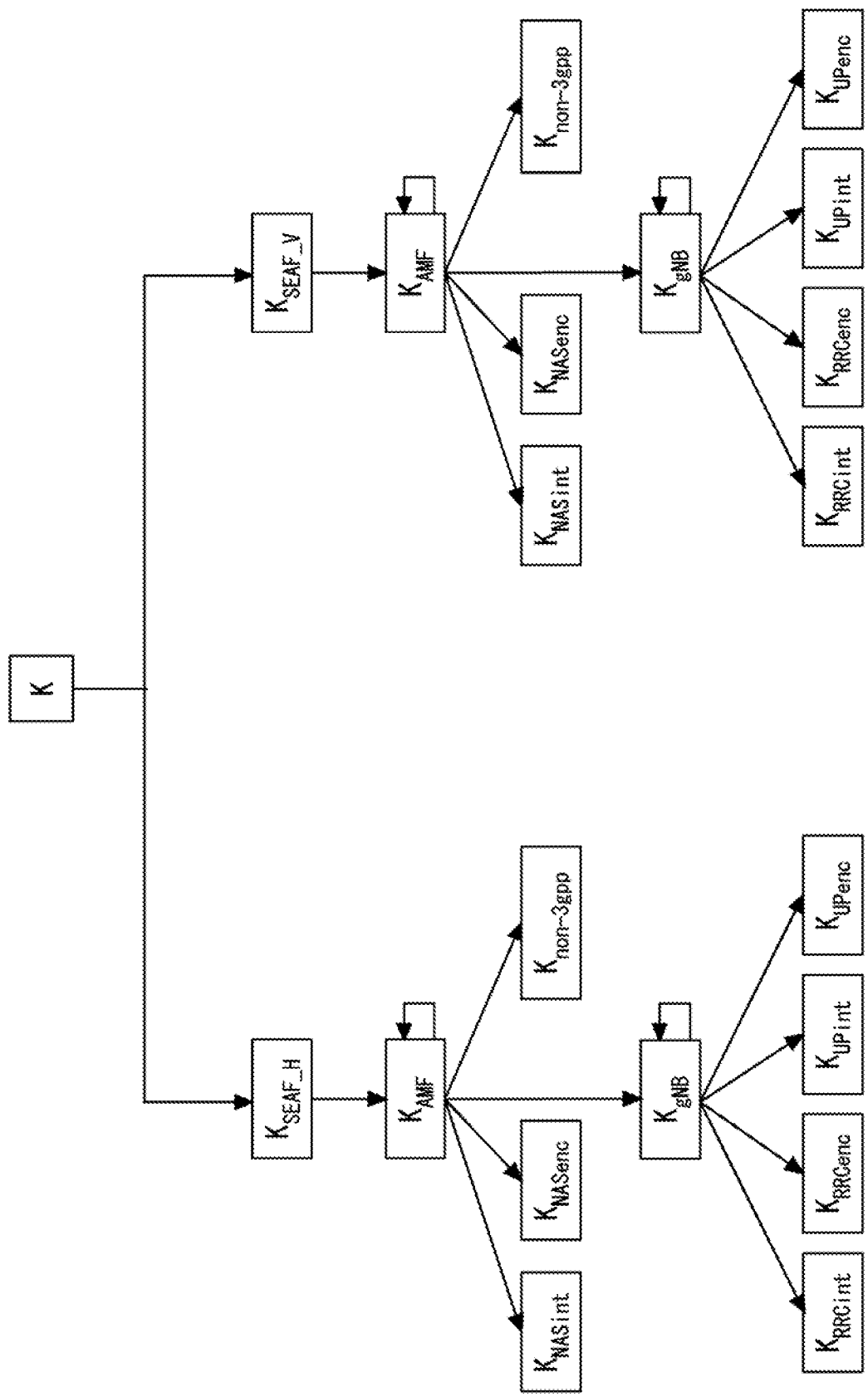
FIG. 7 is a diagram showing a Key hierarchy according to the second example embodiment.

A Key hierarchy applied in the communication system of FIG. 6 will be described below with reference to FIG. 7. FIG. 7 is based on the premise that the UE 30 establishes a NAS connection with the AMF 51 disposed in the HPLMN via the Untrusted Non-3GPP Access 40 in the communication system of FIG. 6.

A security key KSEAF_H and a security key KSEAF_V are derived from the security key K. The security key KSEAF_H is transmitted to the AMF 51. The security key KSEAF_V is transmitted to the AMF 33. The security keys derived respectively from the security key KSEAF_H and the security key KSEAF_V are the same as those in FIG. 4, and thus the detailed description thereof will not be presented.

Figure 8:
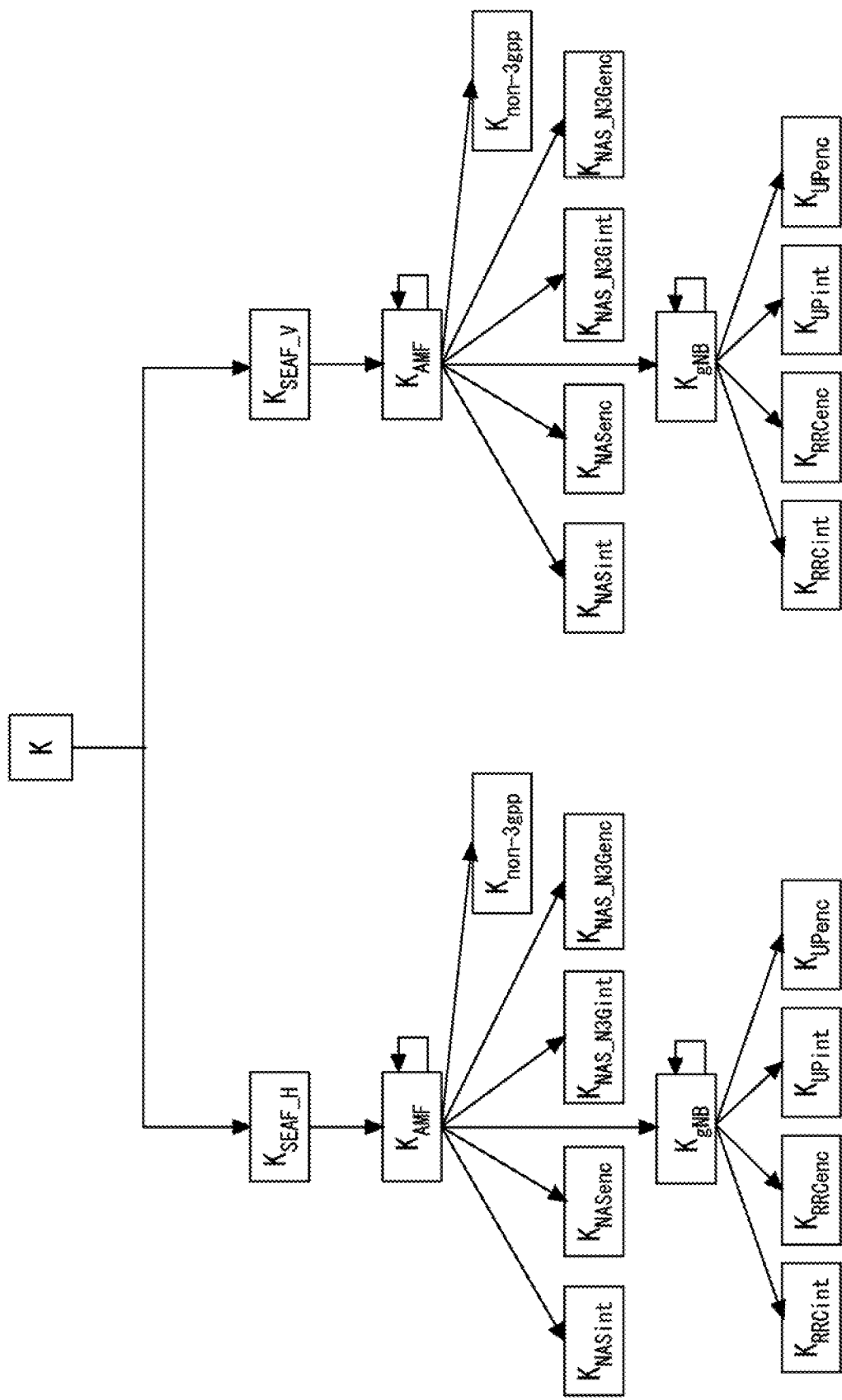
FIG. 8 is a diagram showing a Key hierarchy according to the second example embodiment.

FIG. 8 shows a Key hierarchy applied in the communication system of FIG. 6, and shows the Key hierarchy different from that of FIG. 7. The Key hierarchy of FIG. 8 differs from the Key hierarchy of FIG. 7 in that the security keys derived respectively from the security key KSEAF_H and the security key KSEAF_V are the same as those in FIG. 5.

Figure 9:
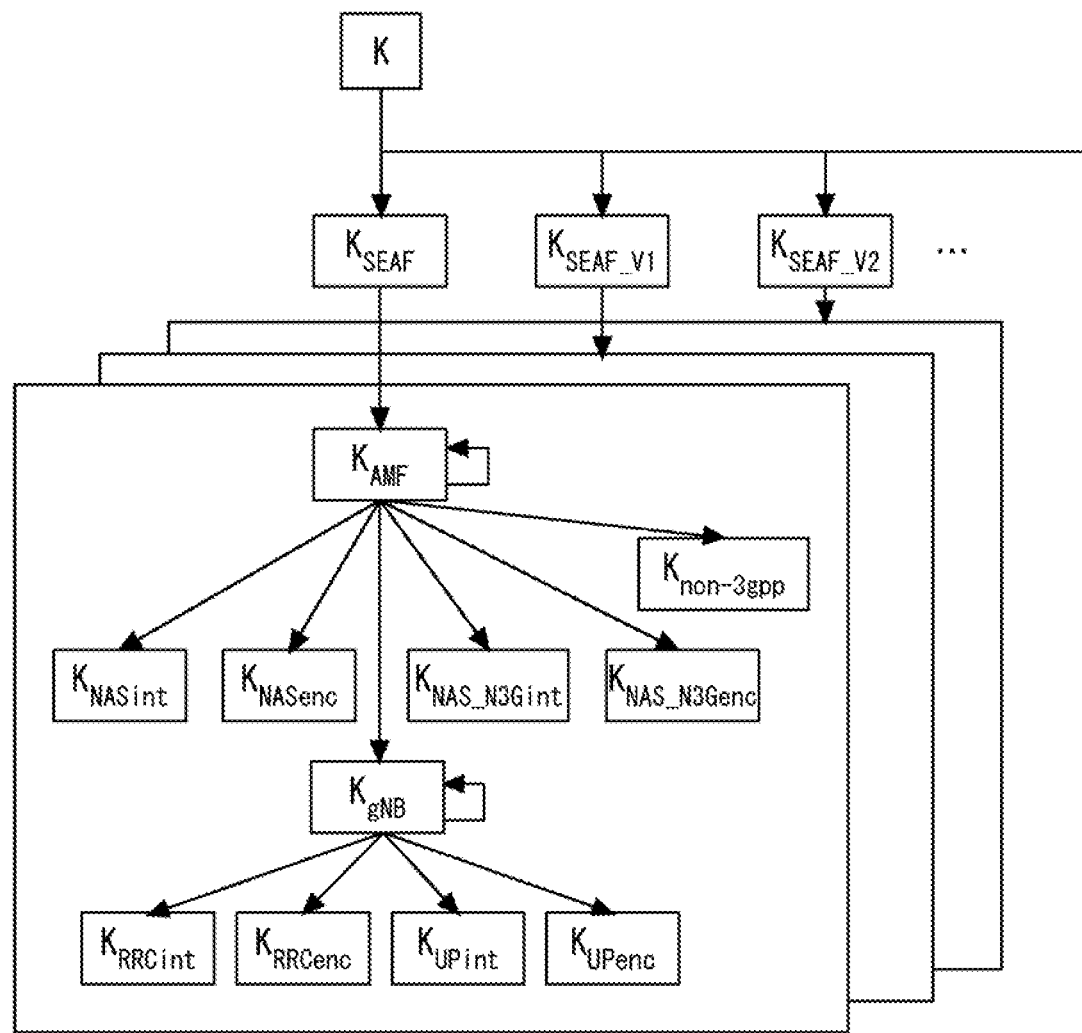
FIG. 9 is a diagram showing a Key hierarchy according to the second example embodiment.

In addition, FIG. 9 shows a Key hierarchy when there are a plurality of VPLMNs in which a UE 30 establishes multiple connections. Security keys derived after security keys KSEAF_V1 and KSEAF_V2 are the same as those in FIG. 5, and thus the detailed description thereof will not be presented.

Figure 10:
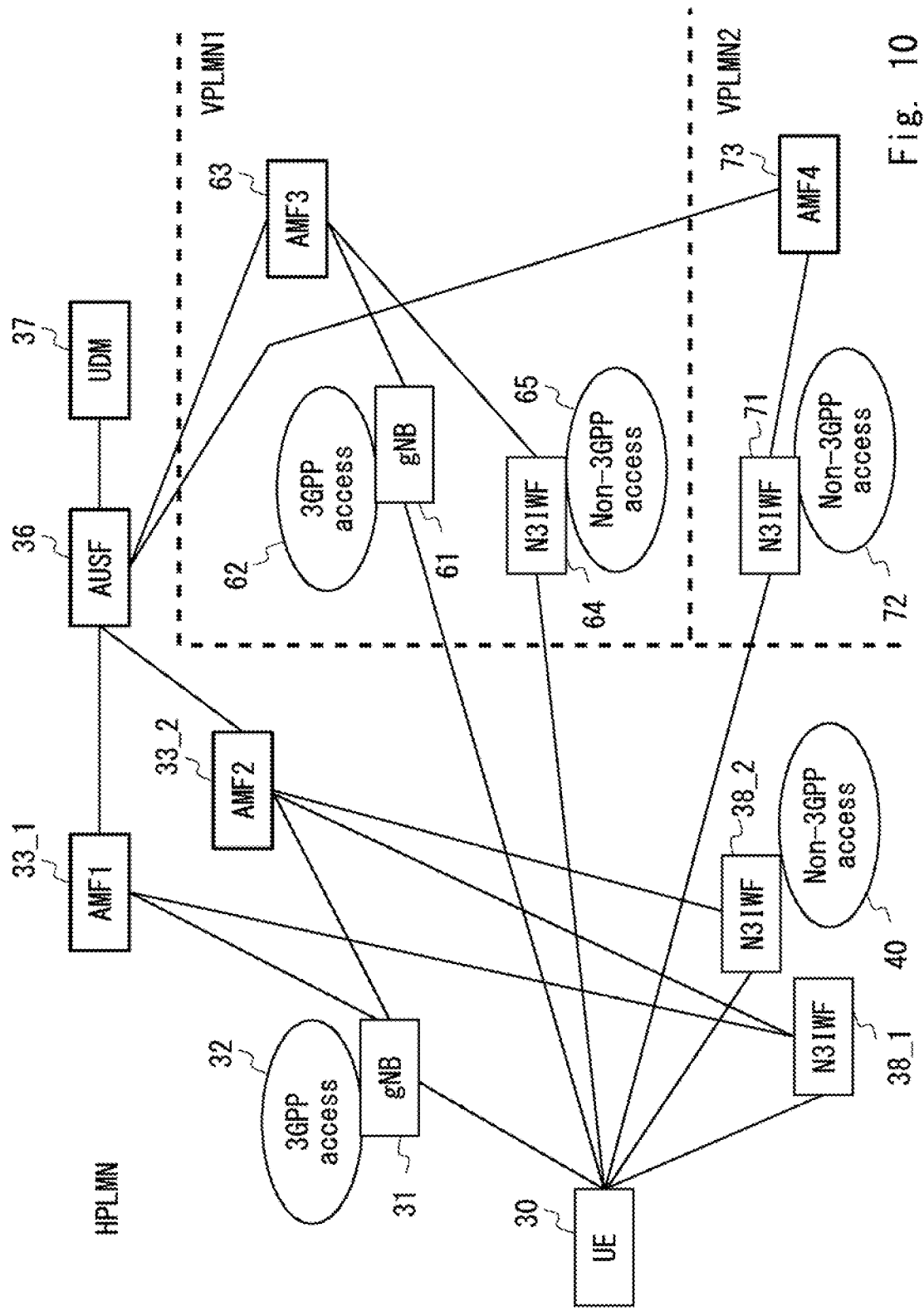
FIG. 10 is a configuration diagram of a communication system according to the second example embodiment.

A configuration example of a communication system different from that in FIG. 3 will be described below with reference to FIG. 10. FIG. 10 shows that a UE 30 establishes multiple connections via a plurality of N3IWFs within an HPLMN. Further, FIG. 10 shows that the UE 30 establishes multiple connections with a VPLMN1 and establishes a connection with a VPLMN2.

The UE 30 establishes a NAS connection with an AMF 33_1 via an N3IWF 38_1 in the HPLMN. Further, the UE 30 establishes a NAS connection with an AMF 33_2 via an N3IWF 38_2 in the HPLMN. Further, the UE 30 establishes a NAS connection with the AMF 33_1 and the AMF 33_2 via a 3GPP Access 32 in the HPLMN.

The VPLMN1 includes a 3GPP Access 62, an AMF 63, an N3IWF 64, and a Non-3GPP Access 65. The 3GPP Access 62 includes a gNB 61. The VPLMN2 includes a Non-3GPP Access 72 and an AMF 73. The Non-3GPP Access 72 includes an N3IWF 71. The UE 30 establishes a NAS connection with the AMF 63 via the 3GPP Access 62. Further, the UE 30 establishes a NAS connection with the AMF 63 via the N3IWF 64. Further, the UE 30 establishes a NAS connection with the AMF 73 via the N3IWF 71.

Figure 11:
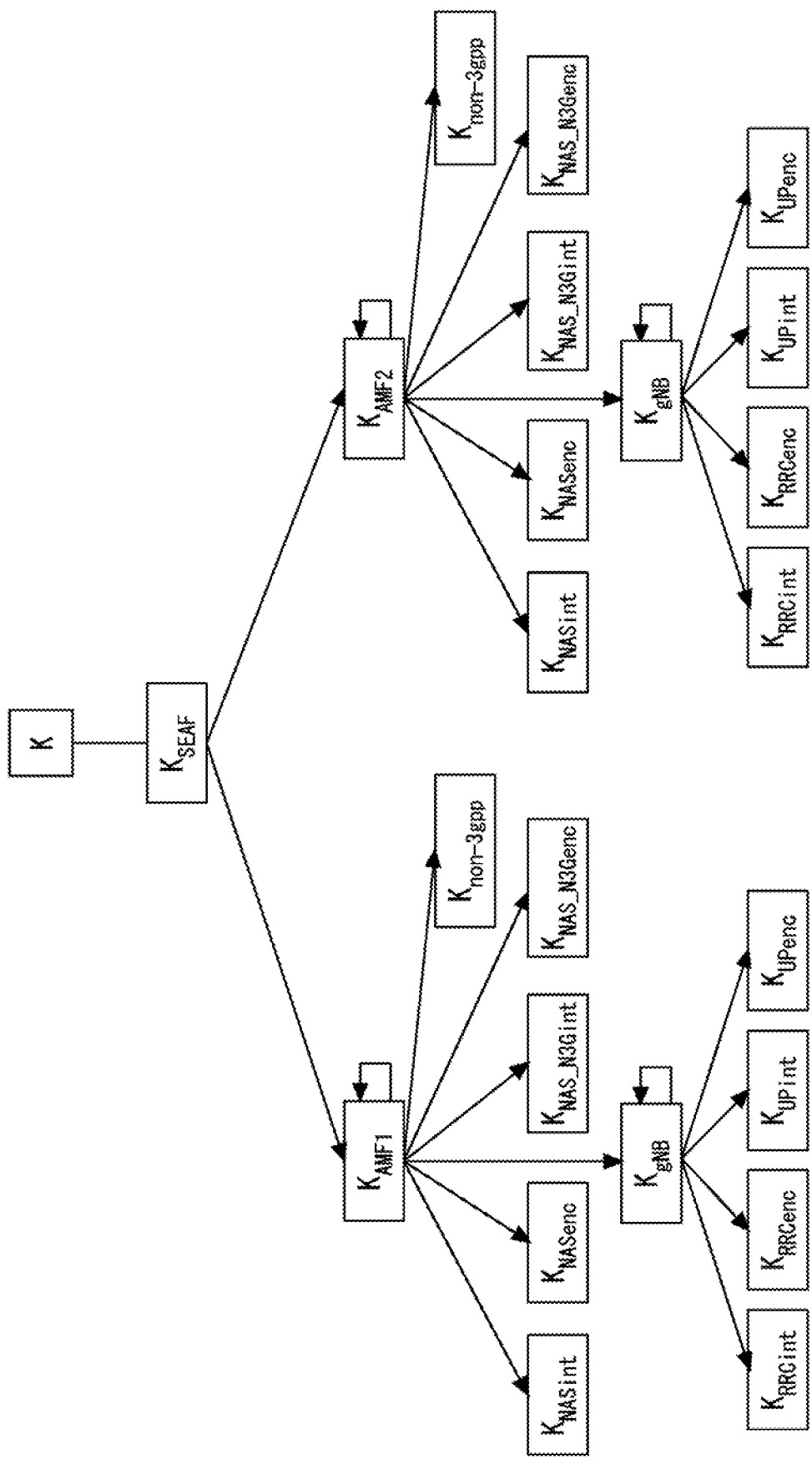
FIG. 11 is a diagram showing a Key hierarchy according to the second example embodiment.

A Key hierarchy applied in the communication system of FIG. 10 will be described below with reference to FIG. 11. A security key KSEAF derived from a security key K is transmitted to an AMF 33_1, an AMF 33_2, an AMF 63, and an AMF 73. Each of the AMF 33_1, the AMF 33_2, the AMF 63, and the AMF 73 derives different security keys KAMF such as a security key KAMF_1 and a security key KAMF_2.

The subsequent derivation of the security key is the same as in FIG. 5, and thus the detailed description thereof will not be presented.

Figure 12:
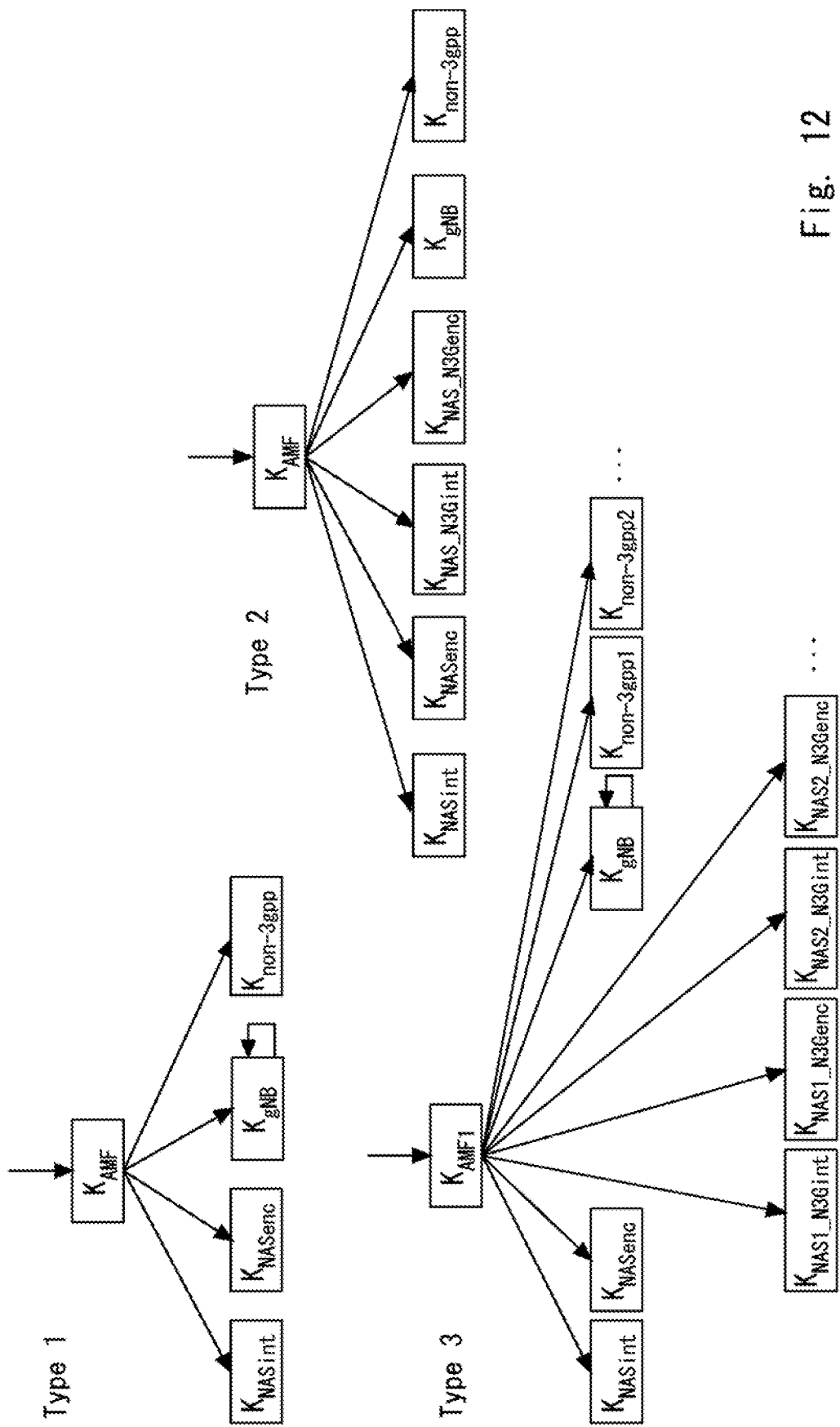
FIG. 12 is a diagram showing a Key hierarchy according to the second example embodiment.

The Key hierarchies described so far are divided into three types shown in FIG. 12. Type 1 is the Key hierarchy described in FIG. 4. Type 2 is the Key hierarchy described in FIG. 5. Type 3 is the Key hierarchy used when the UE 30 establishes multiple connections with the AMF 33 via a plurality of access networks of the same kind. The plurality of access networks of the same kind may be a plurality of N3IWFs connected to the AMF 33, for example. Specifically, Type 3 is the Key hierarchy in which different security keys KNAS, KgNB, and Knon-3gpp are derived for each of the plurality of N3IWFs from the security key KAMF in the Key hierarchy described in FIG. 5.

A case where a security key KNAS_N3Genc is derived will be described below with reference to FIG. 13. The security key KNAS_N3Genc is output from a KDF (Key Derivation Function). A security key KAMF, encryption algorithm identification information (Enc.Algo ID), and AN Identity are input to the KDF. AN Type may be input to the KDF instead of the AN Identity.

A 2-bit value may be used for the AN Type, for example. Specifically, the 3GPP Access may be indicated by 00, the Untrusted Non-3GPP Access may be indicated by 01, and the trusted Non-3GPP Access may be indicated by 10. Alternatively, a 1-bit value may be used for the AN Type. Specifically, the 3GPP Access may be indicated by 0, and the Non-3GPP Access may be indicated by 1.

Figure 13:
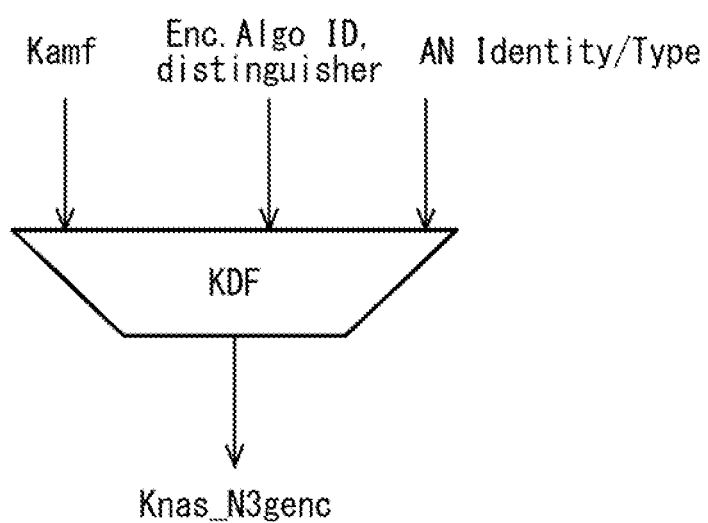
FIG. 13 is a diagram showing derivation of a security key according to the second example embodiment.
Figure 14:
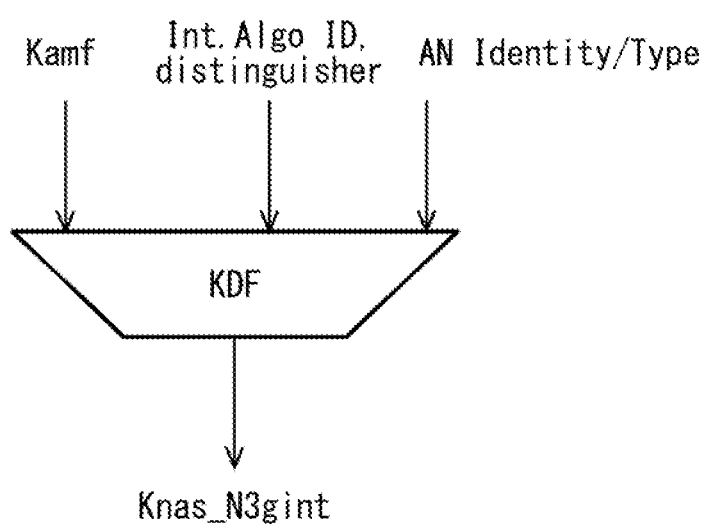
FIG. 14 is a diagram showing derivation of a security key according to the second example embodiment.

FIG. 14 shows a case where a security key KNAS_N3Gint is derived. In FIG. 14, an integrity assurance algorithm ID (Int.Algo ID) is used instead of the encryption algorithm ID (Enc.Algo ID) shown in FIG. 13. Other input parameters are the same as those in FIG. 13.

In FIGS. 13 and 14, when the UE 30 establishes multiple connections with the AMF 33 via a plurality of Non-3GPP Accesses in one PLMN (HPLMN or VPLMN), an N3G_Count may be used as an input parameter to the KDF. In other words, when the AMF 33 sets up a plurality of N1 interfaces with the UE 30, the N3G_Count may be used.

The N3G_Count may be incremented whenever one connection is established, that is, one N1 interface is set.

Further, an NONCEn3gpp transmitted from the AMF 33 to the UE 30 as a part of a protected NAS SMC (Security Mode Command) message may be used as an input parameter.

Further, a RAND may be used as input parameter. The RAND may be, for example, Salt"s" used as an input to the same PRNG (Pseudo Random Number Generator) between the UE 30 and the AMF 33. The RAND may be transmitted from the AMF 33 to the UE 30 as a part of the protected NAS SMC message.

A method of synchronizing the N3G_Count between the UE 30 and the AMF 33 will be described below.

The N3G_Count may be transmitted between the UE 30 and the AMF 33 in a state of being included in the NAS message subjected to integrity protection and encryption. Alternatively, the N3G_Count may be transmitted between the UE 30 and the AMF 33 in a state of being included in the NAS message subjected to only integrity protection. The NAS message including the N3G_Count may be, for example, a NAS SMC message or an N1 message for optimized NAS.

Alternatively, the following method of not directly transmitting the N3G_Count between the UE 30 and the AMF 33 may be used.

It is assumed that each of the UE 30 and the AMF 33 stores an N3G_Count value. In such a state, the AMF 33 selects an arbitrary value (random number) N. Further, the AMF 33 calculates a value d (=N3G_Count value+N). Alternatively, the AMF 33 may calculate a value d (=N3G_Count value−N) or a value d (=N3G_Count value x or N). The value d may be calculated using an arbitrary arithmetic operation method.

Subsequently, the AMF 33 transmits at least one of N and d and an indicator indicating the arithmetic operation method used at the time of calculating the value d to the UE 30. The indicator indicating the arithmetic operation method represents, for example, addition, subtraction, or x or operation. At least one of N and d and the indicator may be transmitted to the UE 30 by the AMF 33 in a state of being included in the NAS message subjected to integrity protection and encryption. Alternatively, at least one of N and d and the indicator may be transmitted to the UE 30 by the AMF 33 in a state of being included in the NAS message subjected to only integrity protection.

Subsequently, the UE 30 synchronizes the N3G_Count value using the value received from the AMF 33. Further, the UE 30 derives a security key using the synchronized N3G_Count value as an input parameter of the KDF.

Figure 15:
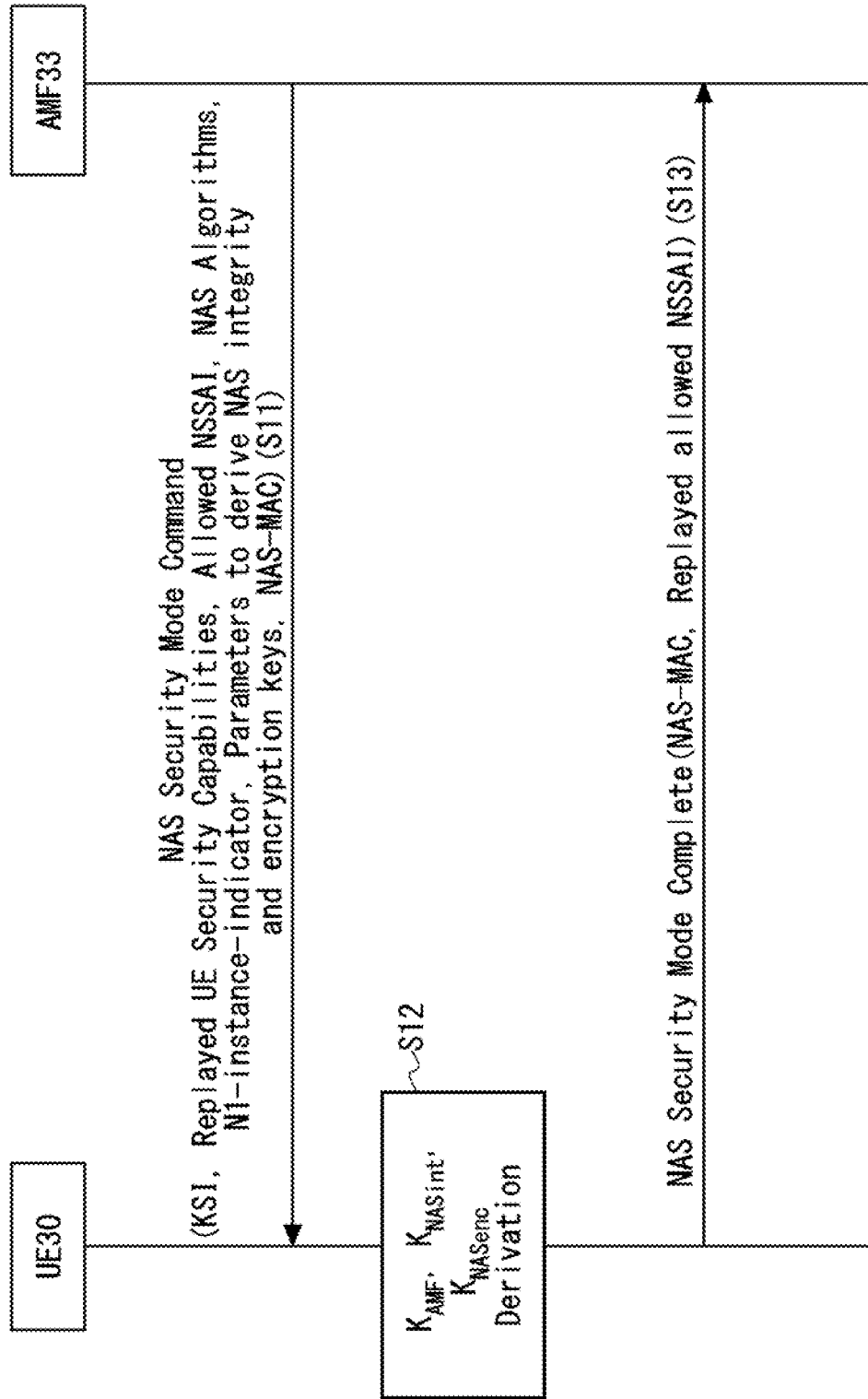
FIG. 15 is a diagram showing a flow of a process of transmitting information on an access network used by a UE according to the second example embodiment.

A flow of a process of transmitting information on the access network used by the UE 30 will be described below with reference to FIG. 15. First, the AMF 33 transmits a NAS SMC message to the UE 30 (S11). The NAS SMC message includes KSI (Key Set Identifier), Replayed UE Security capabilities, Allowed NSSAI (Network Slice Selection Assistance Information), NAS Algorithms, N1-instance-indicator, Parameters to derive NAS integrity and encryption keys, and NAS-MAC (NAS-Message Authentication Code).

N1 in an N1-instance-indicator means an N1 instance or an N1 interface. In other words, the N1-instance-indicator indicates an access network used by the UE 30. Alternatively, the N1-instance-indicator may indicate an access network that can be used by the UE 30.

The Parameters to derive NAS integrity and encryption keys may include an AN Identity, an AN type, an N3G_Count, a NONCEn3gpp, and a RAND.

Subsequently, the UE 30 derives security keys KAMF, KNASint, and KNASenc using the received parameters (S12). Next, the UE 30 transmits a NAS Security Mode Complete message to the AMF 33 (S13). The NAS Security Mode Complete message includes a NAS-MAC and a Replayed allowed NSSAI.

When the UE 30 can utilize a plurality of Non-3GPP accesses, the NAS SMC message may include an indicator indicating a specific N1 instance.

Figure 16:
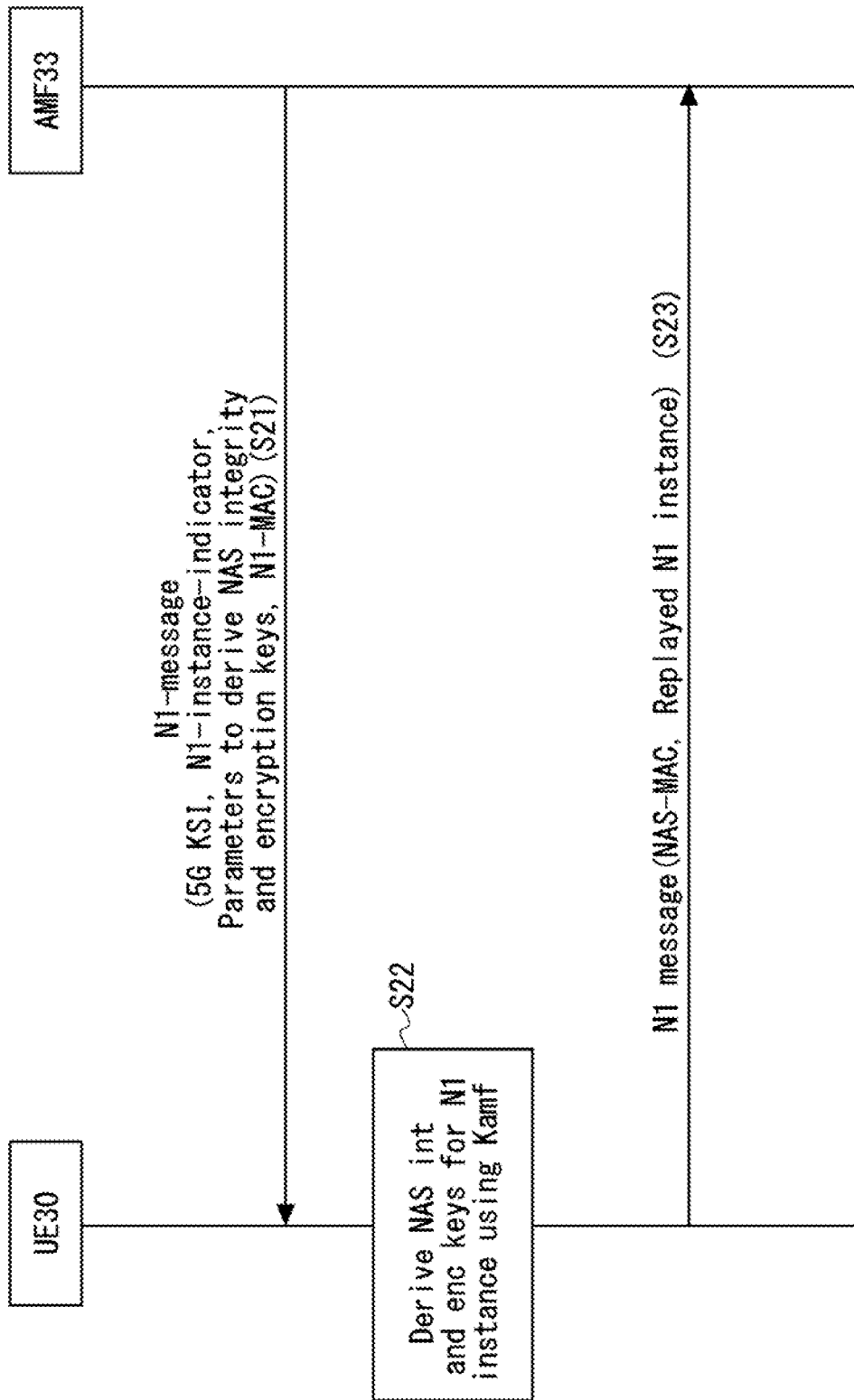
FIG. 16 is a diagram showing a flow of a process of transmitting information on the access network used by the UE according to the second example embodiment.

A flow of a process of transmitting information on the access network, which is used by the UE 30 and is different from that in FIG. 15, will be described below with reference to FIG. 16. In FIG. 16, an N1 message is used in steps S21 and S23 instead of the NAS SMC message and the NAS Security Mode Complete message in FIG. 15. The N1 message transmitted in step S21 includes a 5G KSI, an N1-instance-indicator, a Parameters to derive NAS integrity and encryption keys, and an N1-MAC.

The N1 message transmitted in step S21 may be protected using NAS integrity keys and NAS encryption keys of the AMF 33. Further, the N1 message transmitted in step S23 may be protected using NAS integrity keys and NAS encryption keys derived in step S22.

A modification of a process of deriving the security key KSEAF will be described below with reference to FIGS. 17 to 23. In FIGS. 17 to 23, a modification of a 5G AKA will mainly be described. FIGS. 17 to 23 show processes of deriving a security key on each of the core network and the UE.

Figure 17:
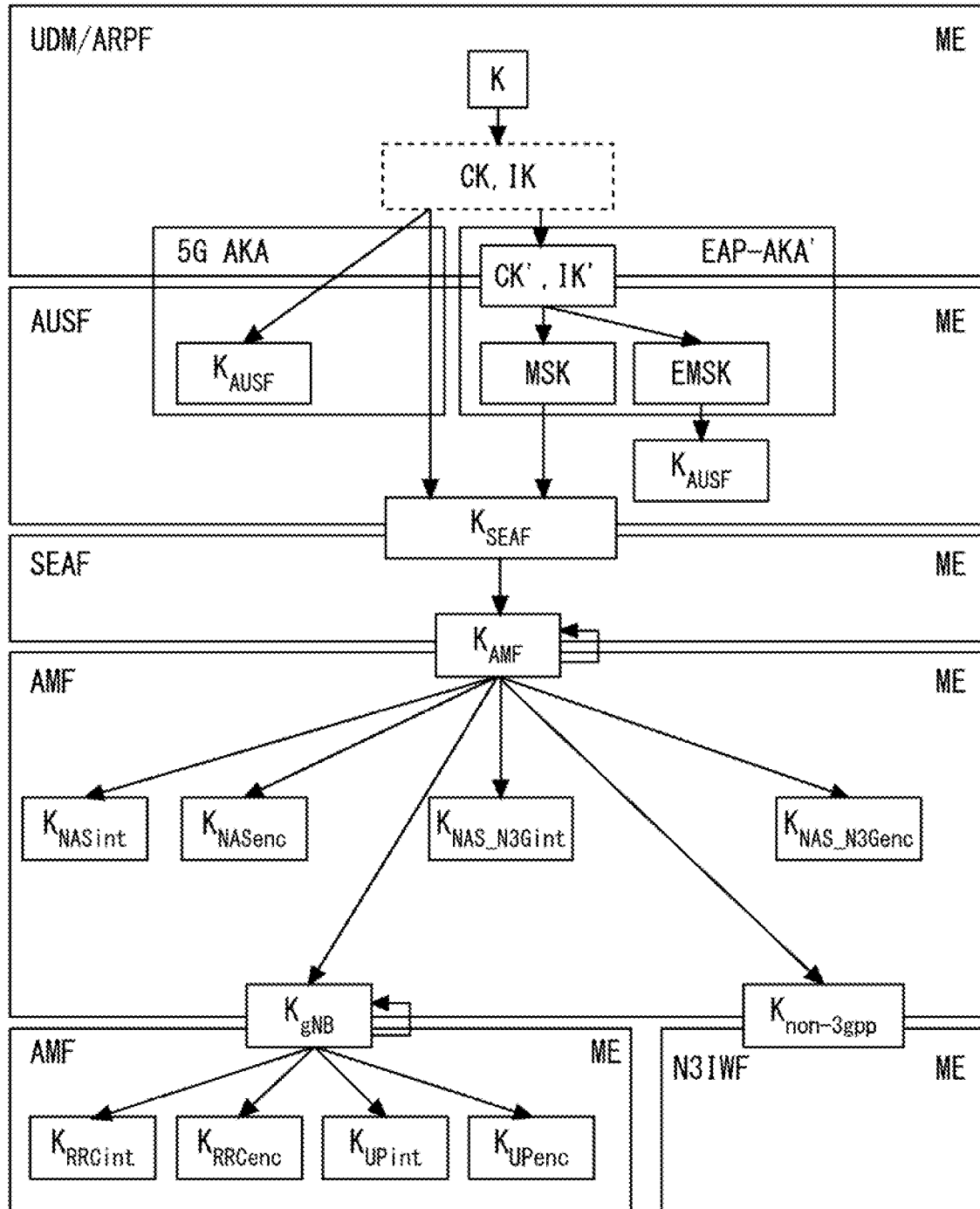
FIG. 17 is a diagram showing a process of deriving a security key KSEAF according to the second example embodiment.

First, the process of deriving the security key KSEAF will be described with reference to FIG. 17. In the UDM 37, an integrity protection key IK (Integrity Key) and a cipher key CK (Cipher Key) are derived from a security key K. Subsequently, a security key KAUSF is derived, in the UDM 37, from the integrity protection key IK and the cipher key CK by execution of a 5G-AKA. In the UDM 37, a KSEAF is derived from the integrity protection key IK and the cipher key CK.

Figure 18:
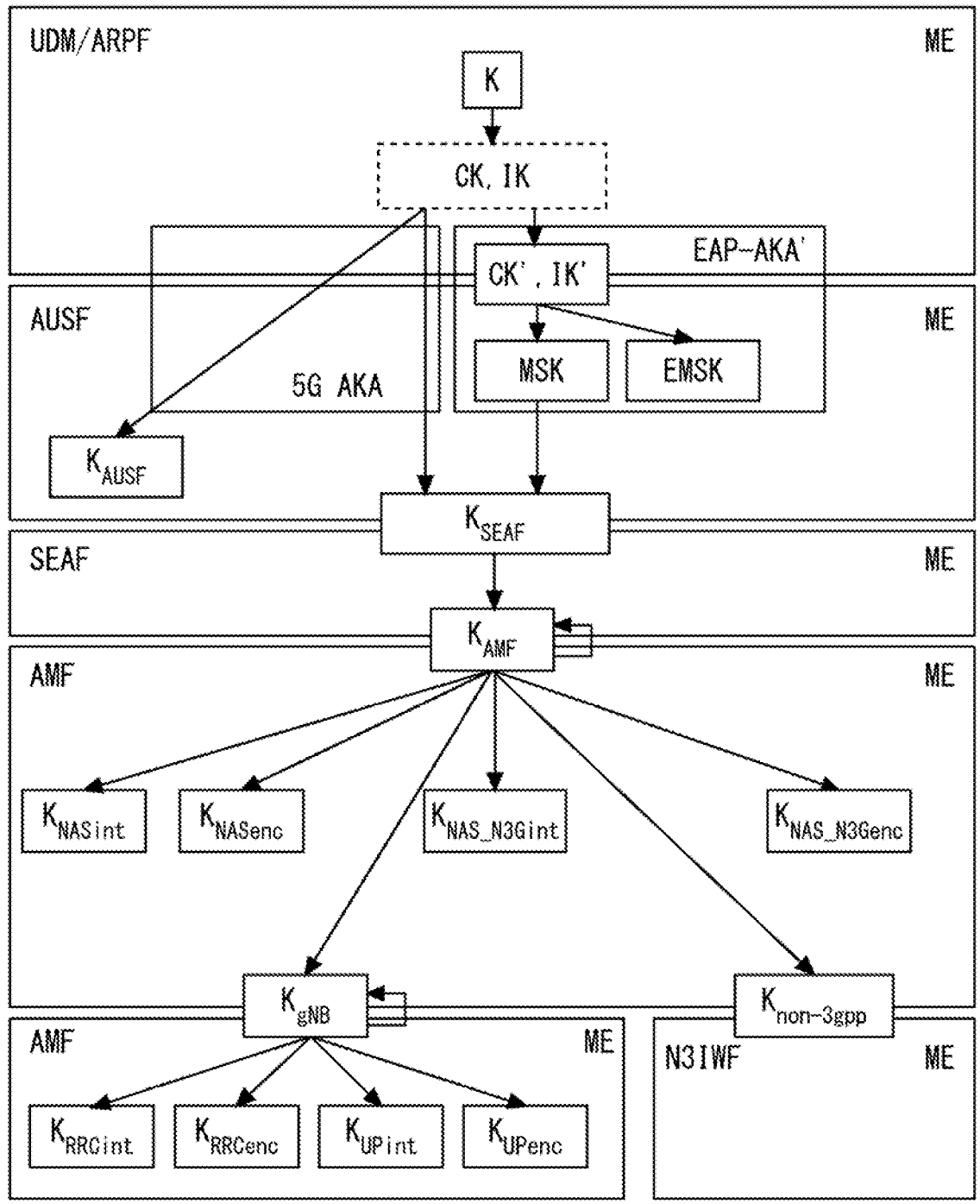
FIG. 18 is a diagram showing a process of deriving a security key KSEAF according to the second example embodiment.

In FIG. 18, a security key KAUSF and a KSEAF are derived, in the UDM 37, from an integrity protection key IK and a cipher key CK without execution of a 5G-AKA.

Figure 19:
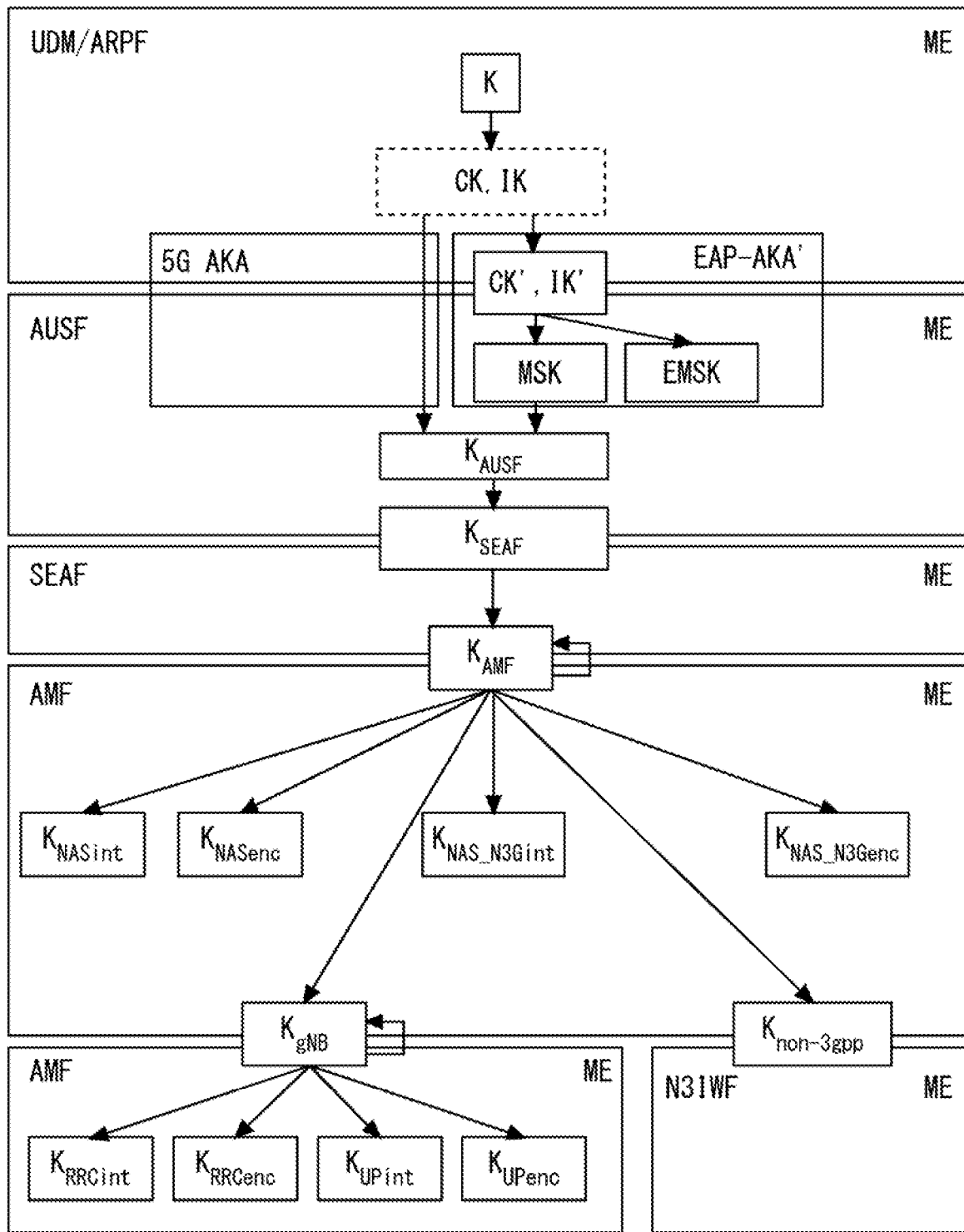
FIG. 19 is a diagram showing a process of deriving a security key KSEAF according to the second example embodiment.

In FIG. 19, a security key KAUSF is derived, in the UDM 37, from an integrity protection key IK and a cipher key CK without execution of a 5G-AKA. Further, in the AUSF 36, a security key KSEAF is derived from the security key KAUSF.

Figure 20:
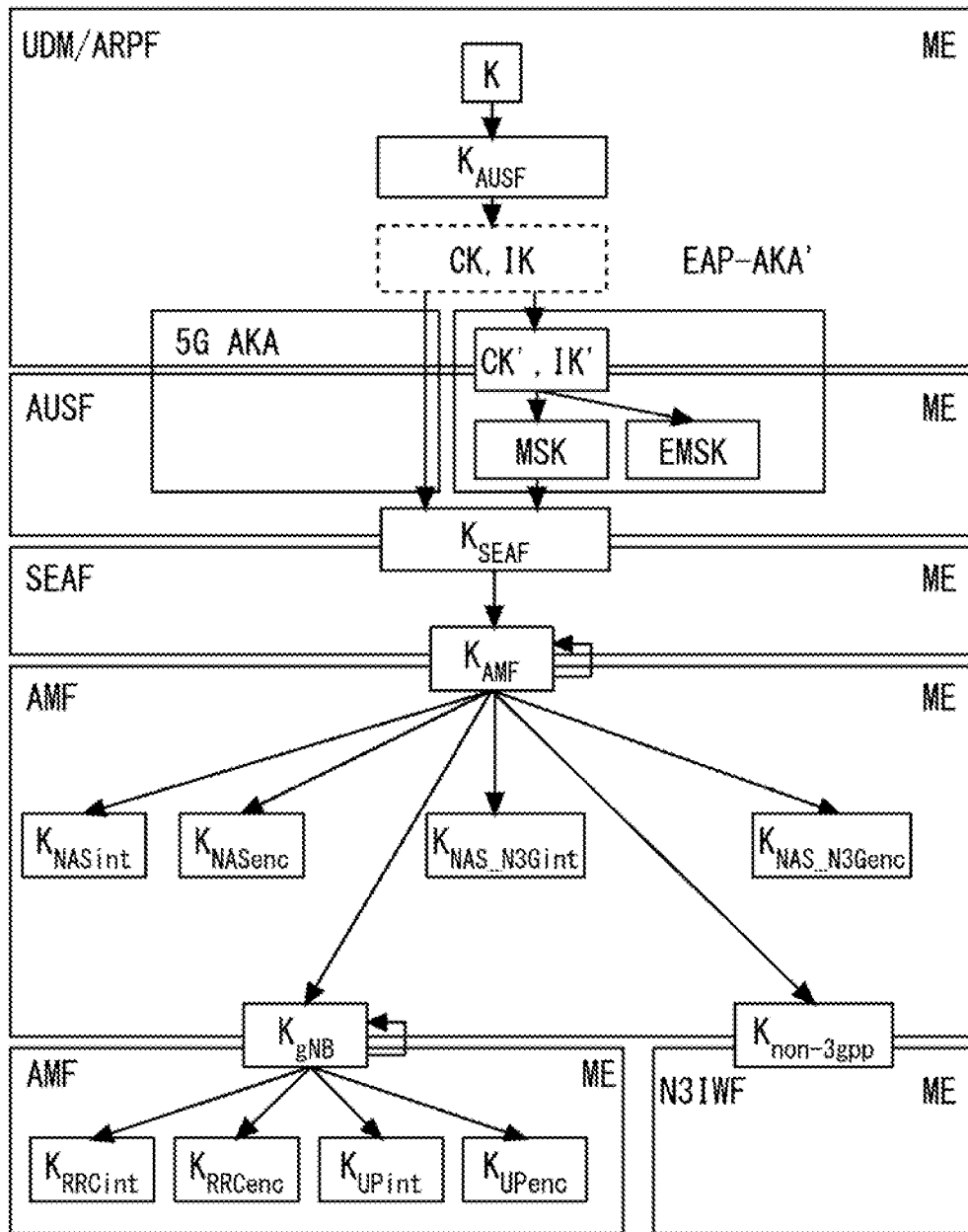
FIG. 20 is a diagram showing a process of deriving a security key KSEAF according to the second example embodiment.

In FIG. 20, a security key KAUSF is derived, in the UDM 37, from a security key K. Next, an integrity protection key IK (Integrity Key) and a cipher key CK (Cipher Key) are derived from the security key KAUSF. Subsequently, a security key KSEAF is derived, in the UDM 37, from the integrity protection key IK and the cipher key CK without execution of a 5G-AKA.

Figure 21:
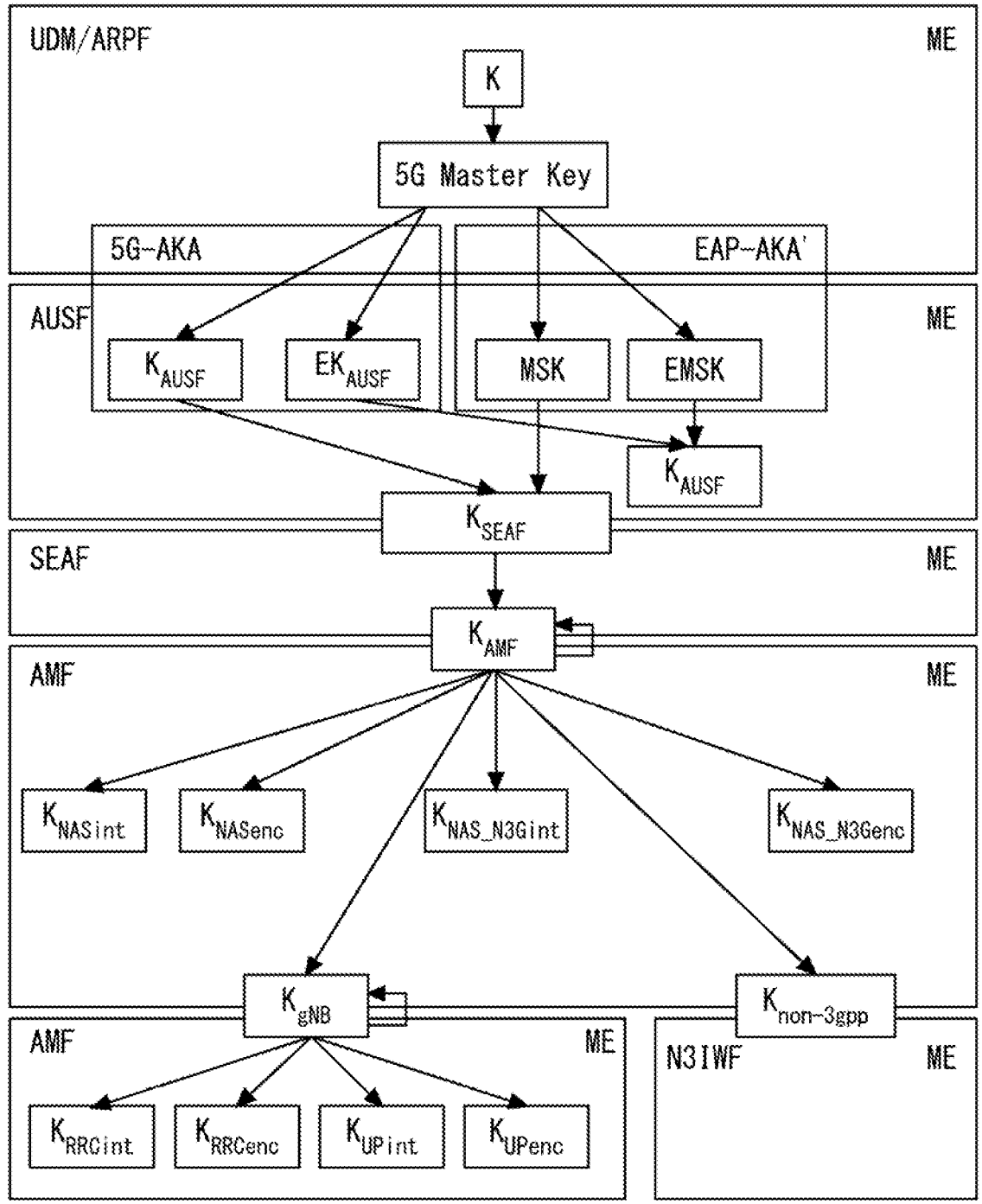
FIG. 21 is a diagram showing a process of deriving a security key KSEAF according to the second example embodiment.

In FIG. 21, a 5G Master Key is derived, in the UDM 37, from a security key K. Next, a security key KAUSF and a security key EKAUSF (Extended KAUSF) are derived, in the UDM 37, from the 5G Master Key by execution of a 5G-AKA. Subsequently, a security key KSEAF is derived, in the AUSF 36, from the security key KAUSF.

Figure 22:
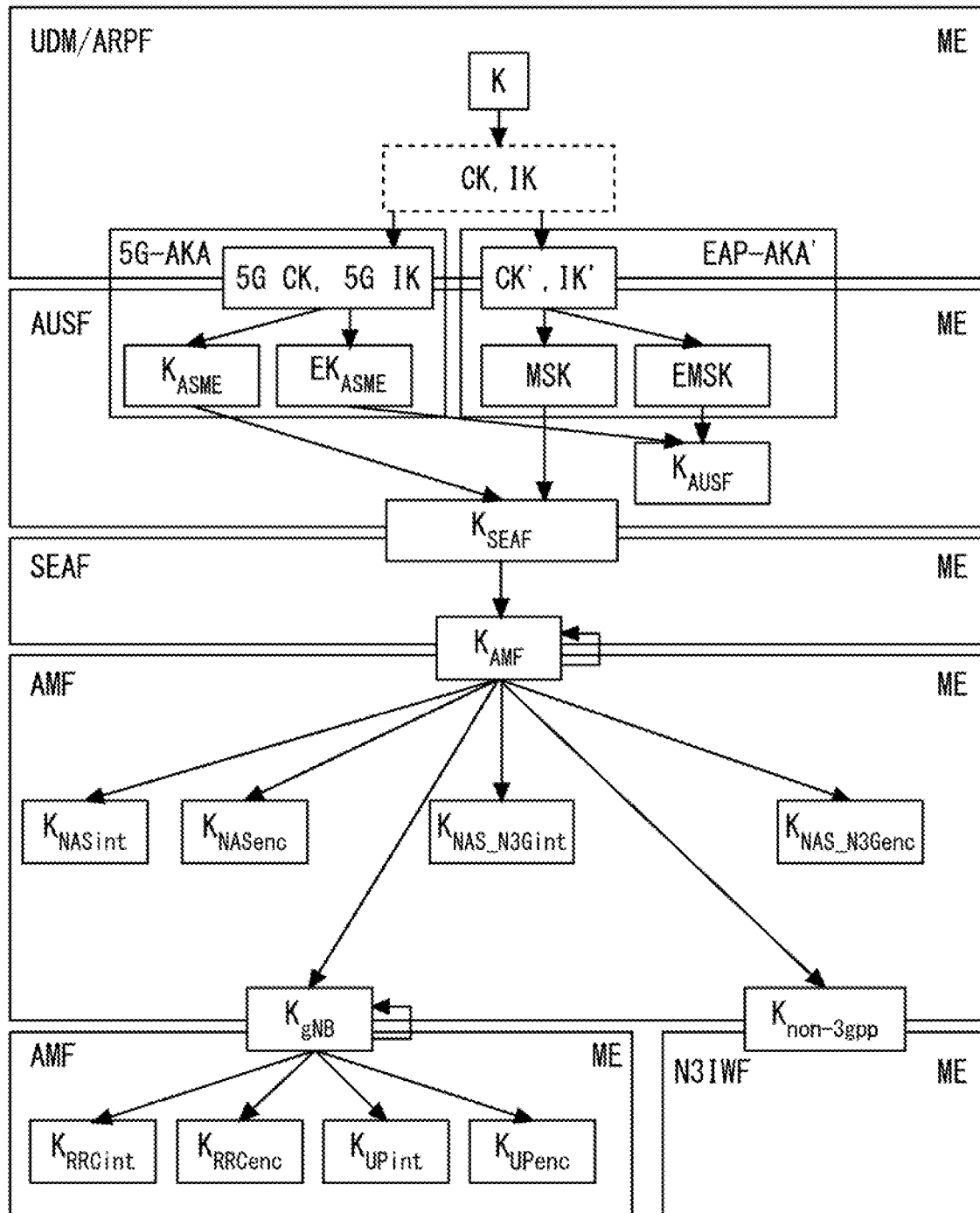
FIG. 22 is a diagram showing a process of deriving a security key KSEAF according to the second example embodiment.

In FIG. 22, a security key KAUSF is derived, in the UDM 37, from an integrity protection key 5G-IK and a cipher key 5G-CK by execution of a 5G-AKA from an integrity protection key IK (Integrity Key) and a cipher key CK (Cipher Key). Subsequently, a security key KASME and an EKASME are derived, in the AUSF 36, from the integrity protection key 5G-IK and the cipher key 5G-CK. Next, a security key KSEAF is derived, in the AUSF 36, from the security key KASME.

Figure 23:
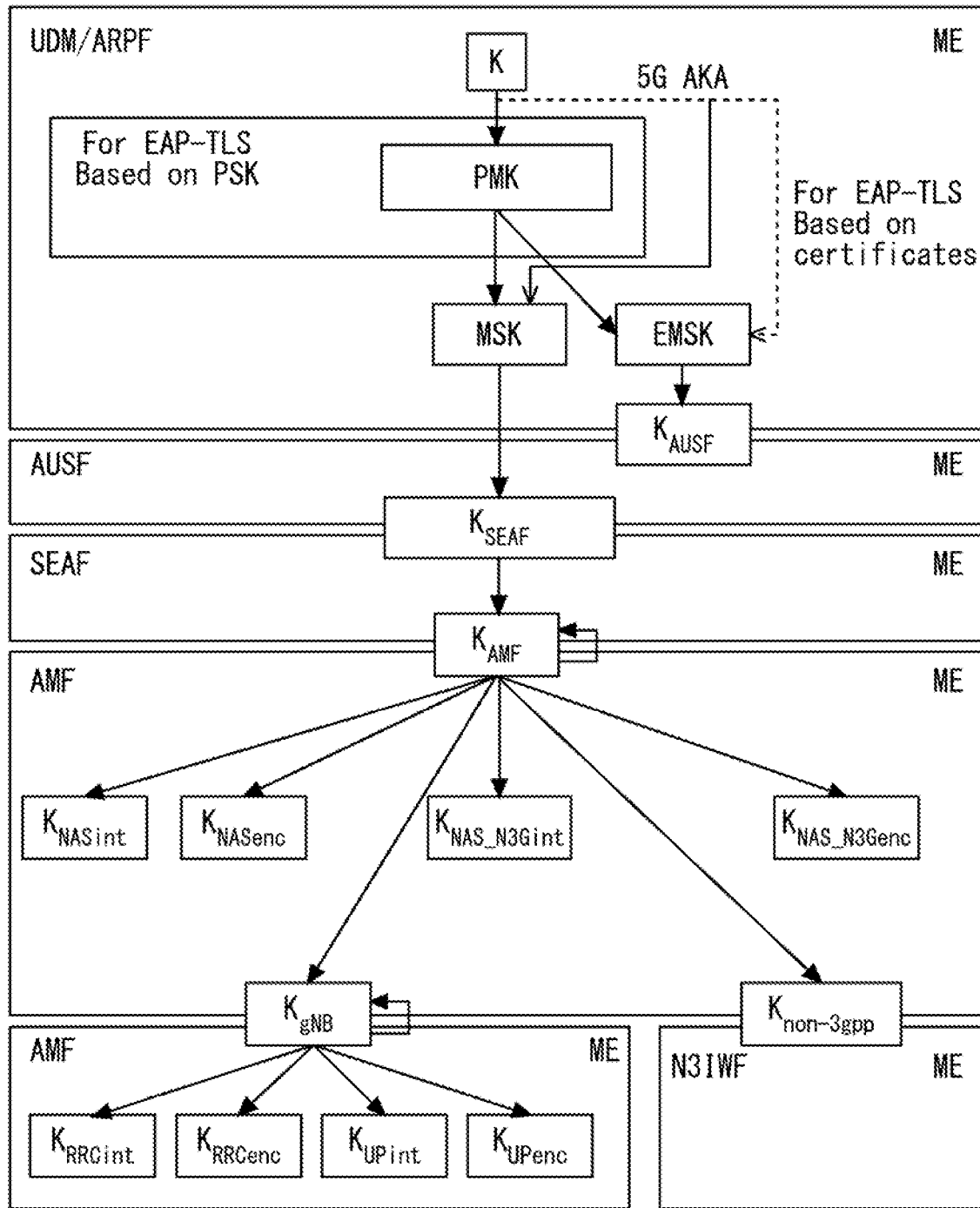
FIG. 23 is a diagram showing a process of deriving a security key KSEAF according to the second example embodiment.

FIG. 23 shows that a Key Hierarchy supports an EAP-TLS (Extensible Authentication Protocol-Transport Layer Security). A PMK (Pre Master Key) is derived from the key security key K by execution of an EAP-TLS based on PSK (Pre-Shared Key). Subsequently, keys MSK and EMSK are derived from the key PMK by execution of EAP-TLS based on Certificates. Next, the UDM 37 derives a security key KSEAF from the key MSK, and further derives a security key KAUSF from the key MSK. The keys MSK and EMSK may be derived from the security key K by execution of the EAP-TLS based on PSK. In the EAP-TLS based on PSK, a PSK ID is transmitted from the UE as a part of the UE Security Capabilities in a registration request. The security key K may be PSK.

As described above, the AMF 33 can share the security key with the UE 30 connected via Non-3GPP Access such as Untrusted Non-3GPP Access.

(Third Example Embodiment)

Figure 24:
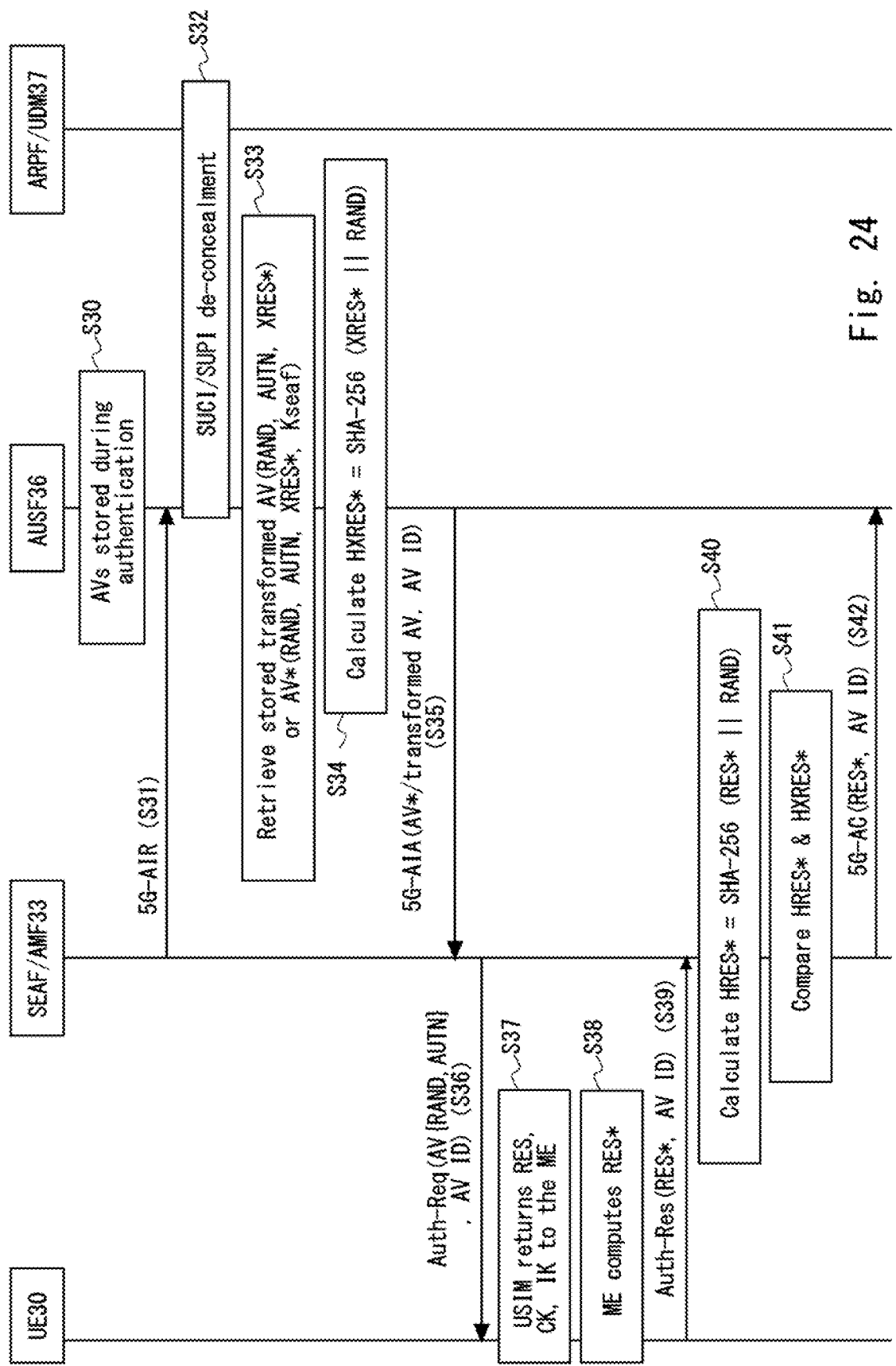
FIG. 24 is a diagram showing a flow of authentication processing related to a UE 30 according to a third example embodiment.

A flow of authentication processing related to a UE 30 will be described below with reference to FIG. 24. In FIG. 24, it is assumed that an AUSF 36 stores AVs (Authentication Vectors) used for the authentication processing (S30). In addition, a SEAF/AMF 33 indicates that an AMF 33 has a SEAF (Security Anchor Function). An ARPF/UDM 37 indicates that a UDM 37 has an ARPF (Authentication credential Repository and Processing Function).

First, the AMF 33 transmits a 5G-AIR (5G-Authentication Identifier Request) to the AUSF 36 (S31). The 5G-AIR includes an SUCI (Subscription Concealed Identifier) related to the UE 30. Next, the AUSF 36 executes de-concealment of the SUCI with the UDM 37 in order to obtain a SUPI (Subscription Permanent Identifier). Specifically, the AUSF 36 transmits the SUCI to the UDM 37. Further, the UDM 37 retrieves the SUPI from the SUCI. Then, the UDM 37 transmits the SUPI to the AUSF 36.

Subsequently, the AUSF 36 retrieves a transformed AV or AV* (S33). The transformed AV includes RAND, AUTN, and XRES*. The AV* includes RAND, AUTN, XRES*, and security key KSEAF. Next, the AUSF 36 calculates HXRES* (Hash XRES) (S34). For example, the AUSF 36 calculates the HXRES* related to the XRES* using SHA-256 as a hash function.

Next, the AUSF 36 transmits a 5G-AIA (5G-Authentication Identifier Answer) to the AMF 33 (S35). The 5G-AIA includes AV* or transformed AV, AV ID, and HXRES*. The AV ID is identification information for identifying the AV* or the transformed AV.

Subsequently, the AMF 33 transmits an Auth-Req to the UE 30 (S36). The Auth-Req includes RAND AUTN and AV ID. Next, the UE 30 acquires RES, CK, and ID from an USIM (Universal Subscriber Identity Module) (S37). In other words, the RES, the CK, and the ID are output from the USIM to a ME (Mobile Equipment) which is a main body of the UE 30.

Subsequently, the ME of the UE 30 computes RES* (S38).

Subsequently, the UE 30 transmits an Auth-Res to the AMF 33 (S39). The Auth-Res includes RES* and AV ID. Next, the AMF 33 calculates HRES* (S40). For example, the AMF 33 calculates the HRES* related to the RES* using SHA-256 as a hash function.

Subsequently, the AMF 33 compares the HREX* with the HXRES* to determine whether the HRES* and the HXRES* coincide with each other (S41). When the HRES* and the HXRES* coincide with each other, the AMF 33 determines that the UE 30 is a valid UE. Next, the AMF 33 transmits a 5G-AC (5G-Authentication Complete) to the AUSF 36 (S42). The 5G-AC includes RES* and AV ID.

When the UE 30 supplies only one AV, the AV ID may not be included in steps S35, S36, S39, and S42.

Figure 25:
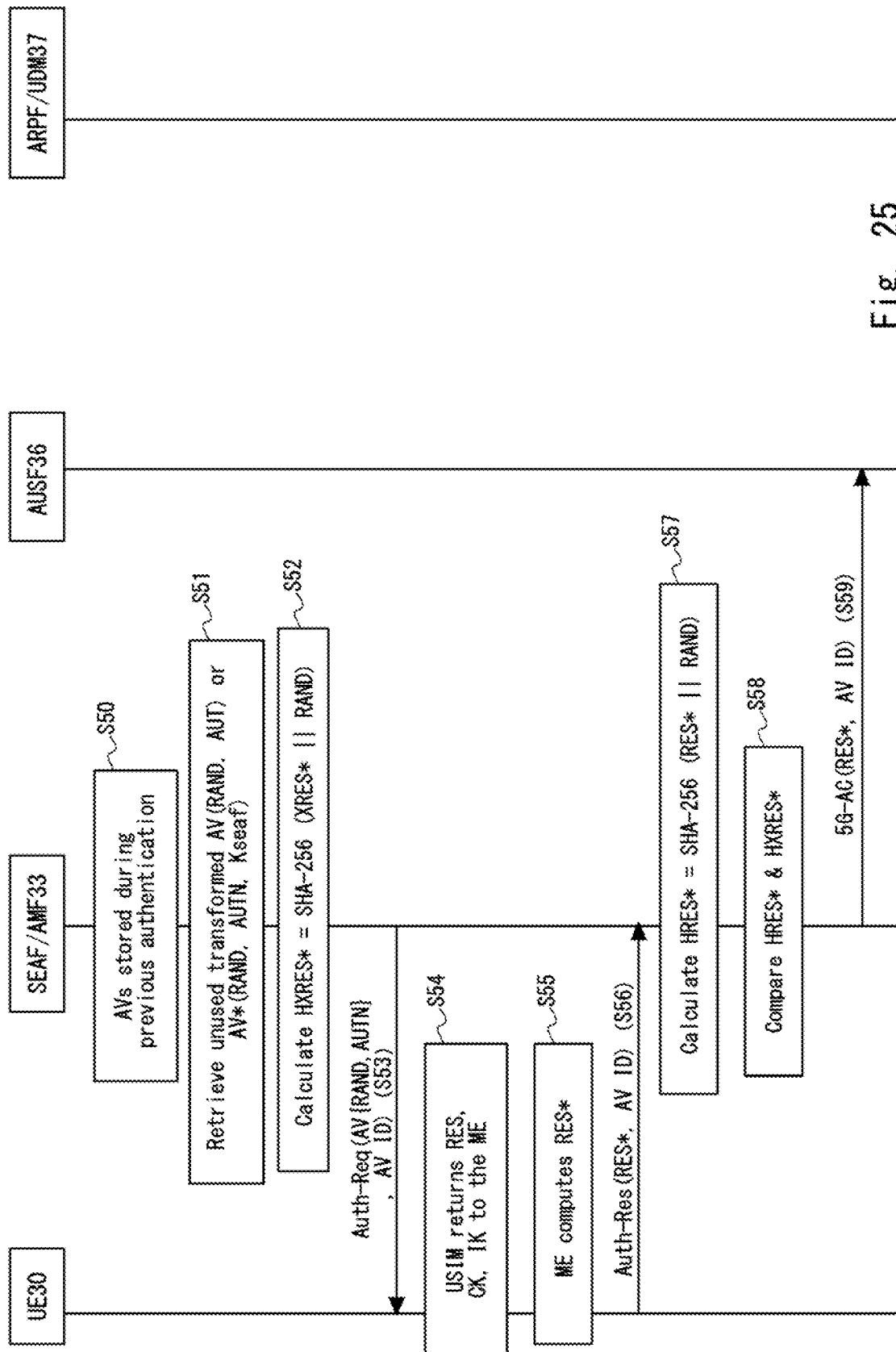
FIG. 25 is a diagram showing a flow of authentication processing related to the UE 30 according to the third example embodiment.

A flow of authentication processing related to the UE 30 and different from that in FIG. 24 will be described below with reference to FIG. 25. In FIG. 25, it is assumed that the AMF 33 stores AVs (Authentication Vectors) used for the authentication processing (S50).

Steps S51 and S52 are the same as steps S33 and S34 in FIG. 24, and thus the detailed description thereof will not be presented. In steps S51 and S52, the AMF 33 executes the processes described in steps S33 and S34.

Steps S53 to S59 are the same as steps S36 to S42 in FIG. 24, and thus the detailed description thereof will not be presented.

Figure 26:
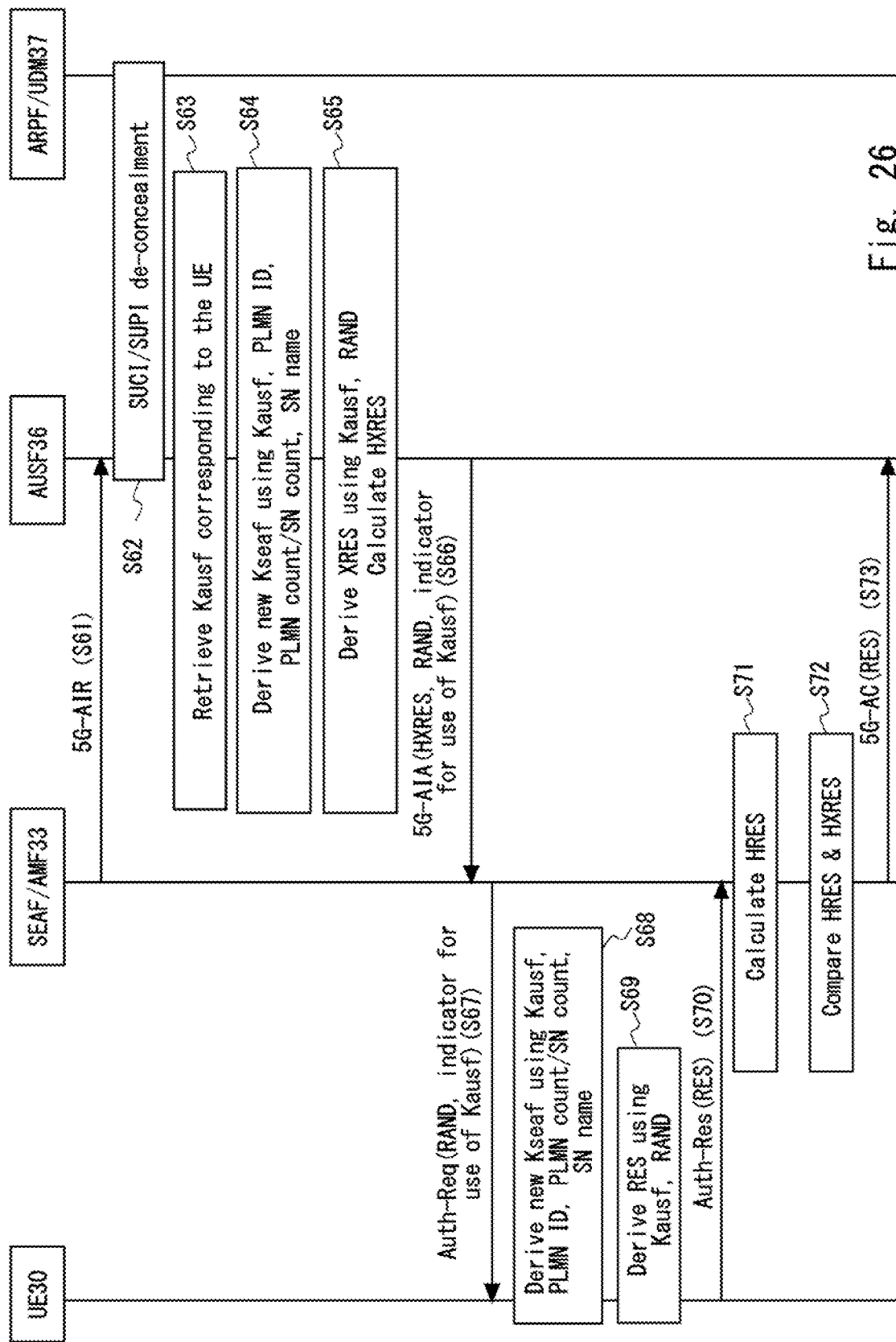
FIG. 26 is a diagram showing a flow of authentication processing related to the UE 30 according to the third example embodiment.

A flow of authentication processing related to the UE 30 and different from those in FIGS. 24 and 25 will be described below with reference to FIG. 26. Steps S61 and S62 are the same as steps S31 and S32 in FIG. 24, and thus the detailed description thereof will not be presented.

Next, the AUSF 36 retrieves a security key KAUSF corresponding to the UE 30 (S63). Subsequently, the AUSF 36 derives a new security key KSEAF using security keys KAUSF, PLMN ID, PLMN count or SN (Serving Network) count, and SN name (S64). Subsequently, the AUSF 36 calculates XRES using the security key KAUSF and the RAND, and further calculates HXRES (S65).

Next, the AUSF 36 transmits a 5G-AIA to the AMF 33 (S66). The 5G-AIA includes HXRES, RAND, and indicator for use of KAUSF. Subsequently, the AMF 33 transmits an Auth-Req to the UE 30 (S67). The Auth-Req includes RAND and Indicator for use of KAUSF.

Next, the UE 30 calculates a new security key KSEAF using the security keys KAUSF, PLMN ID, PLMN count or SN count, and SN name (S68). Subsequently, the UE 30 calculates RES using the security key KAUSF and the RAND (S69). Subsequently, the UE 30 transmits an Auth-Res to the AMF 33 (S70). The Auth-Res includes RES.

Next, the AMF 33 compares the HREX with the HXRES to determine whether the HRES and the HXRES coincide with each other (S72). The AMF 33 determines that the UE 30 is a valid UE when the HRES and the HXRES coincide with each other. Subsequently, the AMF 33 transmits a 5G-AC to the AUSF 36 (S73). The 5G-AC includes RES.

Steps S64 and S68 may be omitted. In addition, steps S65 and S69 may be omitted when the AUSF 36 requests XRES from an ARPF (Authentication Credential Repository and Processing Function) entity. Further, when the security key KAUSF does not depend on SN, it can be used between PLMNs. When the security key KAUSF depends on the SN, the security key KAUSF can be used in the PLMN without using the security keys KAUSF, PLMN ID, PLMN count or SN count, and SN name.

Figure 27:
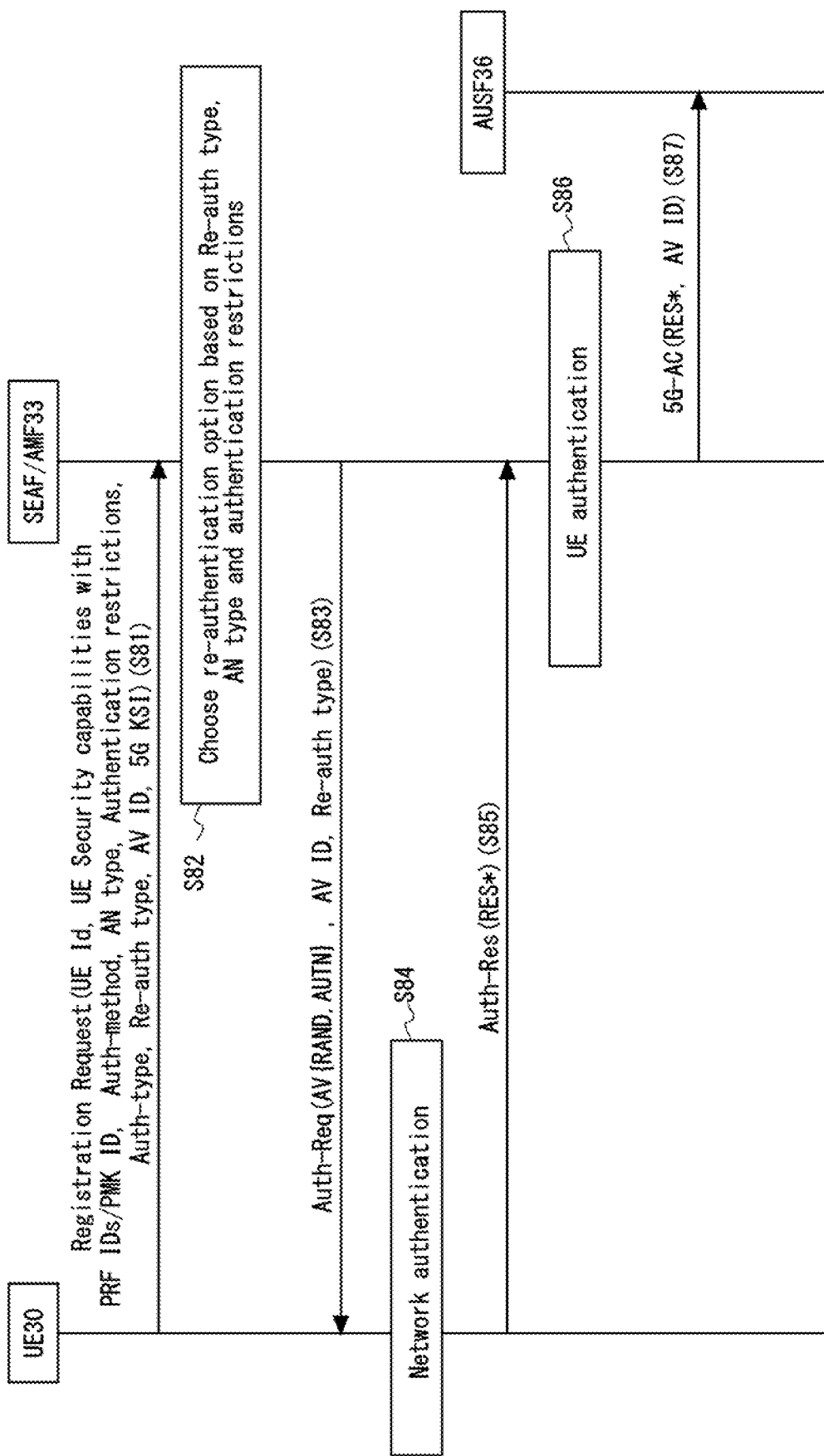
FIG. 27 is a diagram showing a flow of authentication processing related to the UE 30 according to the third example embodiment.

A flow of authentication processing related to the UE 30 and different from those in FIGS. 24 to 26 will be described below with reference to FIG. 27. First, the UE 30 transmits a Registration Request to the AMF 33 (S81). The Registration Request includes UE ID, UE Security Capabilities with PRF IDs or PMK ID, Auth-method, AN type, Authentication restrictions, Auth-type, Re-auth type, AV ID, and 5G KSI. The UE Security Capabilities include Ciphersuites, PFR IDs, and PSK IDs.

Next, the AMF 33 selects a re-authentication option based on Re-auth type, AN type, and authentication restrictions (S82). The Re-auth type is information indicating whether to perform authentication using transformed AV or AV*, to perform authentication using a security key KSEAF derived using a security key KAUSF, or to perform authentication using a new security key KSEAF derived using an old security key KSEAF.

The AN type is information indicating an access network. The authentication restrictions are information on an authentication method supported by the UE 30 or an authentication method permitted by the UE 30. For example, the authentication method supported by the UE 30 may be EAP-TLS based on certificates.

Next, the AMF 33 transmits an Auth-Req to the UE 30 (S83). The Auth-Req includes RAND, AUTN, AV-ID, and Re-auth type. Subsequently, the UE 30 performs Network authentication (S84). Subsequently, the UE 30 transmits an Auth-Res to the AMF 33 (S85). The Auth-Res includes RES*. The RES* is calculated in step S84.

Subsequently, the AMF 33 performs UE authentication (S86). Subsequently, the AMF 33 transmits a 5G-AC to the AUSF 36 (S87). The 5G-AC includes RES* and AV ID.

Figure 28:
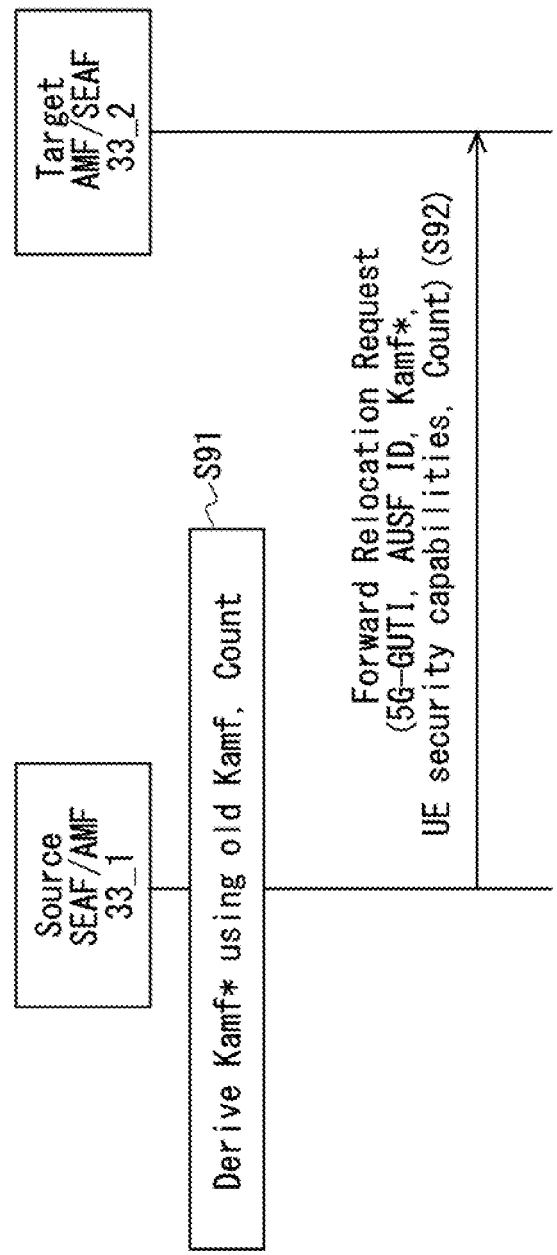
FIG. 28 is a diagram showing a procedure for deriving a security key KAMF* during a handover according to the third example embodiment.

A procedure for deriving a security key KAMF* during a handover will be described below with reference to FIG. 28. In the following description, an AMF of a handover source is referred to as Source AMF 33_1, and an AMF of a handover destination is referred to as Target AMF 33_2.

Figure 29:
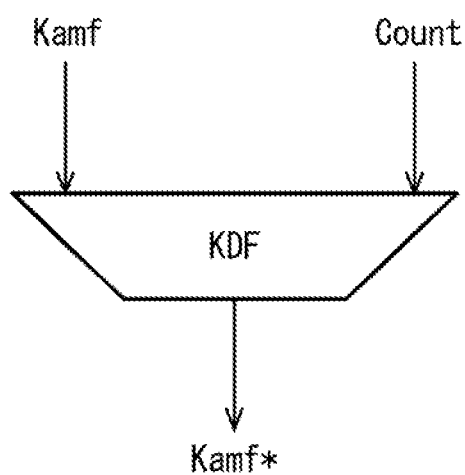
FIG. 29 is a diagram showing derivation of a security key according to the third example embodiment.

First, the Source AMF 33_1 derives a security key KAMF* using an old security key KAMF and a Count (S91). For example, as shown in FIG. 29, when the old security key KAMF and the Count are input a KDF, the security key KAMF* is derived.

Next, the Source AMF 33_1 transmits a Forward Relocation Request to the Target AMF 33_2 (S92). The Forward Relocation Request includes 5G-GUTI (Globally Unique Temporary Identifier), AUSF ID, security key KAMF*, UE security capabilities, and Count.

Figure 30:
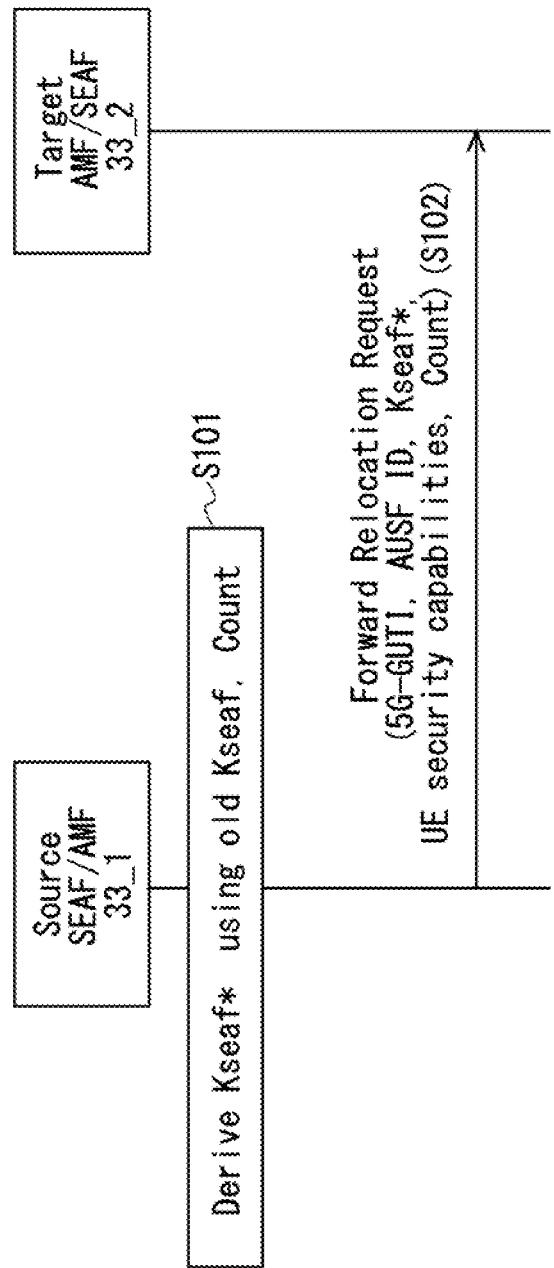
FIG. 30 is a diagram showing a procedure for deriving a security key KAMF* during a handover according to the third example embodiment.

A procedure for deriving a security key KSEAF* during a handover will be described below with reference to FIG. 30.

Figure 31:
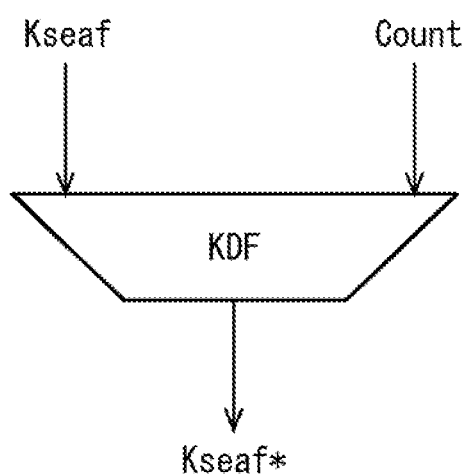
FIG. 31 is a diagram showing derivation of a security key according to the third example embodiment.

First, a Source AMF 33_1 derives a security key KSEAF* using an old security key KSEAF and a Count (S101). For example, as shown in FIG. 31, when the old security key KSEAF and the Count are input a KDF, the security key KSEAF* is derived.

Next, the Source AMF 33_1 transmits a Forward Relocation Request to a Target AMF 33_2 (S102). The Forward Relocation Request includes 5G-GUTI, AUSF ID, security key KSEAF*, UE security capabilities, and Count.

Figure 32:
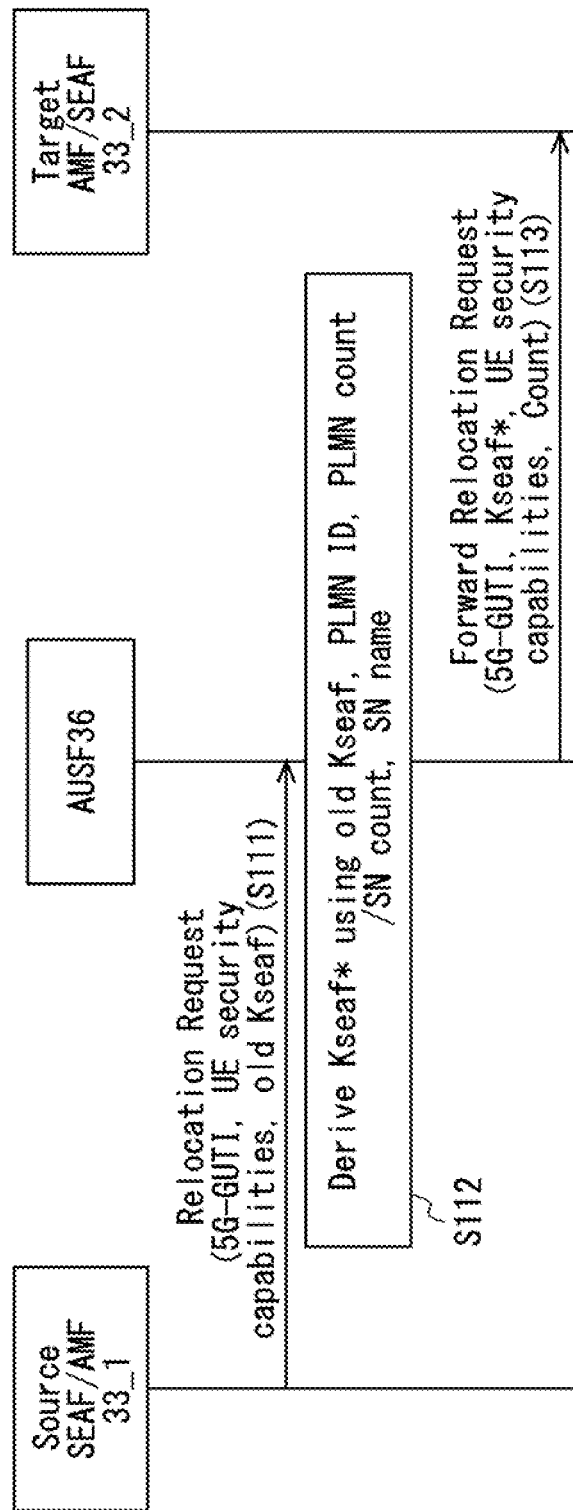
FIG. 32 is a diagram showing a procedure for deriving a security key KAMF* during a handover according to the third example embodiment.

A procedure for deriving a security key KSEAF* during a handover will be described below with reference to FIG. 32, the procedure being different from that in FIG. 30.

Figure 33:
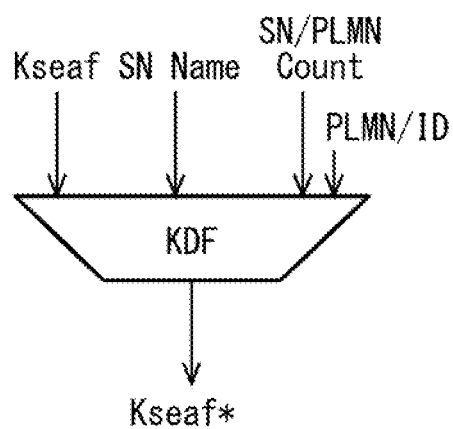
FIG. 33 is a diagram showing derivation of a security key according to the third example embodiment.

First, a Source AMF 33_1 transmits a Relocation Request to an AUSF 36 (S111). The Relocation Request includes 5G-GUTI, UE security capabilities, and old security key KSEAF. Next, the AUSF 36 derives a security key KSEAF* using old security key KSEAF, PLMN ID, PLMN count or SN count, and SN name (S112). For example, as shown in FIG. 33, when the old security key KSEAF, PLMN ID, PLMN count or SN count, and SN name are input to a KDF, the security key KSEAF* is derived.

Next, the AUSF 36 transmits a Forward Relocation Request to a Target AMF 33_2 (S113). The Forward Relocation Request includes 5G-GUTI, security key KSEAF*, UE security capabilities, and Count.

Figure 34:
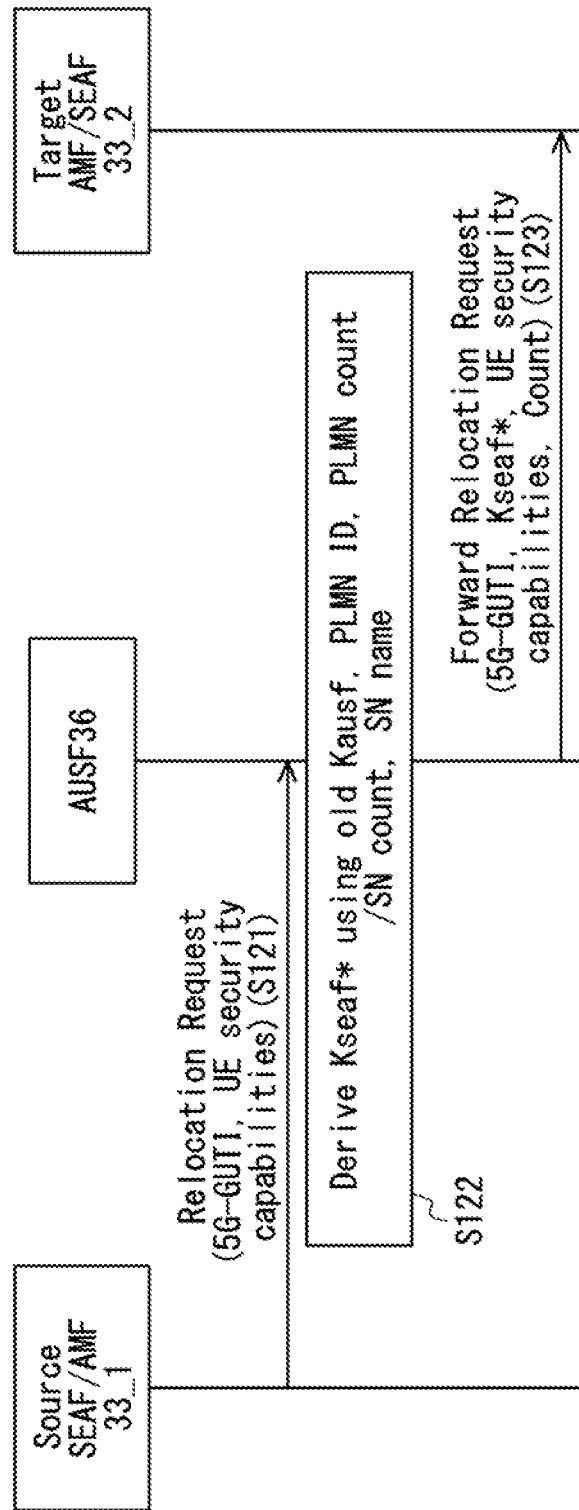
FIG. 34 is a diagram showing a procedure for deriving a security key KAMF* during a handover according to the third example embodiment.

A procedure for deriving a security key KSEAF* during a handover will be described below with reference to FIG. 34, the procedure being different from that in FIG. 32.

Figure 35:
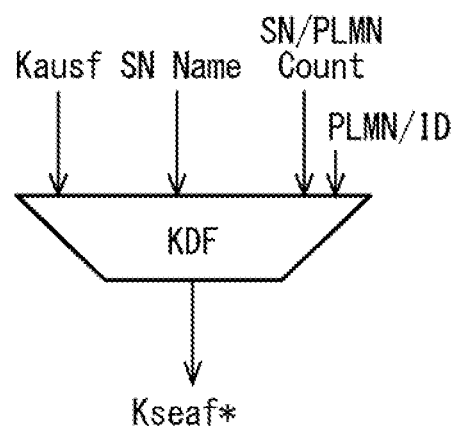
FIG. 35 is a diagram showing derivation of a security key according to the third example embodiment.

First, a Source AMF 33_1 transmits a Relocation Request to an AUSF 36 (S121). The Relocation Request includes 5G-GUTI and UE security capabilities. Next, the AUSF 36 derives a security key KSEAF* using old security key KAUSF, PLMN ID, PLMN count or SN count, and SN name (S122). For example, as shown in FIG. 35, when the old security key KAUSF, PLMN ID, PLMN count or SN count, and SN name are input to a KDF, the security key KSEAF* is derived.

Next, the AUSF 36 transmits a Forward Relocation Request to a Target AMF 33_2 (S123). The Forward Relocation Request includes 5G-GUTI, security key KSEAF*, UE security capabilities, and Count.

Figure 36:
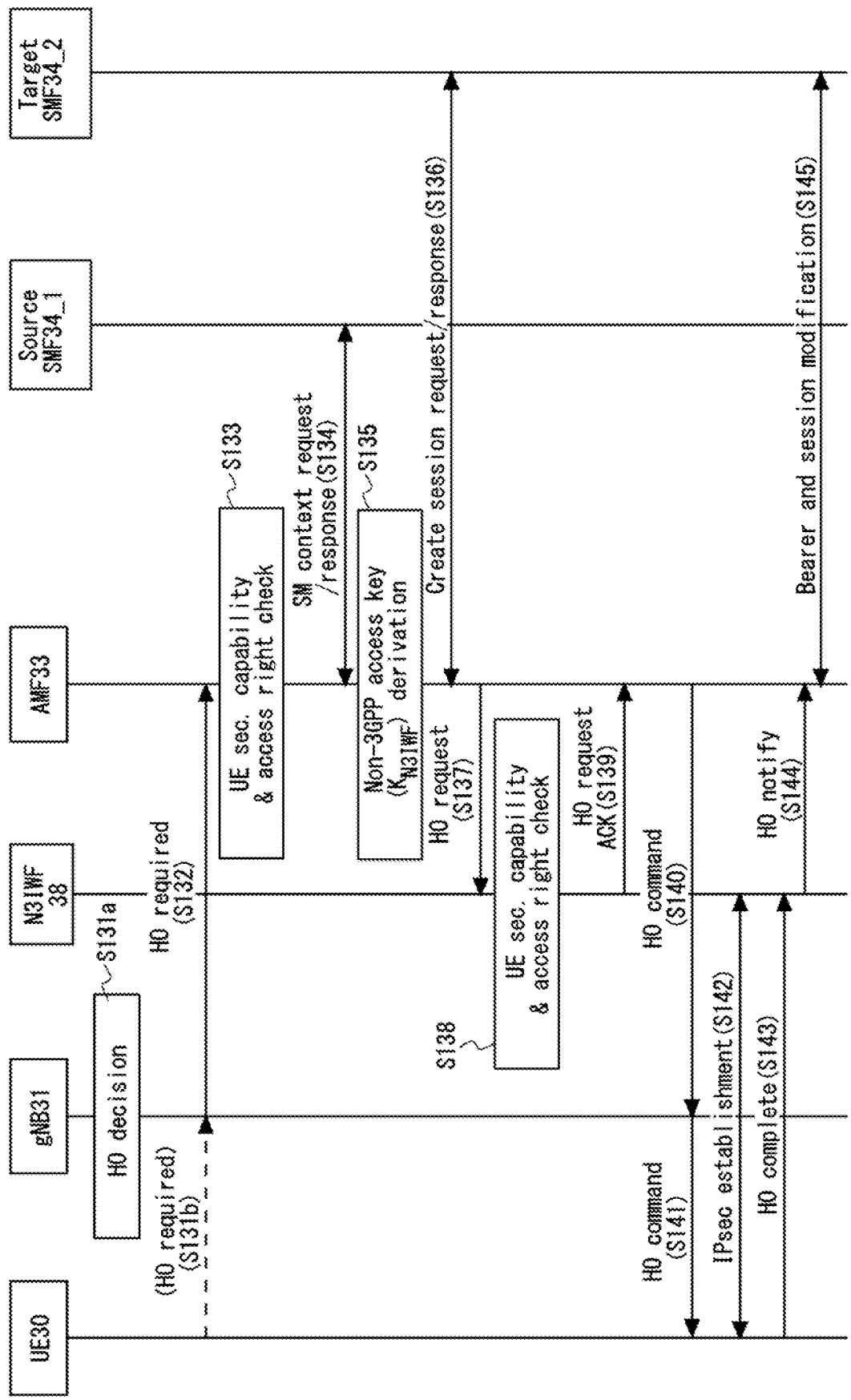
FIG. 36 is a diagram showing a flow of handover processing according to the third example embodiment.

A processing flow of Handover intra PLMN from 3GPP to non-3GPP access will be described below with reference to FIG. 36. First, a gNB 31 generates a HO required message when determining to start HO (Handover) (S131a). The HO required message includes UE's identity and UE's capabilities such as GUTI. Here, when the UE 30 determines to start the HO, the UE 30 may transmit the HO required message to the gNB 31 (S131b). The HO required message in this case also includes UE's identity and UE's capabilities such as GUTI. The HO required message transmitted by the UE 30 is protected by a NAS security established in 3GPP Access. Further, the HO required message includes identification information of an N3IWF to which the UE 30 is connected or was connected in the past.

Next, the gNB 31 transmits the HO required message to the AMF 33 (S132). An AMF relocation may be executed based on a normal HO procedure. Next, the AMF 33 checks whether the UE's capabilities are valid to determine whether to transmit the HO request (S133). The UE's capabilities includes security capabilities and access right to a N3IWF 38.

Next, the AMF 33 request a Source SMF 34_1 to provide an SM (Session Management) context, and the Source SMF 34_1 provides the SM context to the AMF 33 (S134). When the UE 30 includes multiple sessions, the AMF 33 requests a plurality of SMFs to provide an SM context.

Next, the AMF 33 derives a security key KN3IWF related to Non-3GPP Access (S135). The security key KN3IWF is transmitted to the N3IWF 38. Next, the AMF 33 transmits a Create session request to a Target SMF 34_2 based on the received SM context. Further, the Target SMF 34_2 allocates resources for the session and transmits a Create session response to the AMF 33 (S136).

Subsequently, the AMF 33 transmits the HO request to the N3IWF 38 (S137). The AMF 33 may select the N3IWF 38 based on the identification information transmitted from the UE 30. The HO request may include information on session and bearer establishment. In addition, the HO request may include a security context, security key identification information (KSI or KSI Set Identifier), information indicating whether required security configurations are necessary, and an algorithm to be used. The security configurations may be information on integrity protection and encryption.

Next, the N3IWF 38 may check whether the UE's capabilities and the access right are valid to determine whether the relocation request can be accepted (S138).

Next, the N3IWF 38 allocates resources necessary for bearer establishment and transmits a HO request ACK to the AMF 33 (S139). Next, the AMF 33 transmits a HO command to the gNB 31 (S140). The HO command includes security configurations. The gNB 31 transmits the HO command to the UE 30 (S141). The gNB 31 removes the security context used in the 3GPP Access.

Subsequently, an IPsec is established between the UE 30 and the N3IWF 38 (S142). Subsequently, the UE 30 transmits a HO complete to the N3IWF 38 (S143). Then, the N3IWF 38 transmits a HO notify to the AMF 33 (S144). Next, Bearer and session modification is executed between the AMF 33 and the Target SMF 34_2 and Target UPF (S145).

Figure 37:
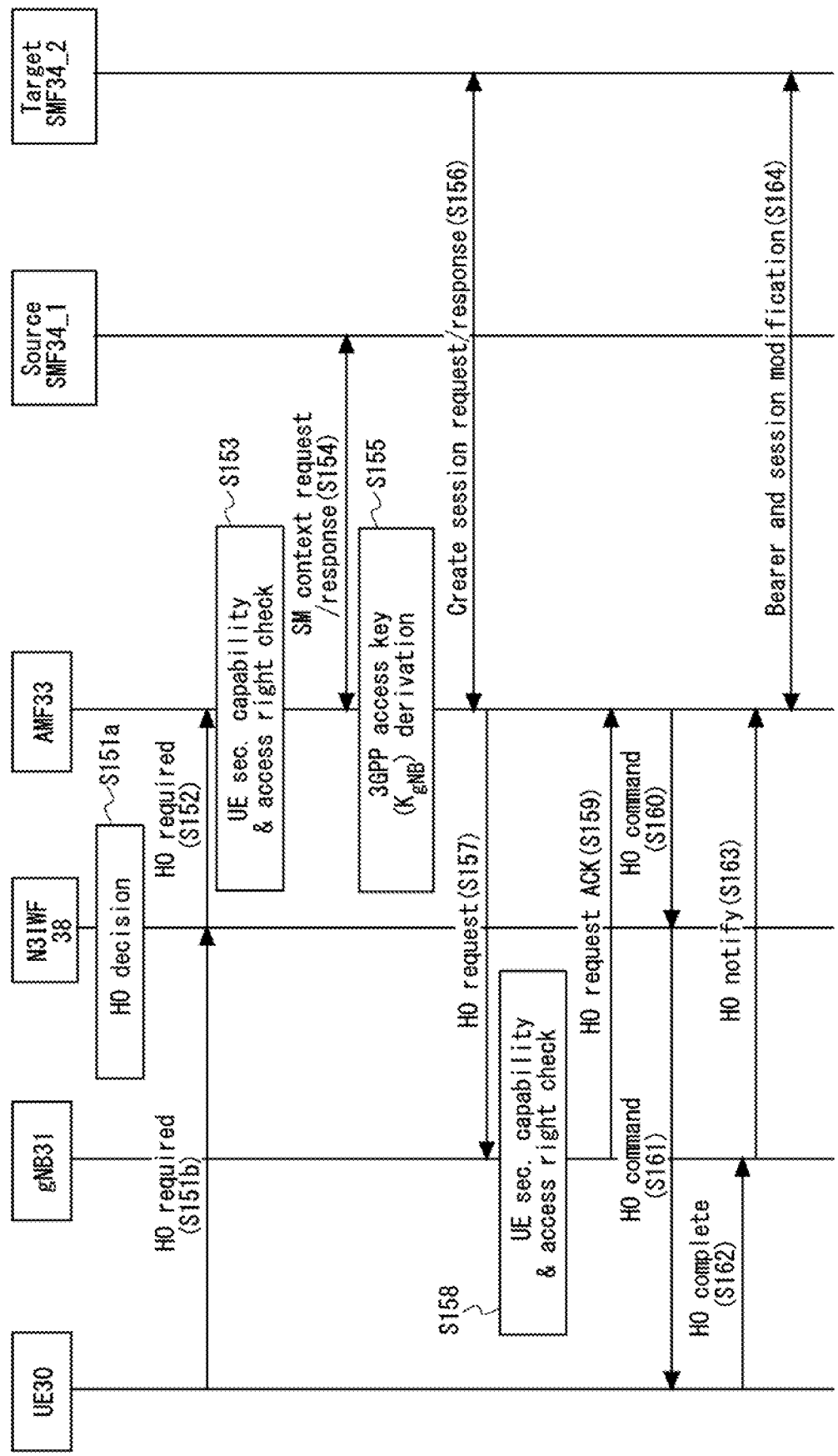
FIG. 37 is a diagram showing a flow of handover processing according to the third example embodiment.

A processing flow of Handover intra PLMN from 3GPP to non-3GPP access different from that of FIG. 36 will be described below with reference to FIG. 37. In FIG. 37, the process executed by the gNB 31 and the process executed by the N3IWF 38 in FIG. 36 are replaced by each other. Other processes are the same as those in FIG. 36, and the detailed description thereof will not be presented.

A flow of registration processing from 3GPP Access in PLMN1 to Non-3GPP Access in PLMN2 when there is no active connection in PLMN2 will be described below with reference to FIG. 38. The PLMN1 and the PLMN2 are different PLMNs from each other. The PLMN1 and the PLMN2 may be HPLMN or VPLMN.

First, the UE 30 transmits a Registration Request to the Target AMF 33_2 via the N3IWF 38 (S171). The Registration Request includes a 5G-GUTI/SUCI/SUPI. Further, the Registration Request includes UE security capabilities, Auth-method, AN type, Authentication restrictions, Re-auth type, AV ID, and 5G KSI.

Next, the Target AMF 33_2 transmits a 5G-AIR to the AUSF 36 (S172). The 5G-AIR includes a 5G-GUTI/SUCI/SUPI. Further, the 5G-AIR includes AV ID and SN name. Next, the AUSF 36 executes a de-concealment of SUCI with the UDM 37 to obtain a SUPI (Subscription Permanent Identifier) (S173).

Next, the AUSF 36 determines whether a sufficient number of unused AVs are available (S174). The AUSF 36 executes a process of step S176 when determining that a sufficient number of unused AVs are available. The AUSF 36 executes a process of step S175a or S175b when determining that a sufficient number of unused AVs are not available.

In step S175a, a Fast re-auth is executed using a security key KAUSF directly used as a security key KSEAF or a security key KSEAF derived from the security key KAUSF. In step S175b, the AUSF 36 executes Full authentication with the UDM 37. In step S176, a 5G-AIA Target are transmitted to the Target AMF 33_2 (S176). The 5G-AIA includes SUPI, SN name, and AVs.

Next, the Target AMF 33_2 transmits an Authentication Request to the UE 30 (S177). The Authentication Request includes RAND and AUTN. Next, the UE 30 derives a security key KSEAF (S178). Next, the UE 30 transmits an Authentication Response to the Target AMF 33_2 (S179). The Authentication Response includes RES*.

A flow of registration processing from 3GPP Access in PLMN1 to Non-3GPP Access in PLMN2 when there is no active connection in PLMN2 will be described below with reference to FIG. 39, the flow of registration processing being different from that in FIG. 38.

Figure 38:
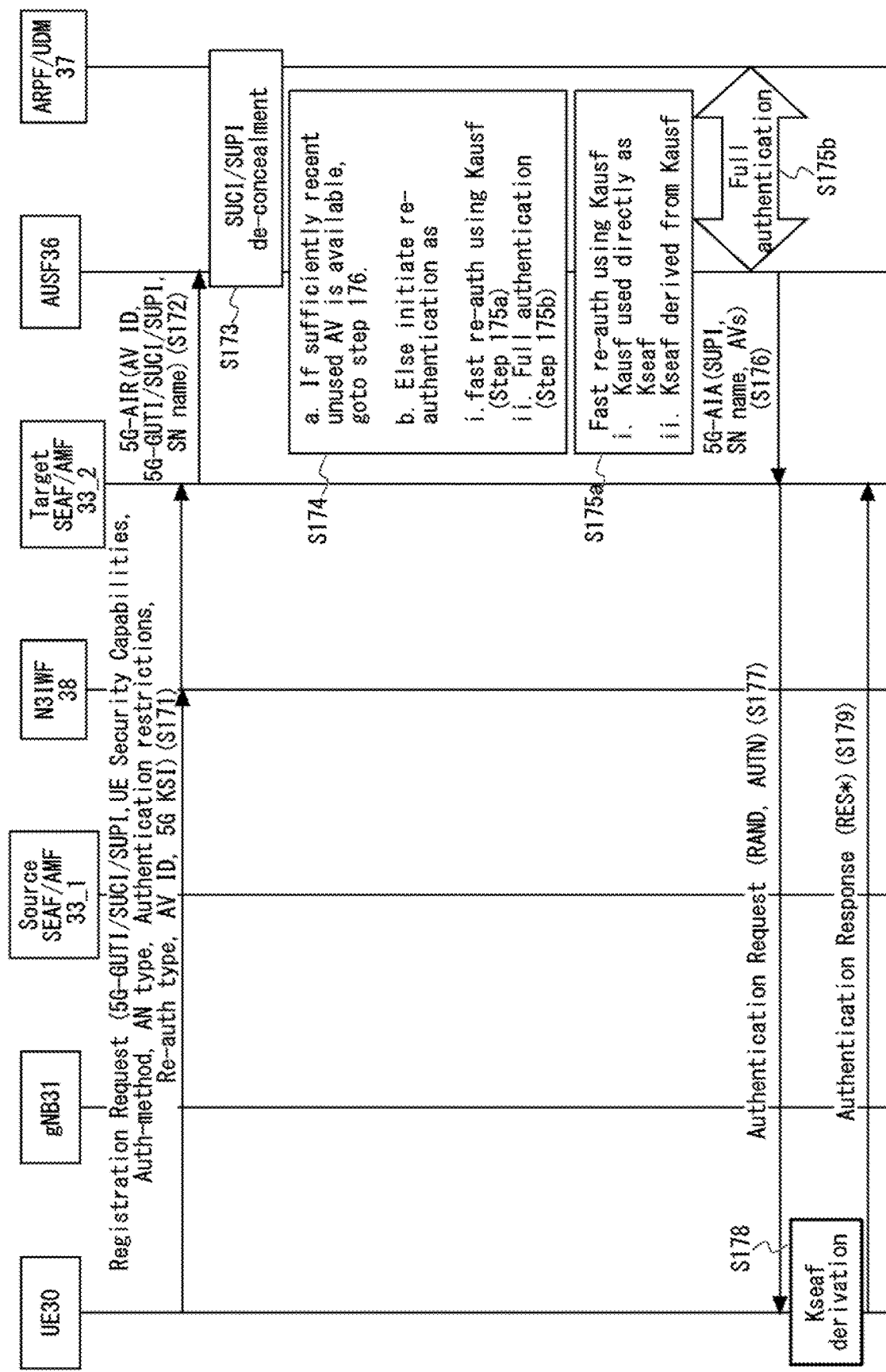
FIG. 38 is a diagram showing a flow of handover processing according to the third example embodiment.

Step S181 is the same as step S171 in FIG. 38, and thus the detailed description thereof will not be presented. Next, the Target AMF 33_2 checks a UE identity (S182). Next, the Target AMF 33_2 transmits a UE identification Request to the Source AMF 33_1 (S183). The UE identification Request includes a 5G-GUTI/SUCI/SUPI. Next, the Source AMF 33_1 transmits a UE identification Response to the Target AMF 33_2 (S184). The UE identification Response includes a 5G-GUTI/SUCI/SUPI and AUSF ID. Subsequent processes are the same as the rest of the procedure from step S172 in FIG. 38, and thus the detailed description thereof will not be presented.

Figure 40:
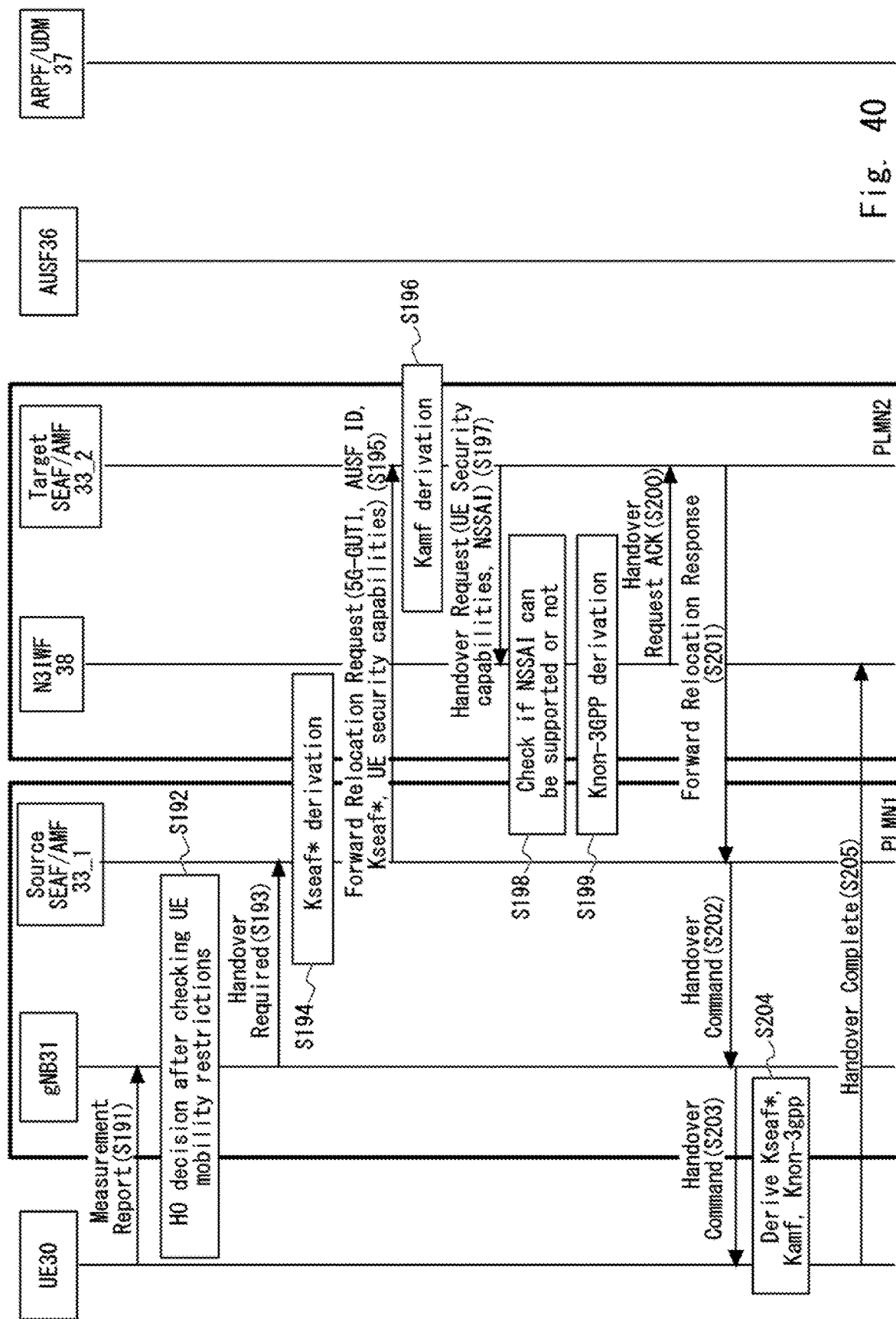
FIG. 40 is a diagram showing a flow of handover processing according to the third example embodiment.

A flow of handover from 3GPP Access in PLMN1 to Non-3GPP Access in PLMN2 when there is no active connection in PLMN2 will be described below with reference to FIG. 40. FIG. 40 shows processing in PLMN1 and processing in PLMN2.

First, the UE 30 transmits a Measurement Report to the gNB 31 (S191). Next, the gNB 31 determines to execute HO after checking UE mobility restrictions (S192). Next, the gNB 31 transmits a Handover Required to the Source AMF 33_1 (S193). Then, the Source AMF 33_1 derives a security key KSEAF* (S194). Next, the Source AMF 33_1 transmits a Forward Relocation Request to the Target AMF 33_2 (S195). The Forward Relocation Request includes 5G-GUTI, AUSF ID, security key KSEAF*, and UE security capabilities.

Next, the Target AMF 33_2 derives a security key KAMF (S196). Next, the Target AMF 33_2 transmits a Handover Request to the N3IWF 38 (S197). The Handover Request includes UE security capabilities and NSSAI.

Next, the N3IWF 38 checks whether the NSSAI is supported in the UE 30 (S198). Next, the N3IWF 38 derives a security key Knon-3gpp (S199). Next, the N3IWF 38 transmits a Handover Request Ack to the Target AMF 33_2 (S200). Then, the Target AMF 33_2 transmits a Forward Relocation Response to the Source AMF 33_1 (S201). Next, the Source AMF 33_1 transmits a Handover Command to the gNB 31 (S202). Next, the gNB 31 transmits a Handover Command to the UE 30 (S203).

Subsequently, the UE 30 derives security keys KSEAF*, KAMF, and Knon-3gpp (S204). Next, the UE 30 transmits a Handover Complete to the N3IWF 38 (S205).

Figure 41:
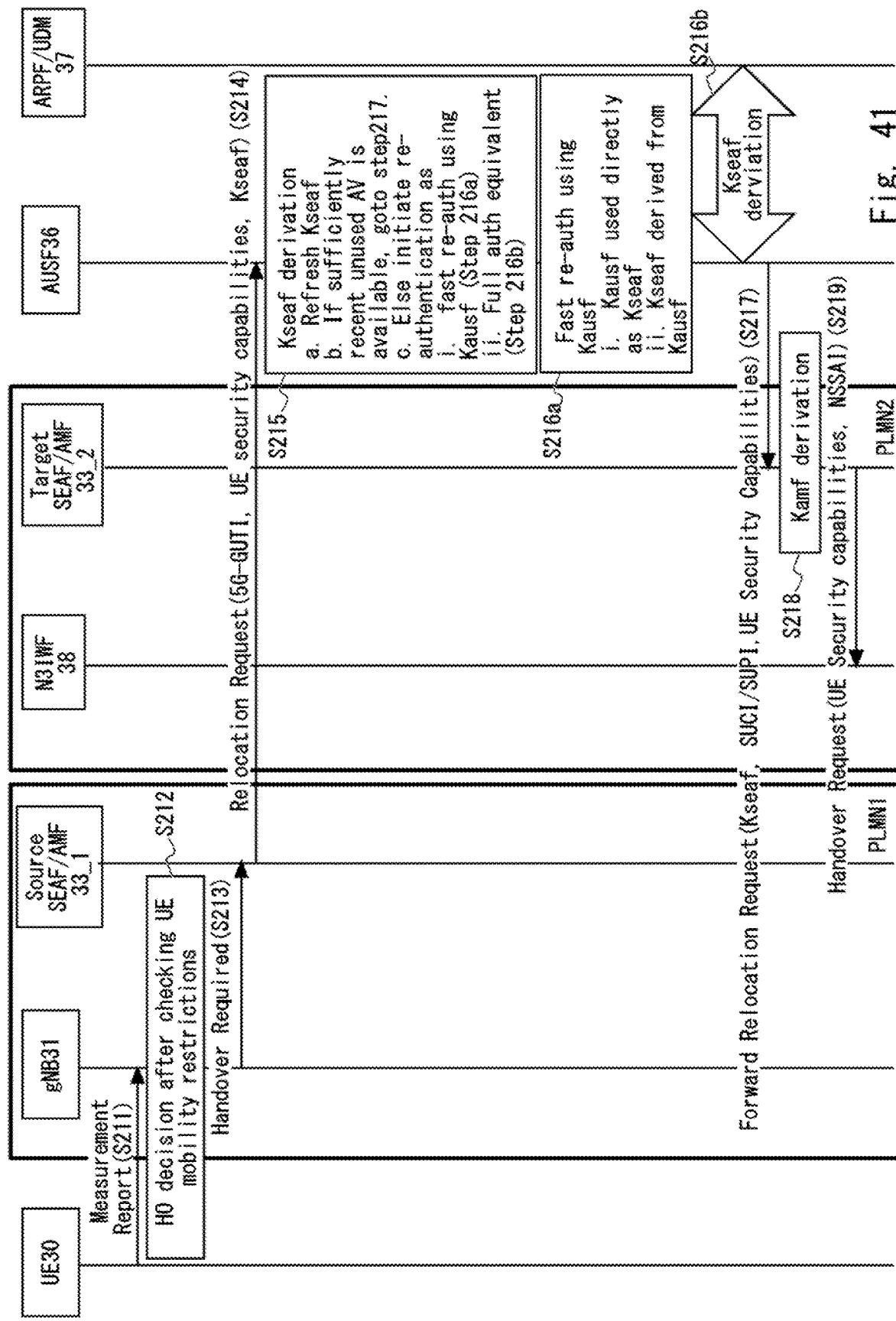
FIG. 41 is a diagram showing a flow of handover processing according to the third example embodiment.

A flow of handover from 3GPP Access in PLMN1 to Non-3GPP Access in PLMN2 when there is no active connection in PLMN2 will be described below with reference to FIGS. 41 and 42, the flow of handover being different from that in FIG. 40. FIG. 41 shows processing in PLMN1 and processing in PLMN2.

Steps S211 to S213 are the same as steps S191 to S193 in FIG. 40, and the detailed description thereof will not be presented. Next, the Source AMF 33_1 transmits a Relocation Request to the AUSF 36 (S214). The Relocation Request includes a 5G-GUTI, UE security capabilities, and a security key KSEAF.

Next, the AUSF 36 derives a security key KSEAF in step S215. Here, the AUSF 36 refreshes the security key KSEAF as a process a. Alternatively, the AUSF 36 executes a process b and subsequent processes. The processes b and c in step S215 and processes of step S216a and S216b are the same as the processes a and b in step S174 and the processes of step S175a and S175b in FIG. 38, and the detailed description thereof will not be presented. In step S216b, a security key KSEAF is derived instead of Full authentication.

After the process b in step 215 and after the process of step S216a or S216b, the AUSF 36 transmits a Forward Relocation Request to the Target AMF 33_2 (S217). The Forward Relocation Request includes a security key KSEAF, SUCI or SUPI, and UE security capabilities.

Next, the Target AMF 33_2 derives a security key KAMF. Next, the Target AMF 33_2 transmits a Handover Request to the N3IWF 38 (S219).

Figure 42:
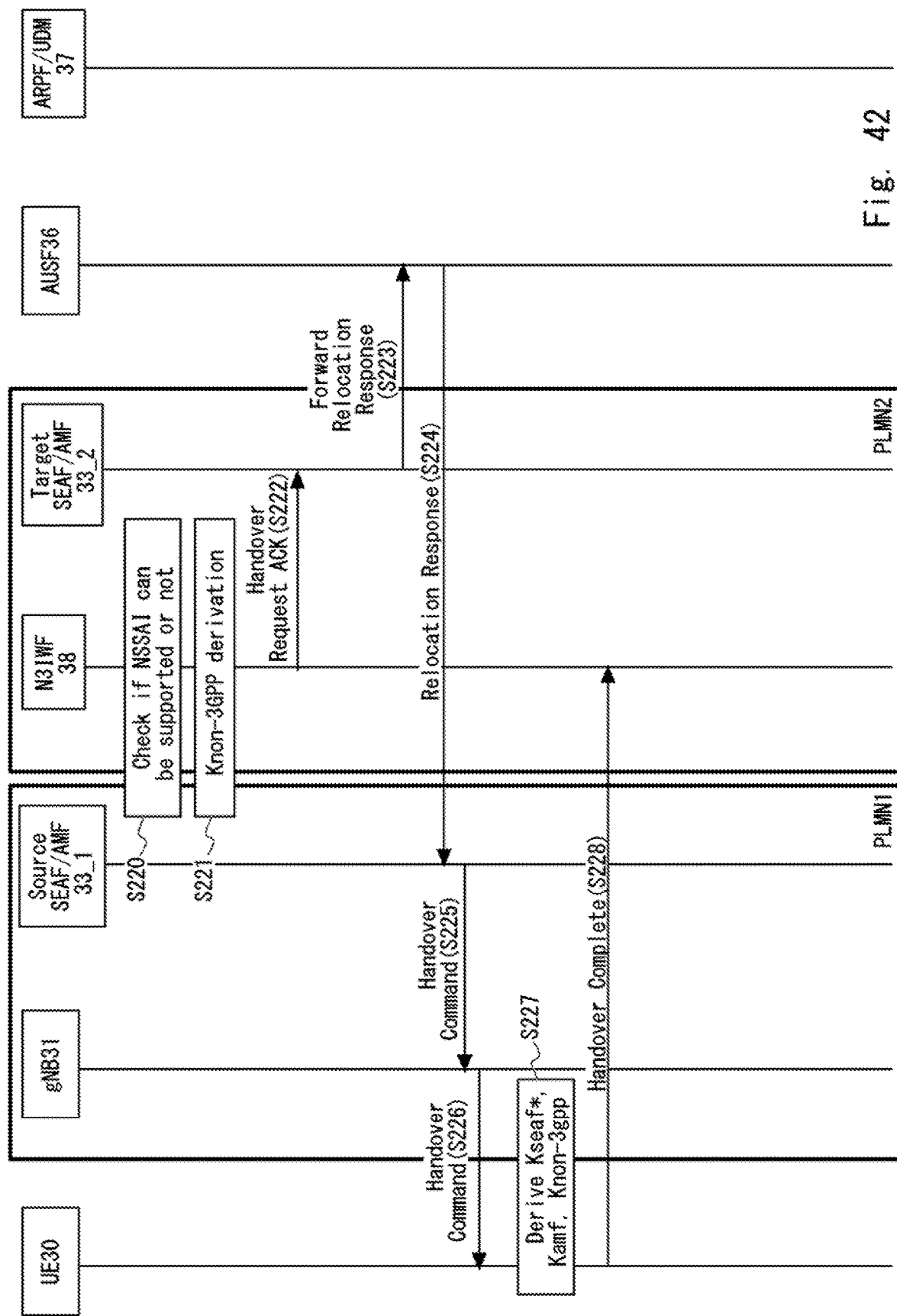
FIG. 42 is a diagram showing a flow of handover processing according to the third example embodiment.

Referring to FIG. 42, steps S220 to S222 are same as steps S198 to S200 in FIG. 40, and thus the detailed description thereof will not be presented. Next, the Target AMF 33_2 transmits a Forward Relocation Request to the AUSF 36 (S223). Next, the AUSF 36 transmits a Relocation Response to the Source AMF 33_1 (S224).

Steps S225 to S228 are the same as steps S202 to 205 in FIG. 40, and thus the detailed description thereof will not be presented.

A flow of handover from 3GPP Access in PLMN1 to Non-3GPP Access in PLMN2 when an active connection exists in PLMN2 will be described below with reference to FIG. 43. Further, a gNB in PLMN1 is defined as a gNB 31_1, and gNB in PLMN2 is defined as a gNB 31_2.

Steps S231 to S234 are the same as steps S211 to S214 in FIG. 41, and thus the detailed description thereof will not be presented. However, in step S234, a Relocation Request includes a 5G-GUTI/SUCI/SUPI, UE security capabilities, and a security key KSEAF.

Next, the AUSF 36 executes de-concealment of SUCI to obtain an SUPI (Subscription Permanent Identifier) (S235). Next, the AUSF 36 retrieves a security key KSEAF or derives a security key KSEAF* to use as a new security key KSEAF (S236).

Next, the AUSF 36 transmits a Forward Relocation Request to the Target AMF 33_2 (S237). The Forward Relocation Request includes a new security key KSEAF, SUCI or SUPI, and UE security capabilities.

Next, the Target AMF 33_2 derives a security key KAMF (S238). Next, the Target AMF 33_2 derives a security key Knon-3gpp (S239). Steps S240 to S248 are the same as step S219 in FIG. 41 and steps S220 and S222 to S228 in FIG. 42, and thus the detailed description thereof will not be presented.

A flow of handover from 3GPP Access in PLMN1 to Non-3GPP Access in PLMN2 when an active connection exists in PLMN2 will be described below with reference to FIG. 44, the flow of handover being different from that in FIG. 43.

Steps S251 to S255 are the same as steps S191 to S195 in FIG. 40, and thus the detailed description thereof will not be presented. However, in step S255, a Forward Relocation Request includes a 5G-GUTI/SUCI/SUPI, AUSF ID, UE security capabilities, and a security key KSEAF*.

Next, the Target AMF 33_2 retrieves a security context corresponding to SUPI or SUCI (S256). Next, the Target AMF 33_2 derives a security key Knon-3gpp (S257).

Steps S258 to S265 are the same as steps S197, S198, and S200 to S205 in FIG. 40, and thus the detailed description thereof will not be presented.

Figure 45:
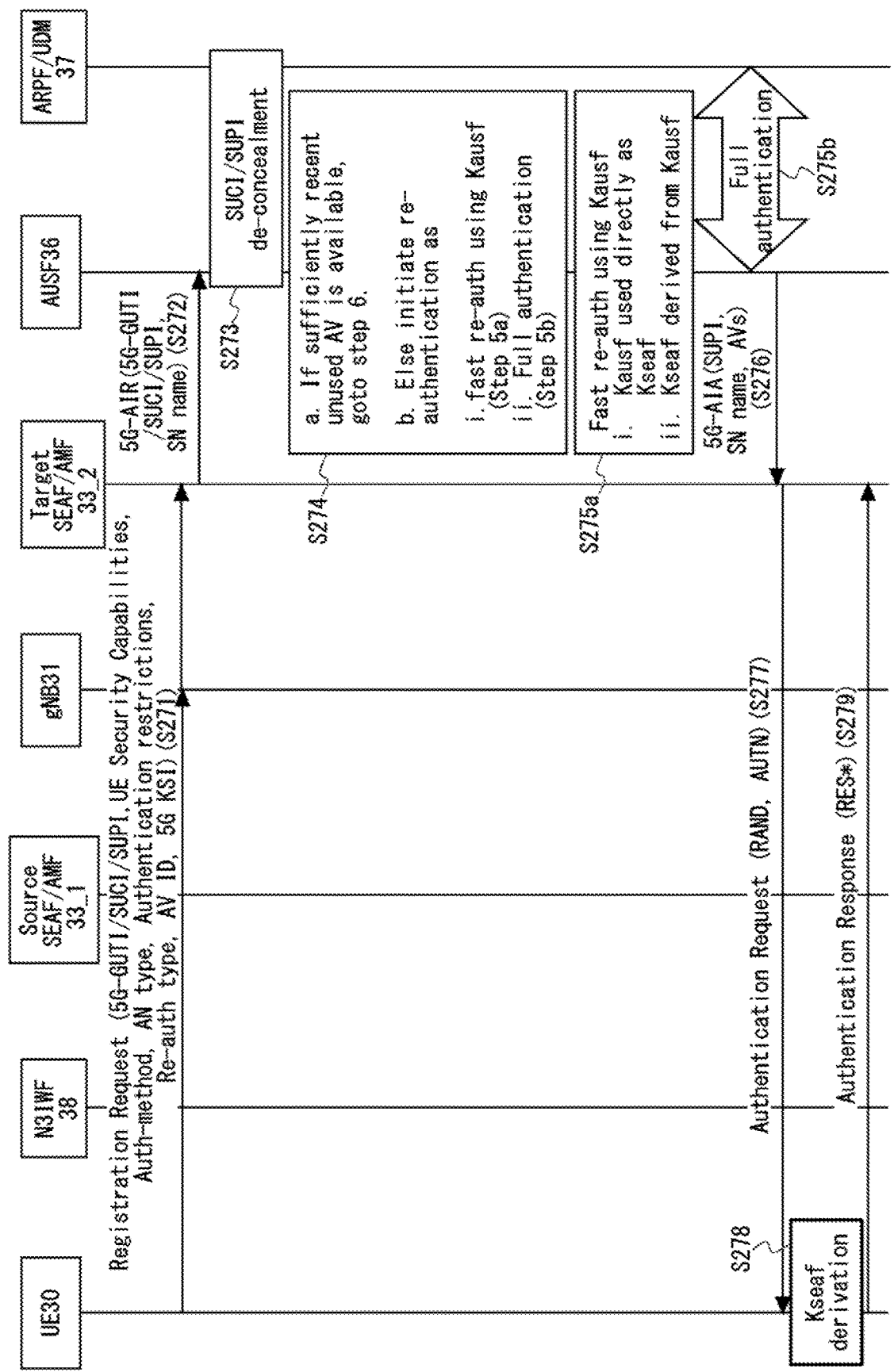
FIG. 45 is a diagram showing a flow of handover processing according to the third example embodiment.

A flow of registration processing from Non-3GPP Access in PLMN1 to 3GPP Access in PLMN2 when there is no active connection in PLMN2 will be described below with reference to FIG. 45.

In FIG. 38, the UE 30 transmits the Registration Request to the Target AMF 33_2 via the N3IWF 38. In contrast, the UE 30 transmits a Registration Request to the Target AMF 33_2 via the gNB 31 in step S271 in FIG. 45. Steps S272 to step S279 are the same as steps S172 to S179 in FIG. 38, and thus the detailed description thereof will not be presented.

Figure 46:
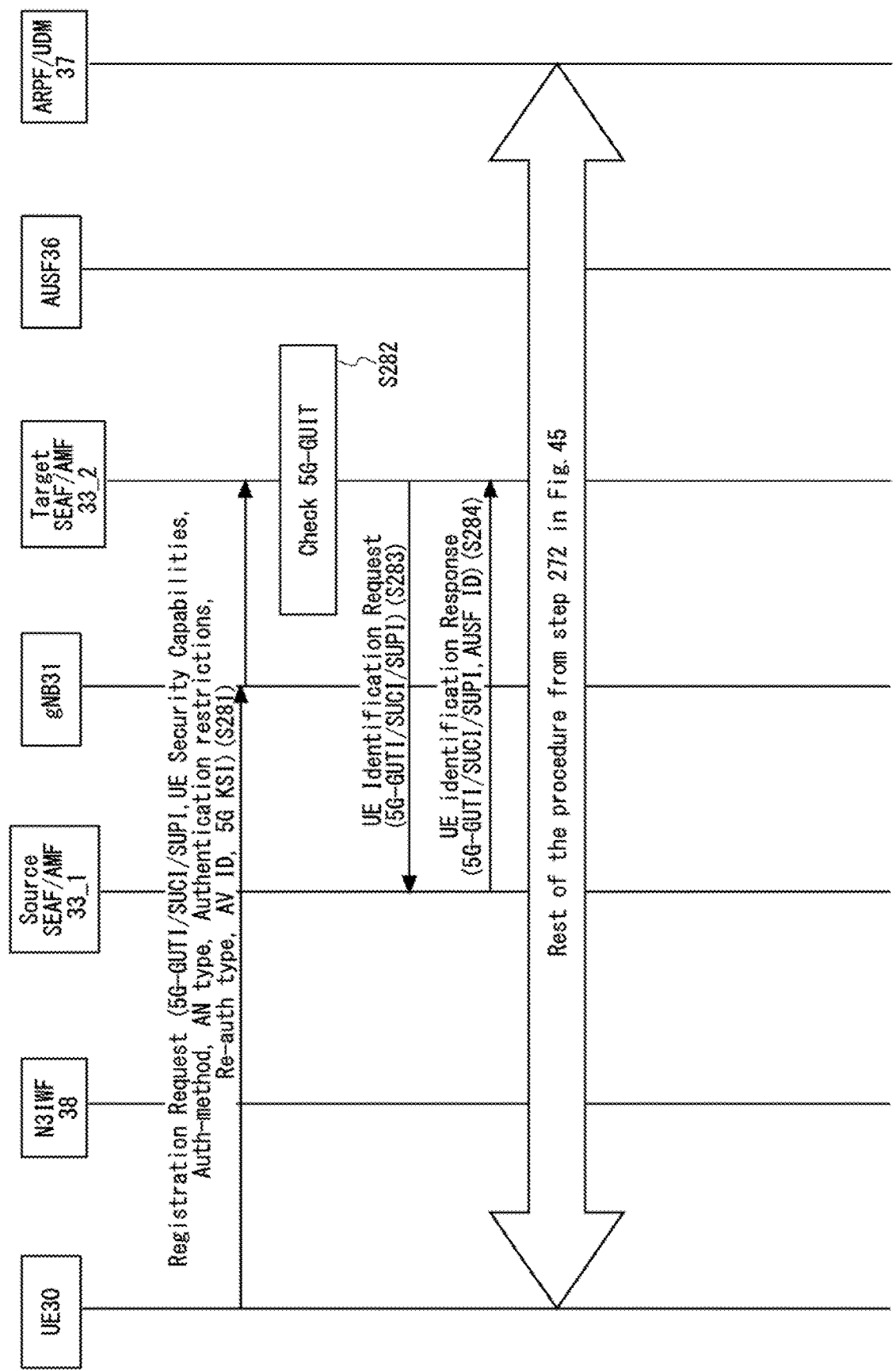
FIG. 46 is a diagram showing a flow of handover processing according to the third example embodiment.

A flow of registration processing from Non-3GPP Access in PLMN1 to 3GPP Access in PLMN2 when there is no active connection in PLMN2 will be described below with reference to FIG. 46, the flow of registration processing being different from that in FIG. 45.

Figure 39:
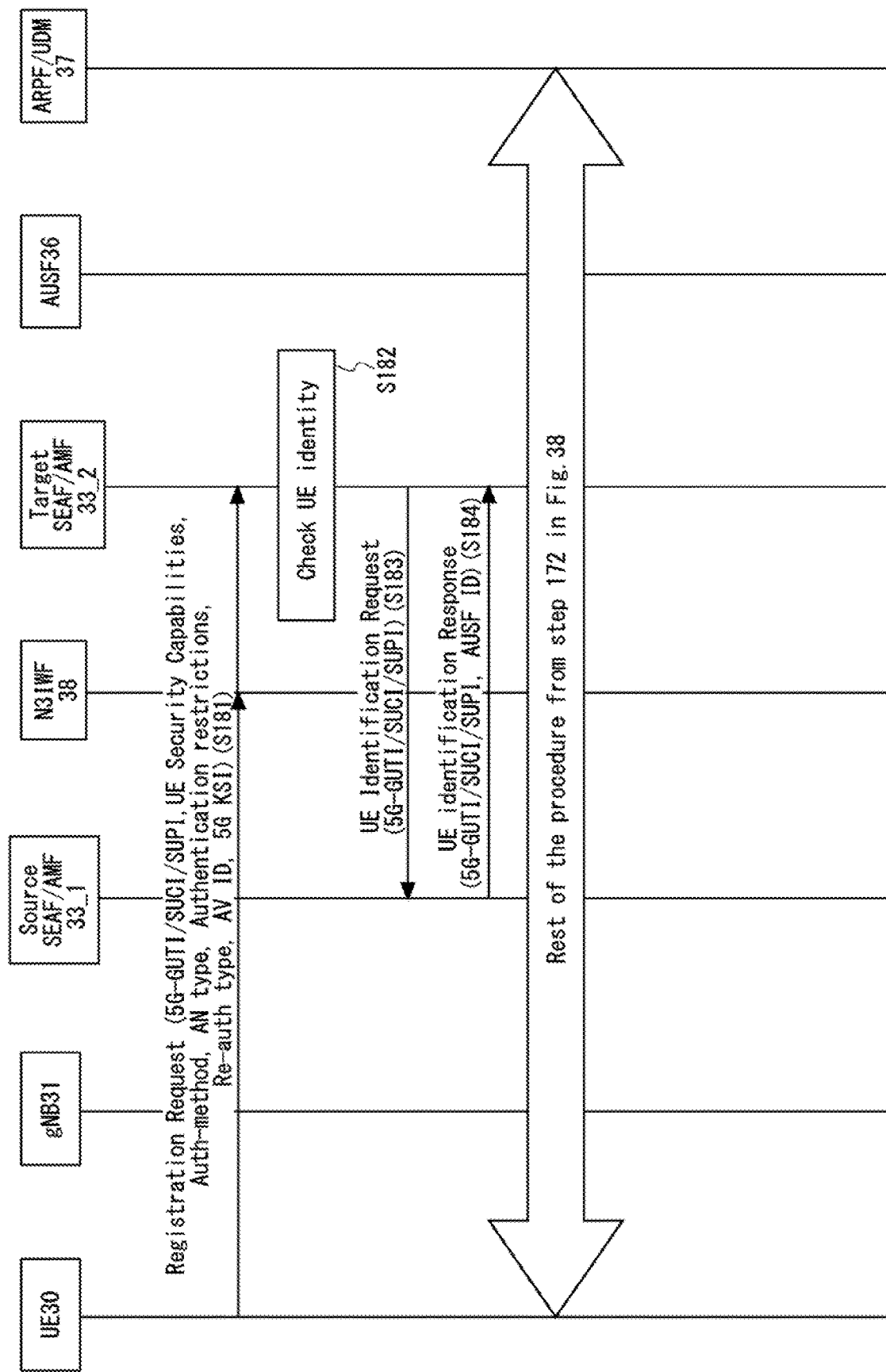
FIG. 39 is a diagram showing a flow of handover processing according to the third example embodiment.

In FIG. 39, the UE 30 transmits the Registration Request to the Target AMF 33_2 via the N3IWF 38. In contrast, the UE 30 transmits a Registration Request to the Target AMF 33_2 via the gNB 31 in step S281 in FIG. 46. Next, the Target AMF 33_2 checks a 5G-GUTI (S282). The rest of the procedure from step S283 are the same as the rest of the procedure from step S183 in FIG. 39, and thus the detailed description thereof will not be presented.

Figure 47:
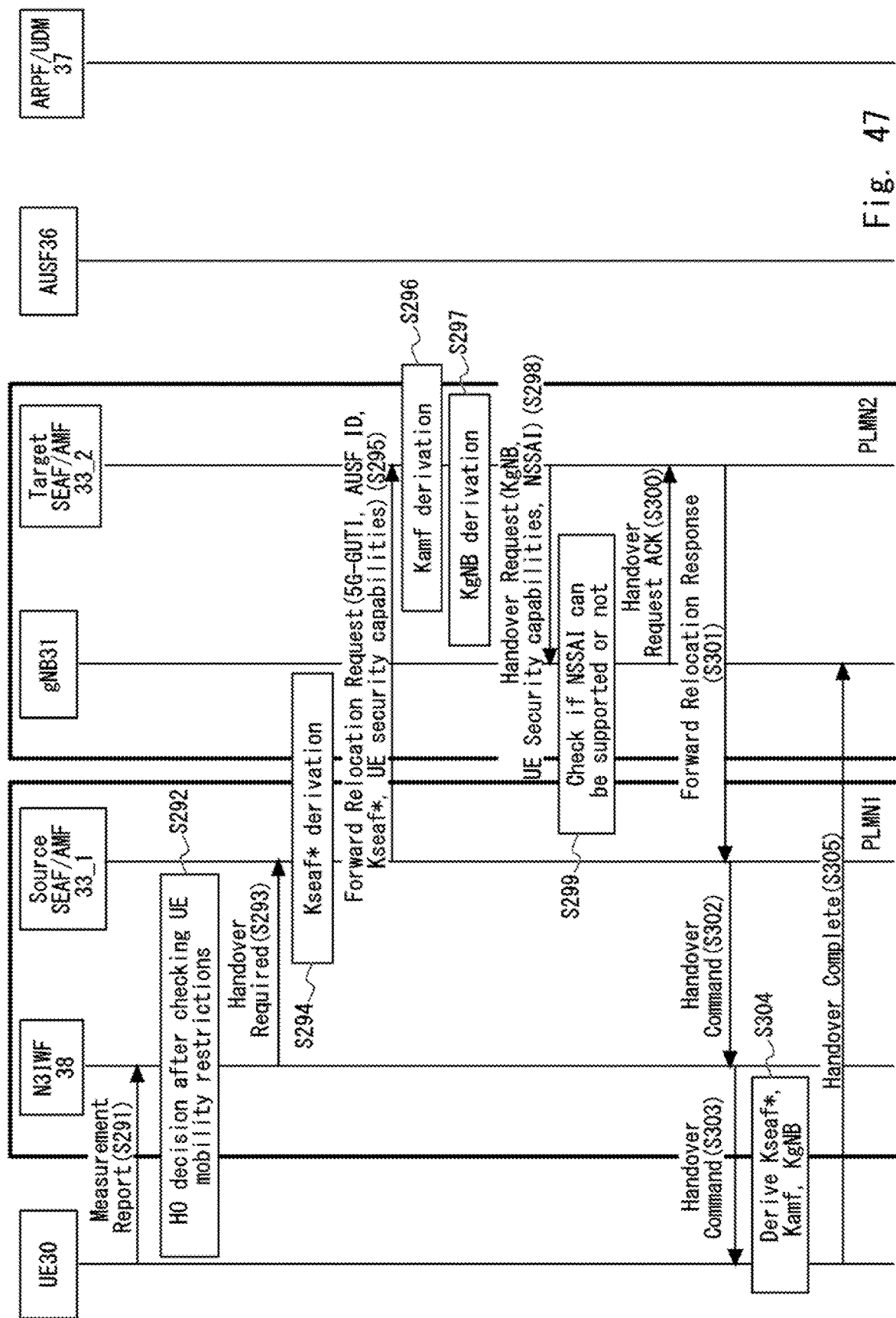
FIG. 47 is a diagram showing a flow of handover processing according to the third example embodiment.

A flow of handover from Non-3GPP Access in PLMN1 to 3GPP Access in PLMN2 when there is no active connection in PLMN2 will be described below with reference to FIG. 47.

Steps S291 to S295 are the same as steps S251 to S255 in FIG. 40, and thus the detailed description thereof will not be presented. However, the gNB 31 in FIG. 40 is replaced with a N3IWF 38 in FIG. 47, and the N3IWF 38 in FIG. 40 is replaced with a gNB 31 in FIG. 47. In addition, a Forward Relocation Request transmitted in step S295 includes a 5G-GUTI, an AUSF ID, a security key KSEAF*, and UE security capabilities.

Next, the Target AMF 33_2 derives a security key KAMF (S296). Next, the Target AMF 33_2 derives a security key KgNB (S297). Steps S298 to S305 are the same as steps S197, S198, and S200 to S205 in FIG. 40, and thus the detailed description thereof will not be presented.

Figure 48:
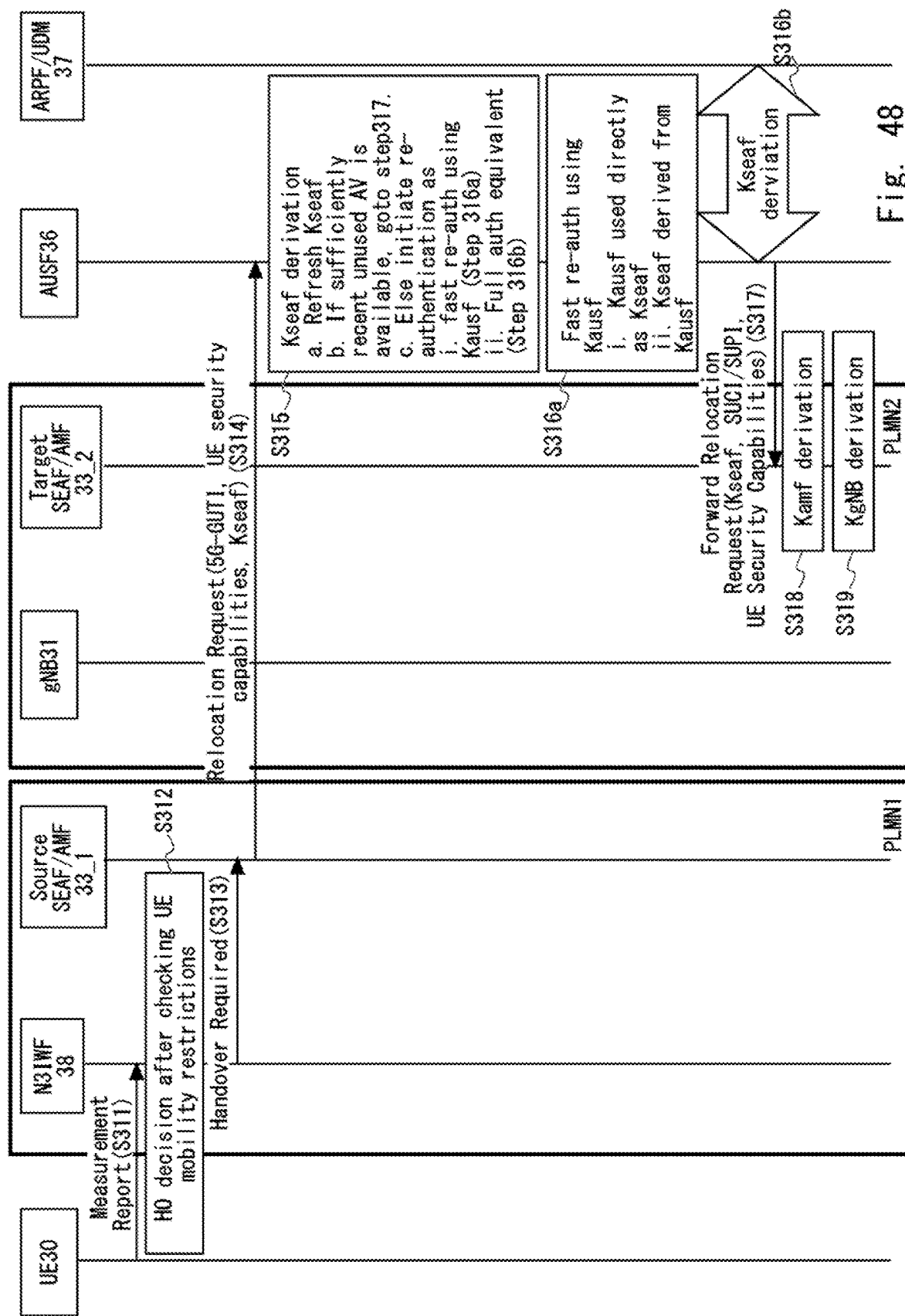
FIG. 48 is a diagram showing a flow of handover processing according to the third example embodiment.
Figure 49:
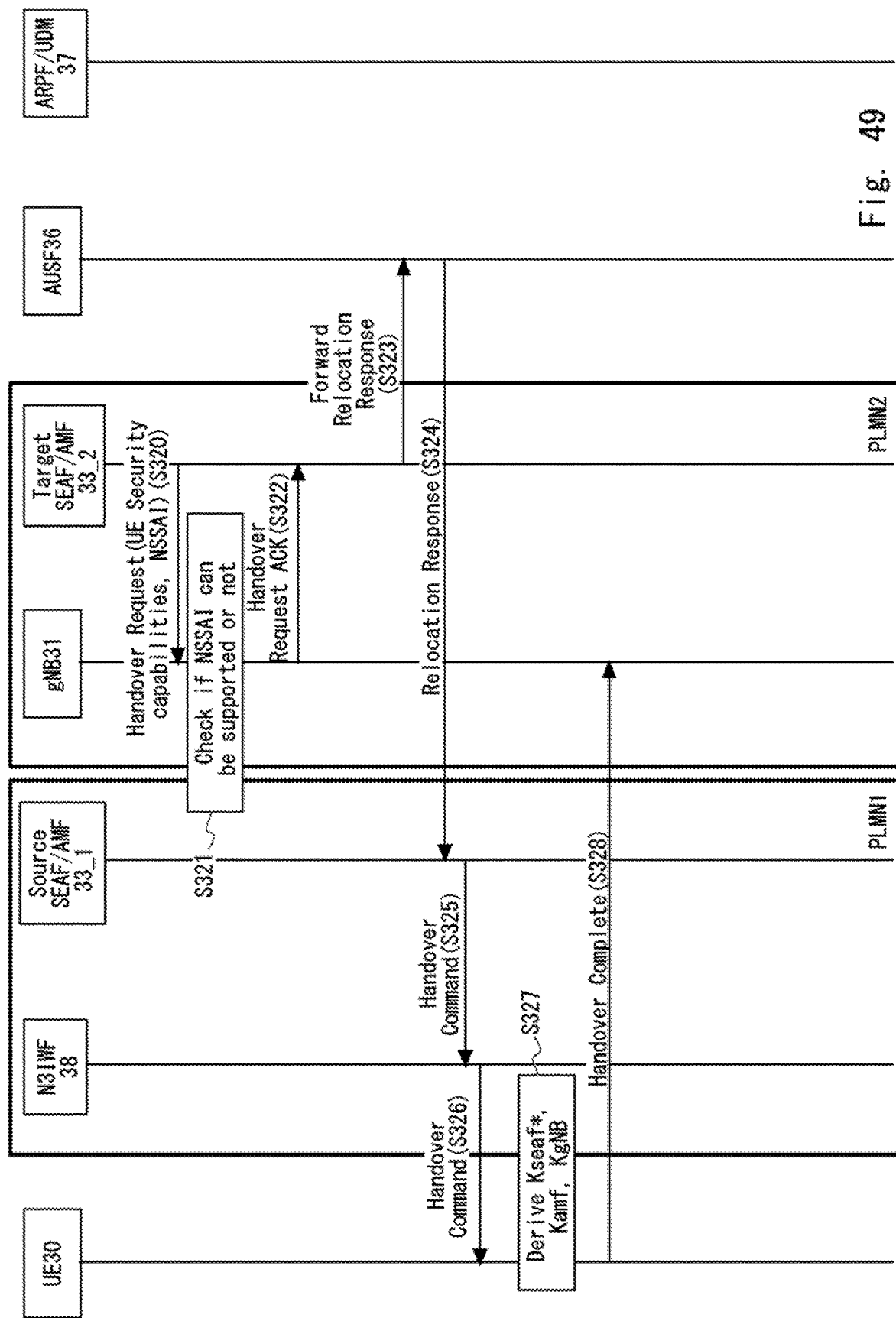
FIG. 49 is a diagram showing a flow of handover processing according to the third example embodiment.

A flow of handover from Non-3GPP Access in PLMN1 to 3GPP Access in PLMN2 when there is no active connection in PLMN2 will be described below with reference to FIGS. 48 and 49, the flow of handover being different from that in FIG. 47.

Steps S311 to S318 are the same as steps S211 to S218 in FIG. 41, and thus the detailed description thereof will not be presented. However, the gNB 31 in FIG. 41 is replaced with an N3IWF 38 in FIG. 48, and the N3IWF 38 in FIG. 41 is replaced with a gNB 31 in FIG. 48.

Next, the Target AMF 33_2 derives a security key KgNB (S319). Next, referring to FIG. 49, steps S320 to S328 are the same as step S219 in FIG. 41, step S220 in FIG. 42, and steps S222 to S228 in FIG. 42, and thus the detailed description thereof will not be presented.

Figure 50:
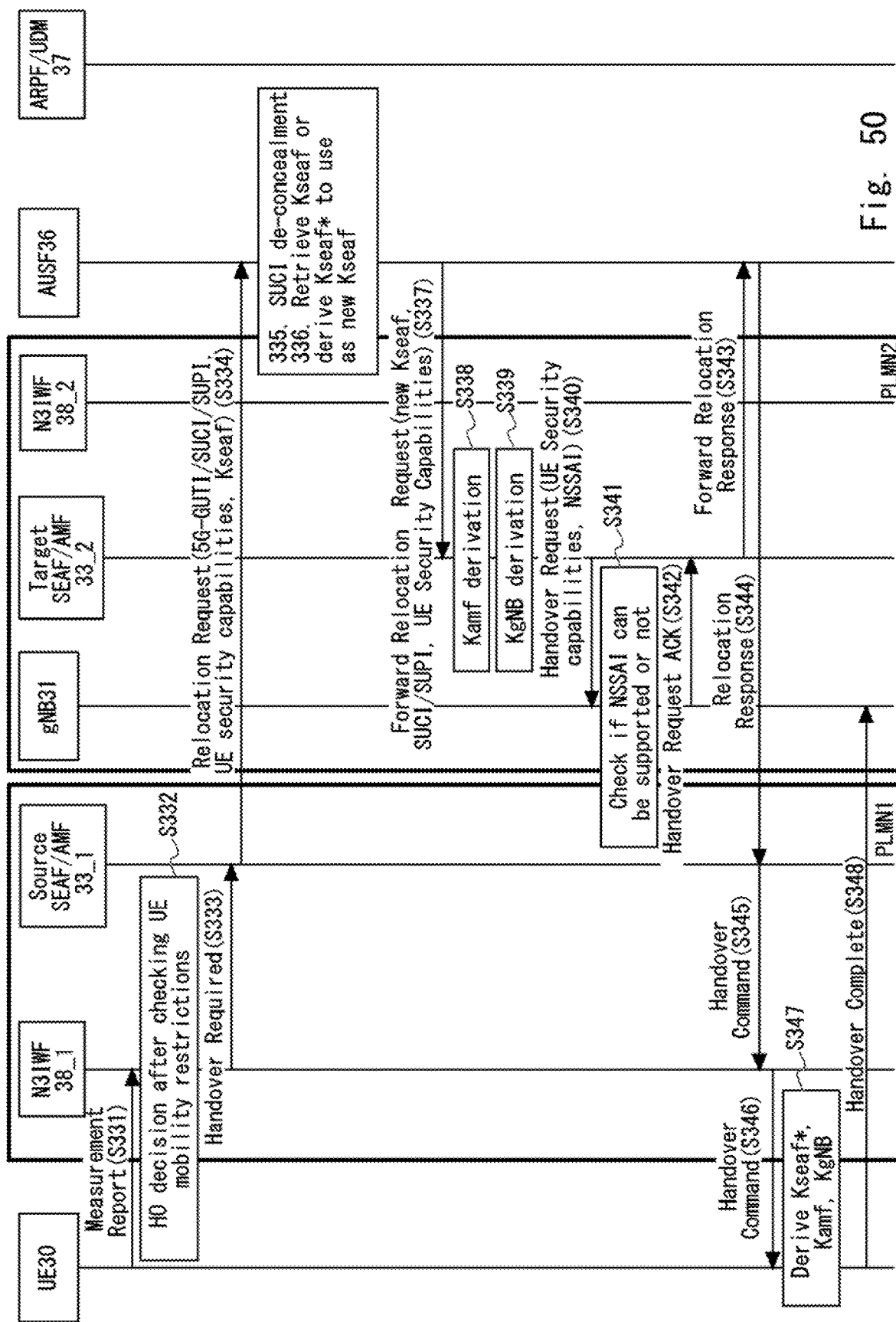
FIG. 50 is a diagram showing a flow of handover processing according to the third example embodiment.

A flow of registration processing from Non-3GPP Access in PLMN1 to 3GPP Access in PLMN2 when an active connection exists in PLMN2 will be described below with reference to FIG. 50.

Figure 43:
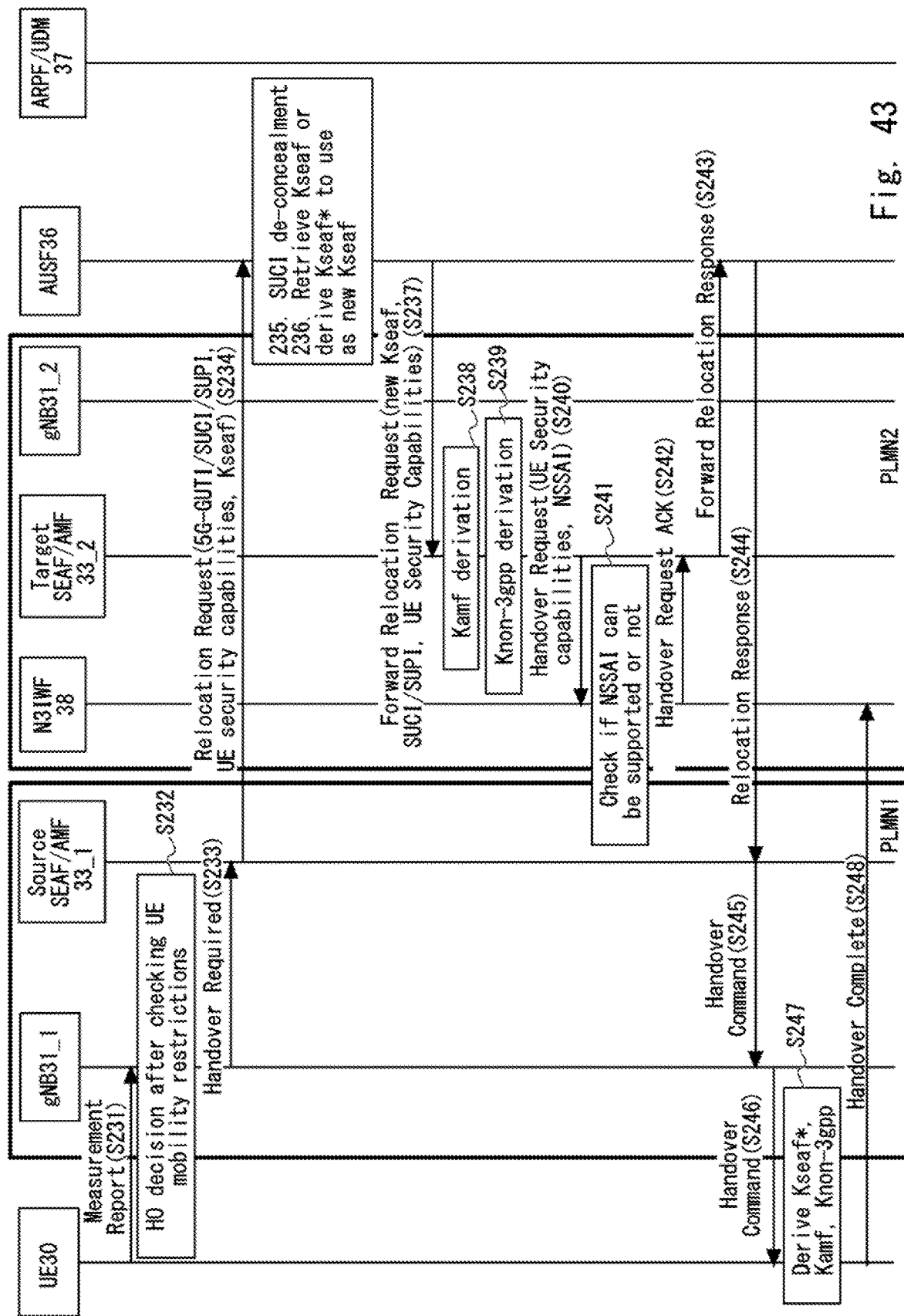
FIG. 43 is a diagram showing a flow of handover processing according to the third example embodiment.

Steps S331 to S348 are the same as steps S231 to S248 in FIG. 43, and thus the detailed description thereof will not be presented. However, the gNB 31_1 and the gNB 31_2 in FIG. 43 are replaced with an N3IWF 38_1 and an N3IWF 38_2 in FIG. 50. Further, the N3IWF 38 in FIG. 43 is replaced with a gNB 31 in FIG. 50. Unlike step S239 in FIG. 43, the Target AMF 33_2 derives a security key KgNB in step S339.

Figure 51:
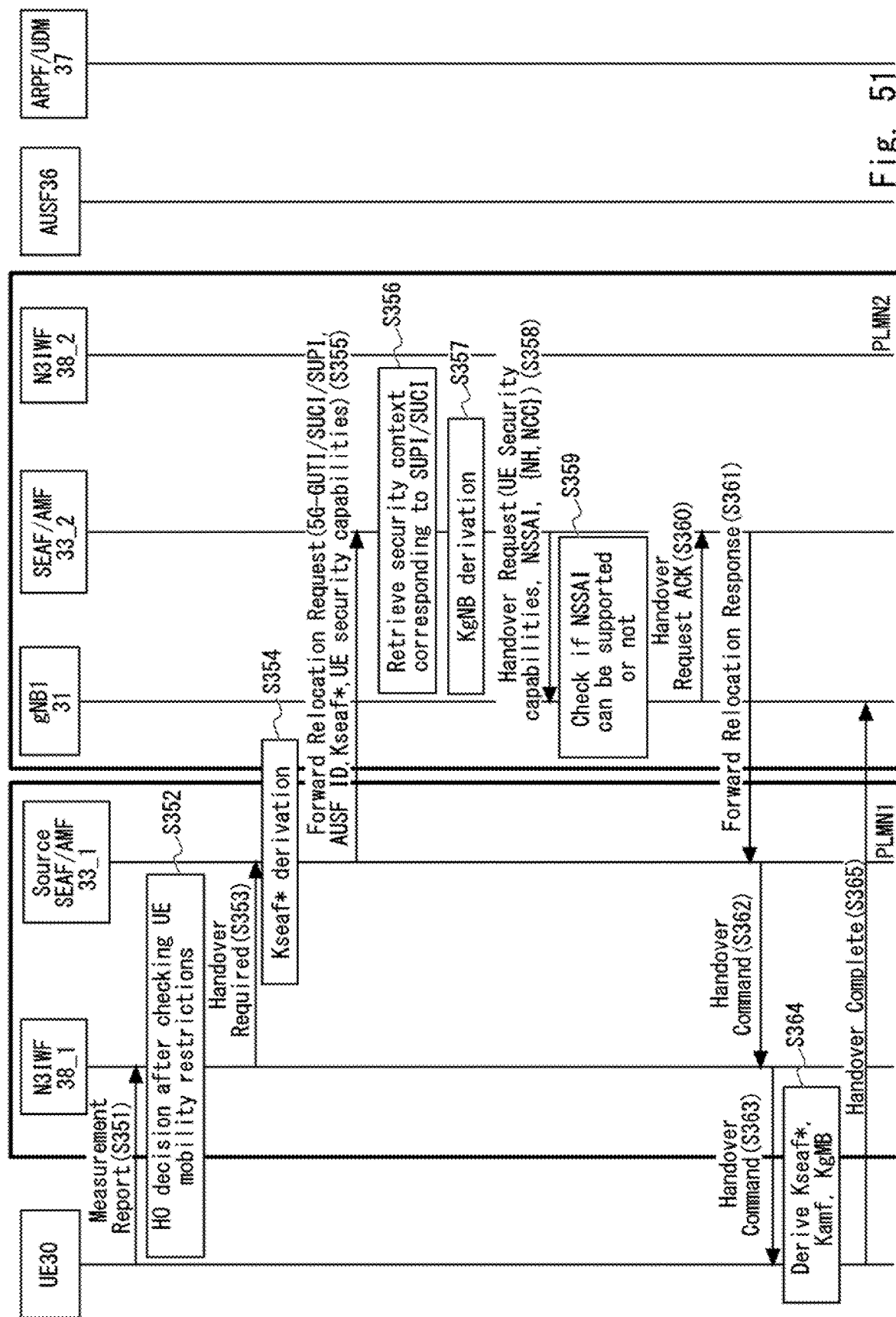
FIG. 51 is a diagram showing a flow of handover processing according to the third example embodiment.

A flow of registration processing from Non-3GPP Access in PLMN1 to 3GPP Access in PLMN2 when an active connection exists in PLMN2 will be described below with reference to FIG. 51, the flow of registration processing being different from that in FIG. 50.

Figure 44:
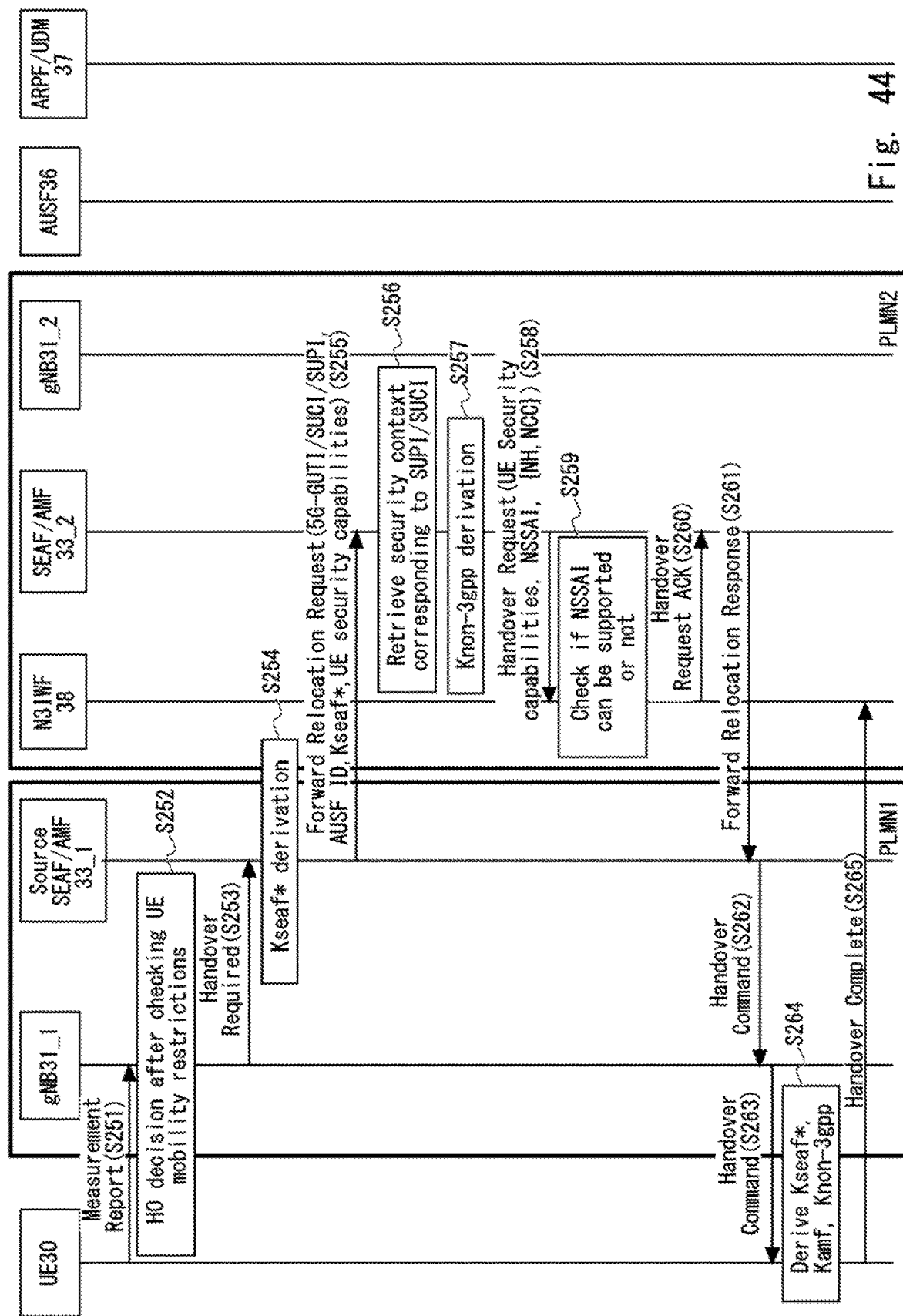
FIG. 44 is a diagram showing a flow of handover processing according to the third example embodiment.

Steps S351 to S365 are the same as steps S251 to S265 in FIG. 44, and thus the detailed description thereof will not be presented. However, the gNB 31_1 and the gNB 31_2 in FIG. 44 are replaced with an N3IWF 38_1 and an N3IWF 38_2 in FIG. 51. Further, the N3IWF 38 in FIG. 44 is replaced with a gNB 31 in FIG. 51. Unlike step S257 in FIG. 44, the Target AMF 33_2 derives a security key KgNB in step S357.

As described above, it is possible to execute the handover between different PLMNs by execution of the authentication processing according to the third example embodiment.

(Fourth Example Embodiment)

Figure 52:
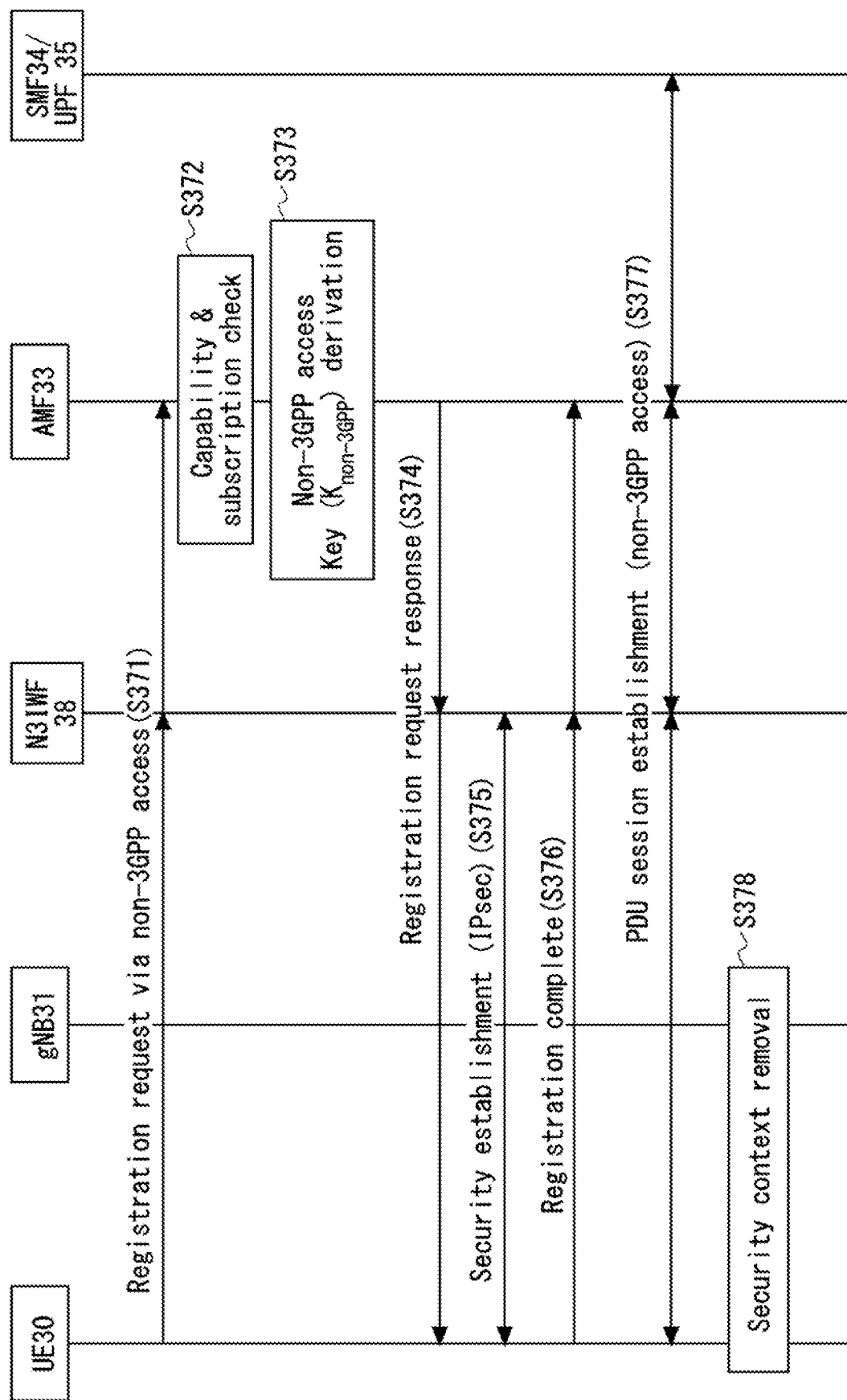
FIG. 52 is a diagram showing a flow of handover processing according to the third example embodiment.

A flow of processing of UE initiated HO intra PLMN, intra AMF from 3GPP to non-3GPP Access will be described below with reference to FIG. 52.

First, a UE 30 transmits a Registration request via non-3GPP access to an AMF 33 via an N3IWF 38 (S371). The AMF 33 is also an AMF to which the UE 30 is connected via a 3GPP access. The Registration request via non-3GPP access includes UE's identity and UE's capabilities such as GUTI.

A description will be given below with respect to a case where NAS security keys used in the 3GPP access are different from NAS security keys used in the Non-3GPP access. In this case, the Registration request via non-3GPP access is protected by the NAS security keys used in the Non-3GPP access. The NAS security keys has already been derived in the UE 30 and the AMF 33.

In some cases, the NAS security keys used in the 3GPP access are the same as the NAS security keys used in the Non-3GPP access. In this case, the Registration request via non-3GPP access is protected by the NAS security keys already used in the 3GPP access.

Next, the AMF 33 checks whether the UE's capabilities including security capabilities are valid and further checks whether the UE 30 has a right to access the core network via the N3IWF 38 (S372). The AMF 33 may request the AUSF 36 for information on the UE's capabilities and the access right.

Next, the AMF 33 derives a security key Knon-3gpp used in the Non-3GPP access (S373).

Next, the AMF 33 transmits a Registration request response to the UE 30 via the N3IWF 38 (S374). The Registration request response includes a security key Knon-3gpp, security key identification information such as KSI (Key Set Identifier), information indicating whether security configurations for encryption and integrity protection are necessary, and an algorithm to be used.

Next, an IPsec is established between the UE 30 and the N3IWF 38 using a security key Knon-3gpp (S375). The UE 30 derives the security key Knon-3gpp from a security key KAMF. Further, the UE 30 transmits a Registration complete to the AMF 33 via the N3IWF 38 (S376). Next, a PDU session for Non-3GPP access is established between the UE 30 and the UPF 35 (S377). Security is established between the UE 30 and the N3IWF 38 by using the IPsec established using the security key Knon-3gpp.

Next, a Security context including a security key used between the UE 30 and gNB 31 is removed (S378). The UE 30 or the AMF 33 may transmit a request message to the gNB 31 so as to remove the Security context.

Figure 53:
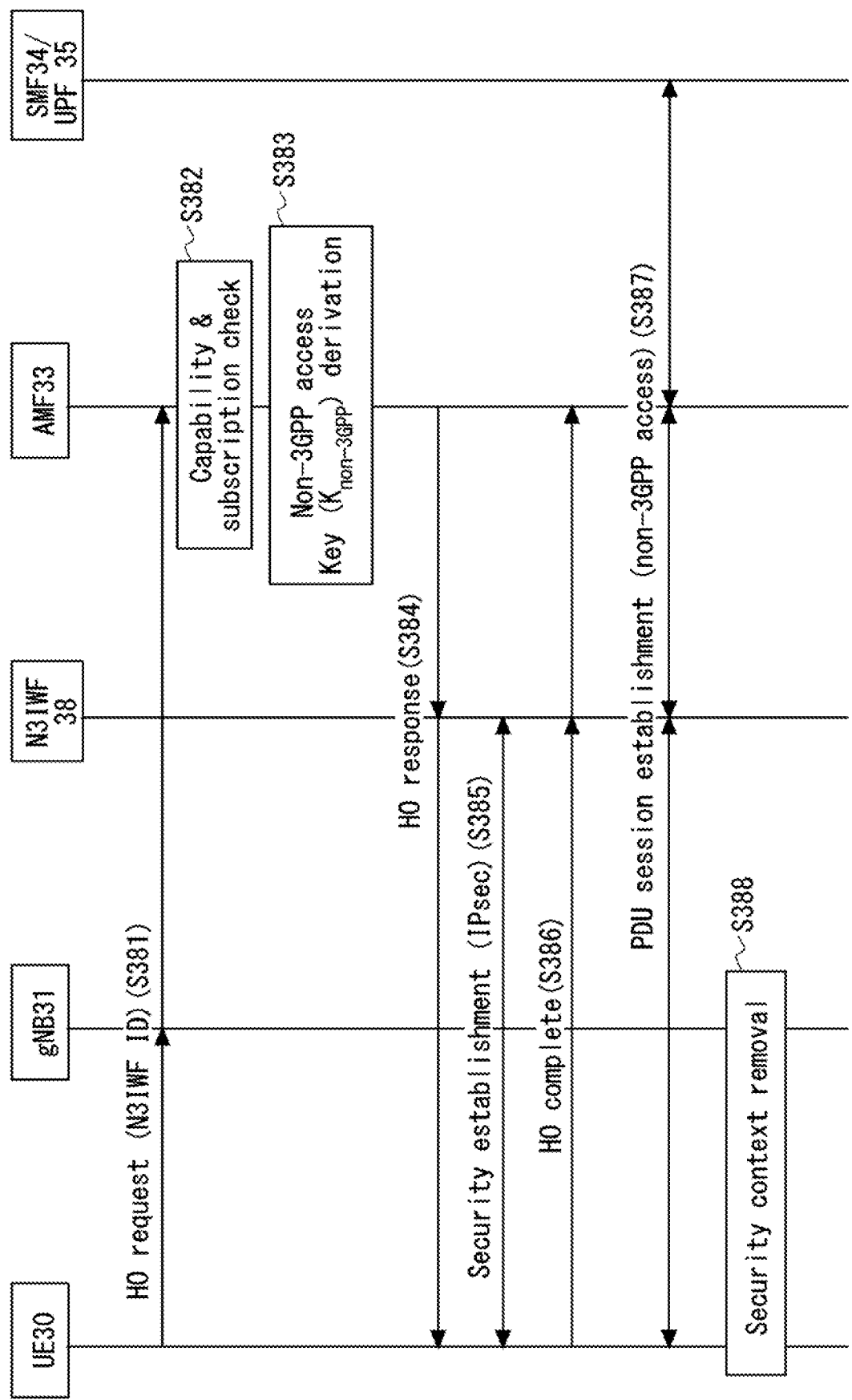
FIG. 53 is a diagram showing a flow of handover processing according to a fourth example embodiment.

A flow of processing of UE initiated HO intra PLMN, intra AMF from 3GPP to non-3GPP Access will be described below with reference to FIG. 53, the flow of processing being different from that in FIG. 52.

First, the UE 30 transmits a HO request to the AMF 33 via the gNB 31 (S381). The HO request includes an N3IWF ID. Steps S382 to S388 are the same as steps S372 to S378 in FIG. 52, and thus the detailed description thereof will not be presented. However, the HO response is transmitted in step S384, instead of the Registration request response in step S374 of FIG. 52. In step S386, a HO complete is transmitted instead of the Registration complete in step S376 of FIG. 52.

Figure 54:
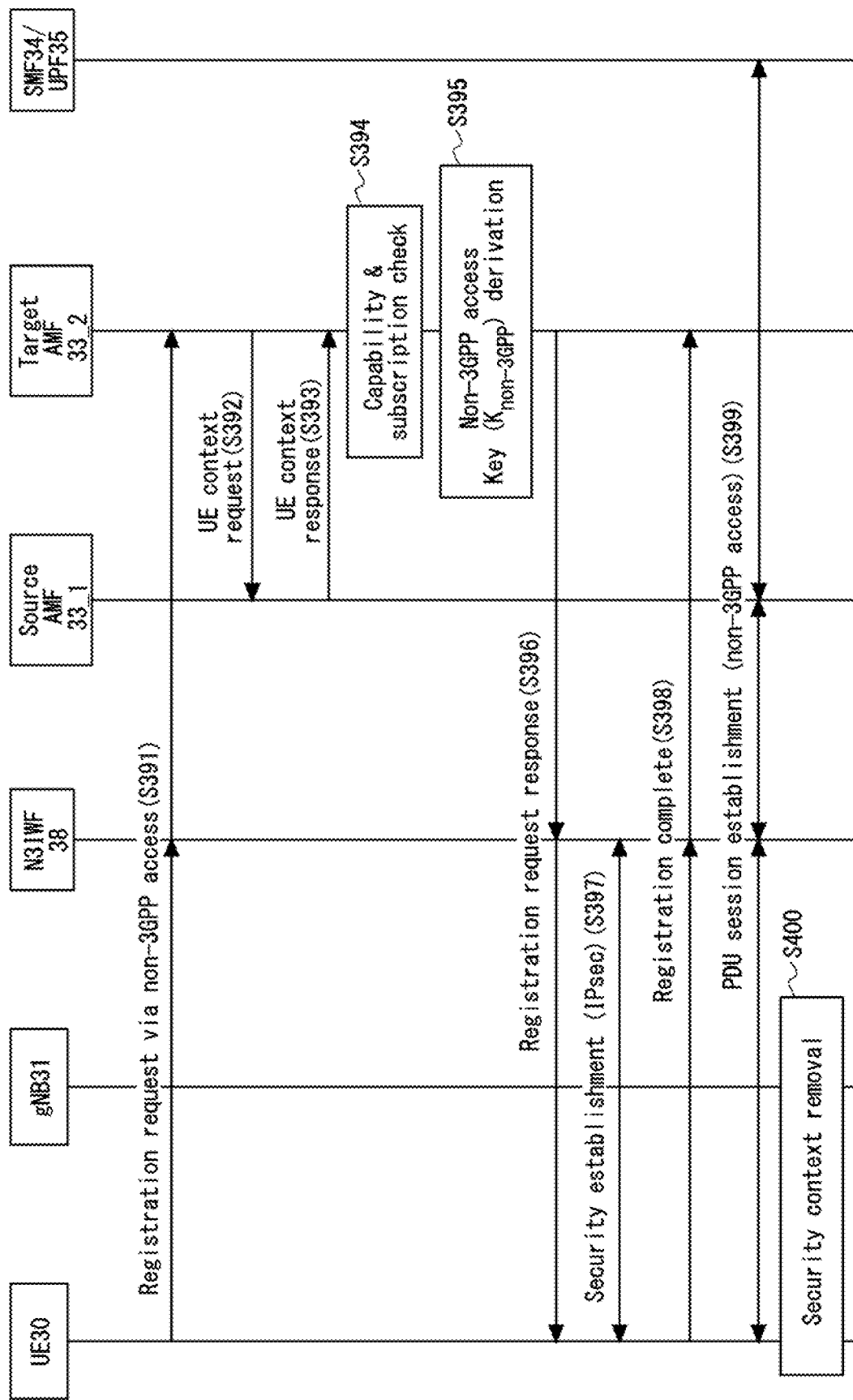
FIG. 54 is a diagram showing a flow of handover processing according to the fourth example embodiment.

A flow of processing of UE initiated HO intra PLMN, inter AMF from 3GPP to non-3GPP Access will be described below with reference to FIG. 54.

First, the UE 30 transmits a Registration request via non-3GPP access to the Target AMF 33_2 via the N3IWF 38 (S391). Next, the Target AMF 33_2 transmits a UE context request to the Source AMF 33_1 (S392). Next, the Source AMF 33_1 transmits a UE context response including UE's security capabilities related to the UE 30 to the Target AMF 33_2 (S393). Steps S394 to S400 are the same as steps S372 to S378 in FIG. 52, and thus the detailed description thereof will not be presented.

Figure 55:
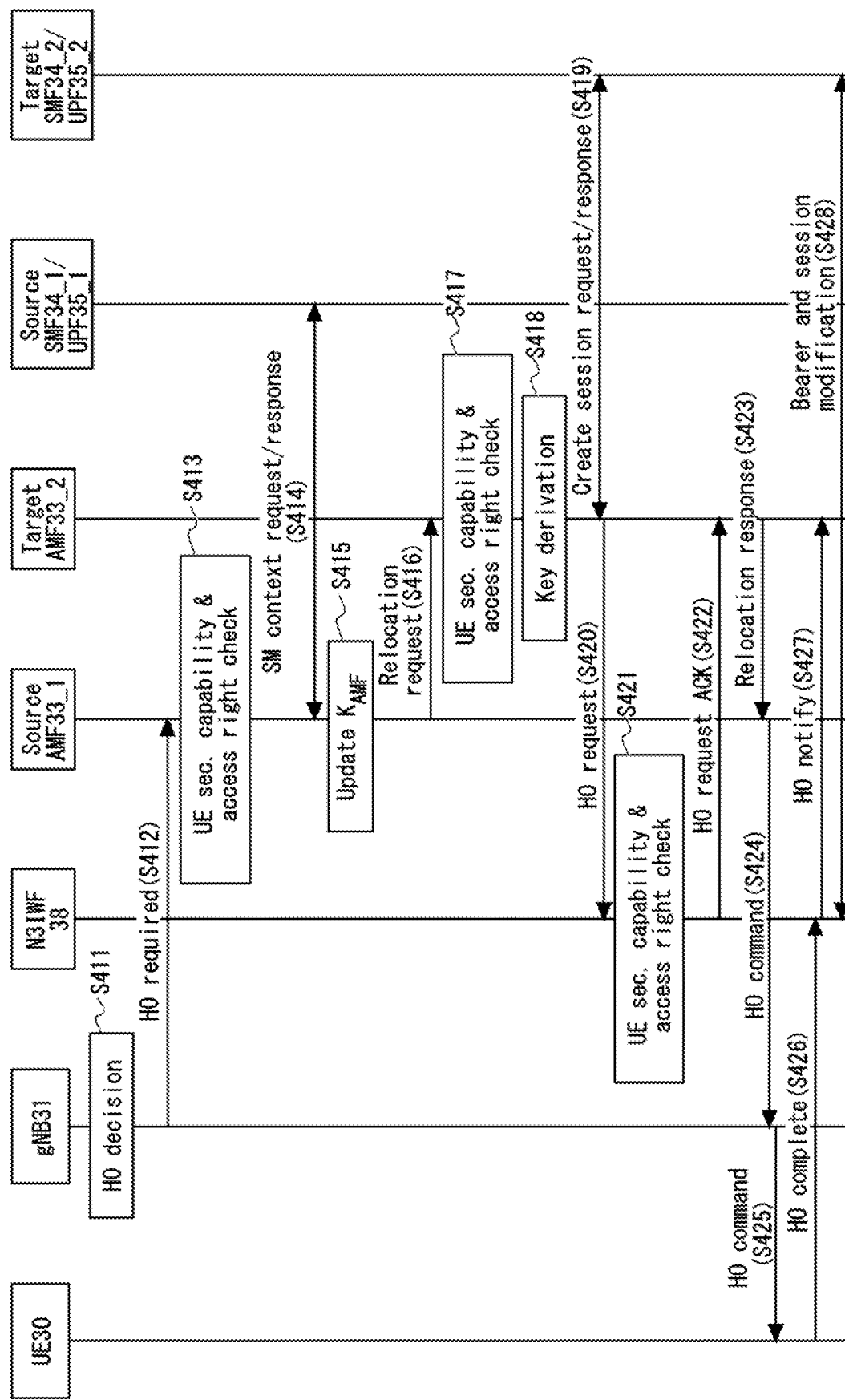
FIG. 55 is a diagram showing a flow of handover processing according to the fourth example embodiment.

A flow of processing of Network initiated HO intra PLMN, inter AMF, from 3GPP to non-3GPP access will be described below with reference to FIG. 55. Steps S411 to S414 are the same as steps S151 to S154 in FIG. 37, and thus the detailed description thereof will not be presented.

Next, the Source AMF 33_1 updates the security key KAMF (S415). Next, the Source AMF 33_1 transmits a Relocation request to the Target AMF 33_2 (S416). Then, the Target AMF 33_2 checks whether the UE's capabilities related to the UE 30 are valid to determine whether to transmit a HO request (S417). The UE's capabilities include security capabilities and access right to the N3IWF 38. Next, the Target AMF 33_2 derives a security key (S418).

Steps S419 to S422 are the same as steps S156 to 159 in FIG. 37, and thus the detailed description thereof will not be presented. Next, the Target AMF 33_2 transmits a Relocation response to the Source AMF 33_1 (S423). Steps S424 to S428 are the same as steps S160 to 164 in FIG. 37, and thus the detailed description thereof will not be presented.

Figure 56:
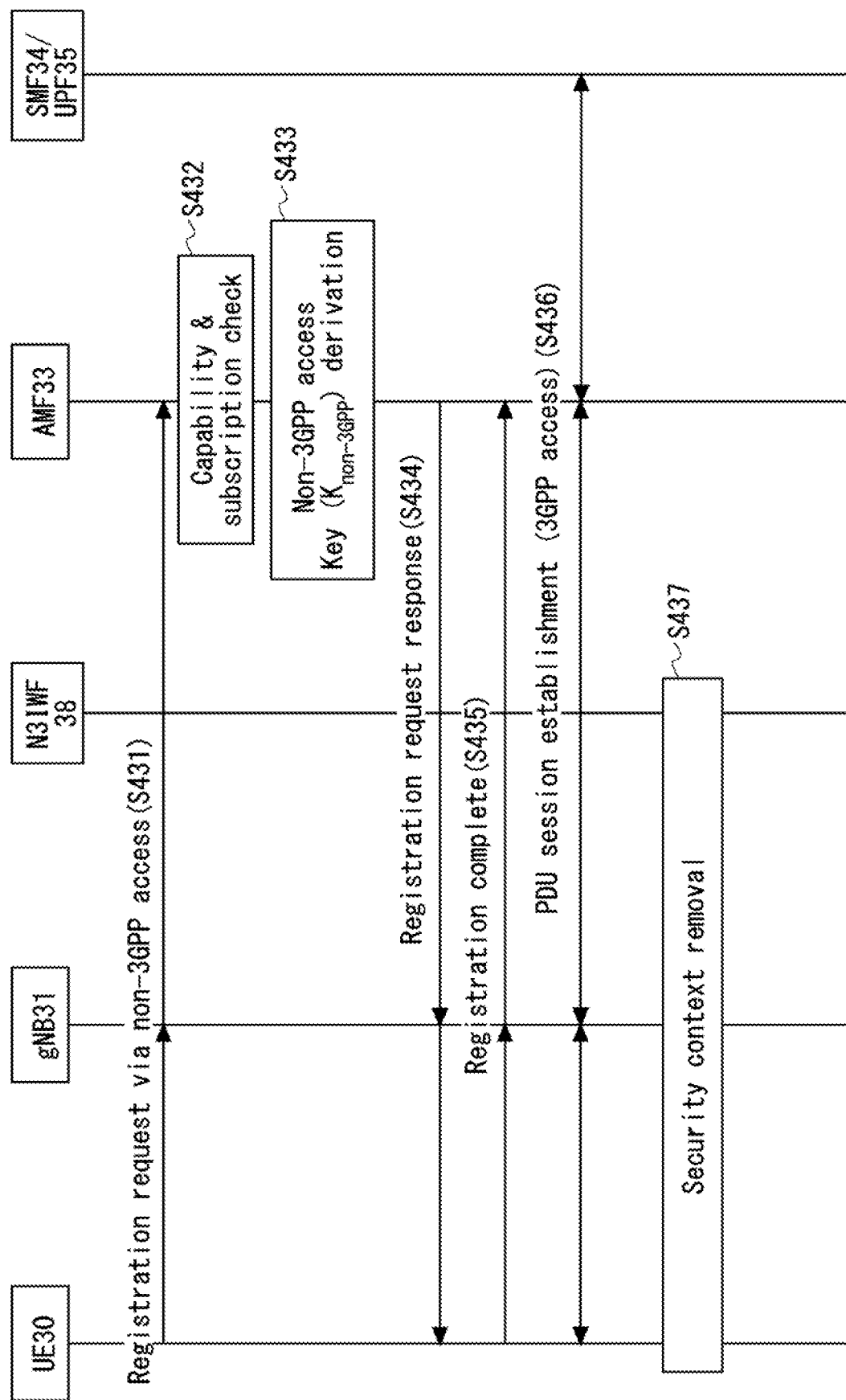
FIG. 56 is a diagram showing a flow of handover processing according to the fourth example embodiment.

A flow of processing of UE initiated HO intra PLMN, intra AMF from non-3GPP to 3GPP access will be described below with reference to FIG. 56. Steps S431 to S437 are the same as steps S391, S394 to S396, and S398 to S400 in FIG. 54, and thus the detailed description thereof will not be presented. However, in FIG. 56, a message between the UE 30 and the AMF 33 is transmitted not through the N3IWF 38 but through the gNB 31. In step S435, the UE 30 derives a security key KgNB from the security key KAMF. Further, security between the UE 30 and the gNB 31 is established.

Figure 57:
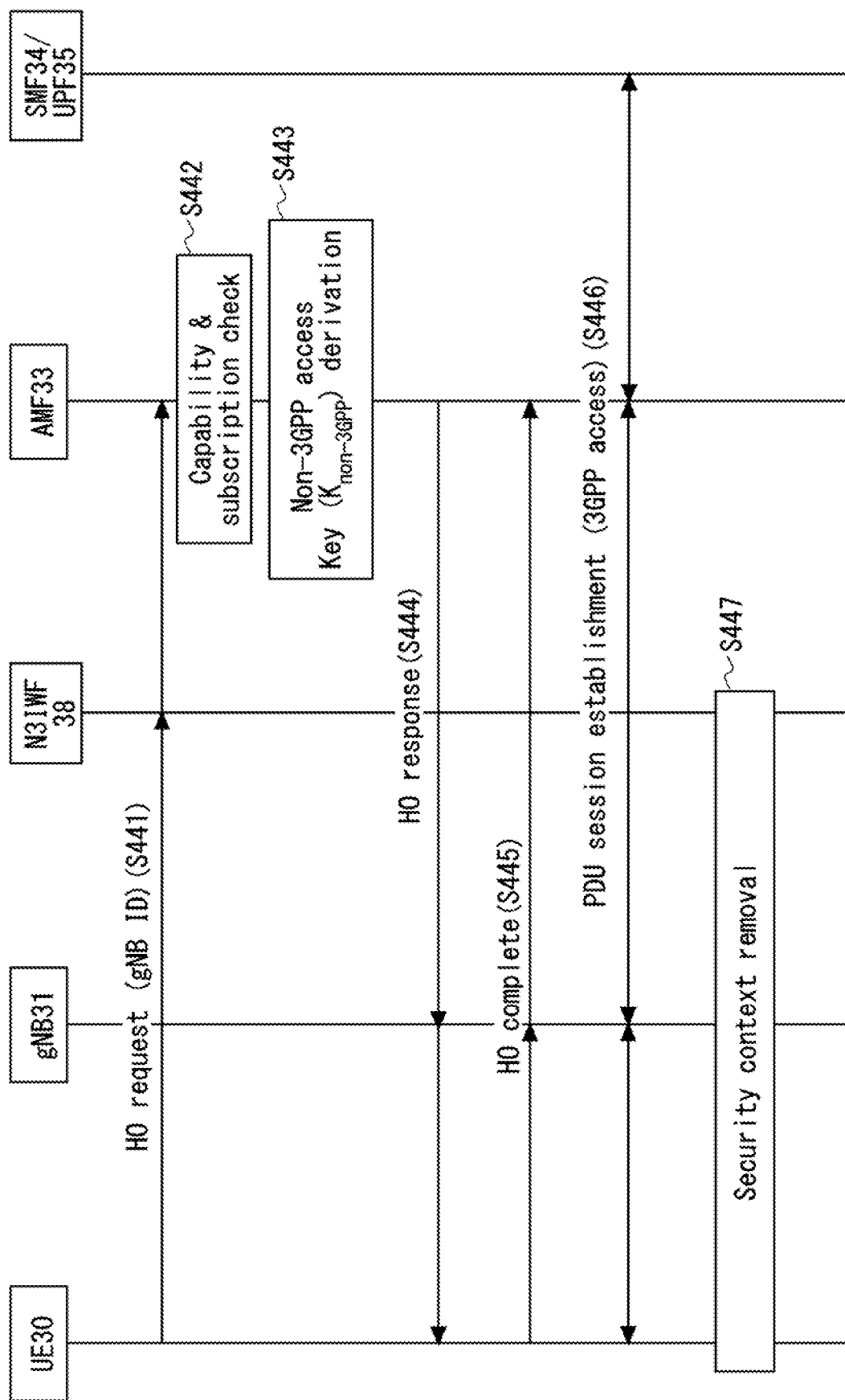
FIG. 57 is a diagram showing a flow of handover processing according to the fourth example embodiment.

A flow of processing of UE initiated HO intra PLMN, intra AMF from non-3GPP to 3GPP access will be described below with reference to FIG. 57, the flow of processing being different from that in FIG. 56. First the UE 30 transmits a HO request to the AMF 33 via the N3IWF 38 (S441). The HO request includes a gNB ID. Steps S442 and S443 are the same as steps S432 and S433 in FIG. 56, and thus the detailed description thereof will not be presented.

Next, the AMF 33 transmits a HO response to the UE 30 via the gNB 31 (S444). Next, the UE 30 transmits a HO complete to the AMF 33 via the gNB 31 (S445). Steps S446 and S447 are the same as steps S436 and S437 in FIG. 56, and thus the detailed description thereof will not be presented.

Figure 58:
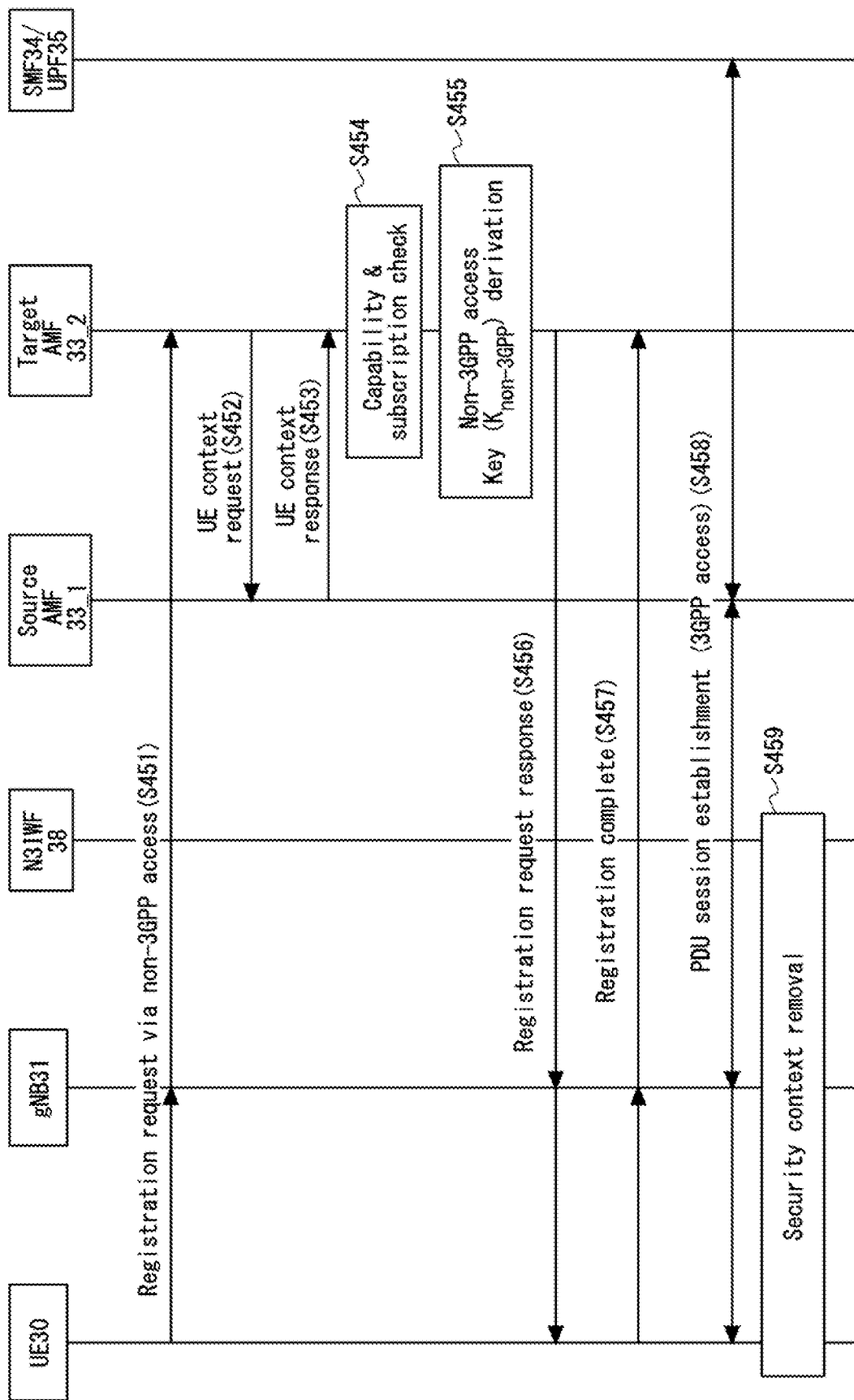
FIG. 58 is a diagram showing a flow of handover processing according to the fourth example embodiment.

A flow of processing of UE initiated HO intra PLMN, intra AMF from non-3GPP to 3GPP access will be described below with reference to FIG. 58. Steps S451 to S459 are the same as the processes executed in FIG. 54 except that the process of step S397 is omitted, and thus the detailed description thereof will not be presented.

Figure 59:
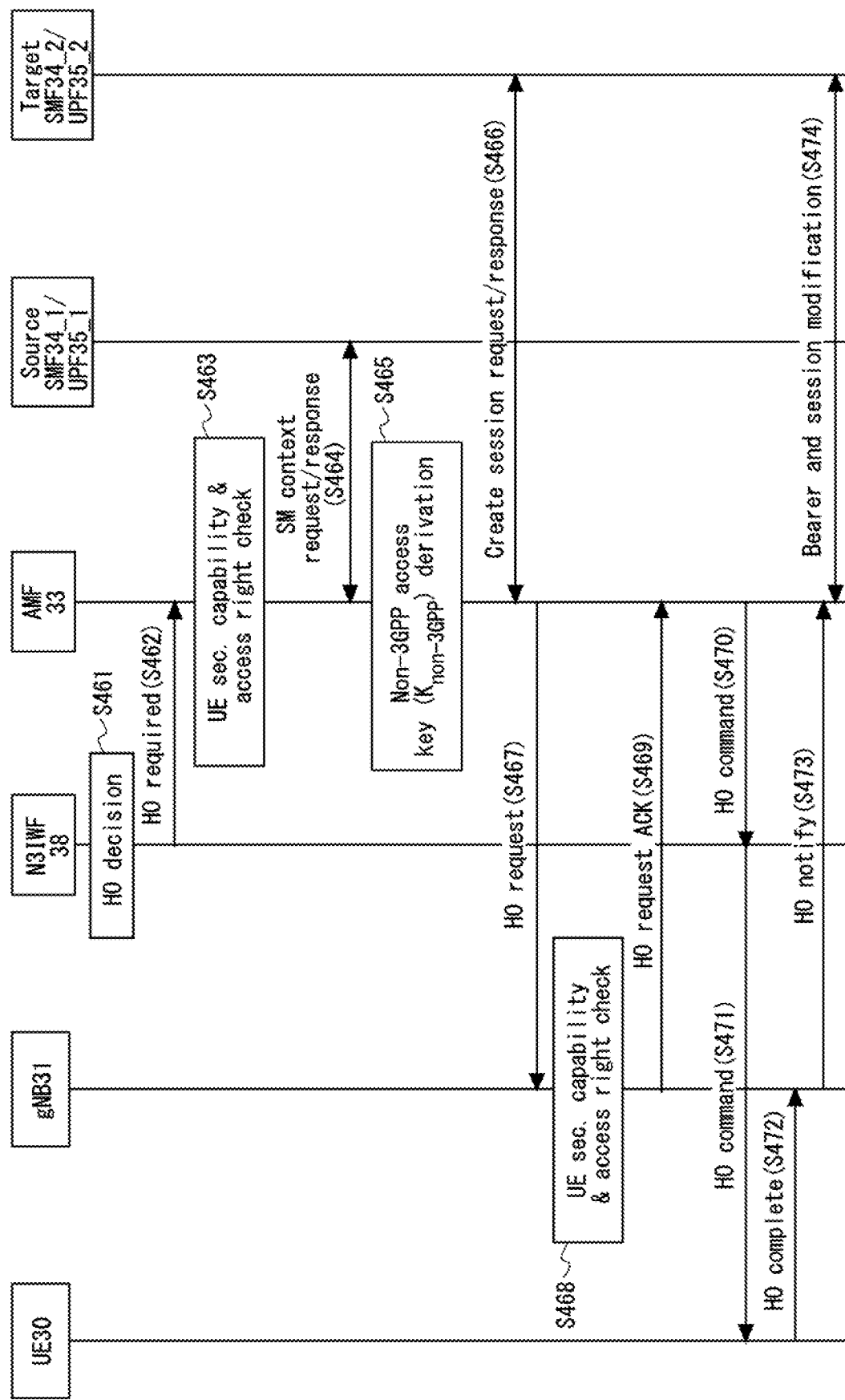
FIG. 59 is a diagram showing a flow of handover processing according to the fourth example embodiment.

A flow of processing of Network Initiated HO intra PLMN, intra AMF from non-3GPP to 3GPP access will be described below with reference to FIG. 59. Steps S461 to S474 are the same as steps S151 to S164 in FIG. 37, and thus the detailed description thereof will not be presented. The AMF 33 derives the security key KgNB in step S155, but derives a security key Knon-3gpp in step S465.

Figure 60:
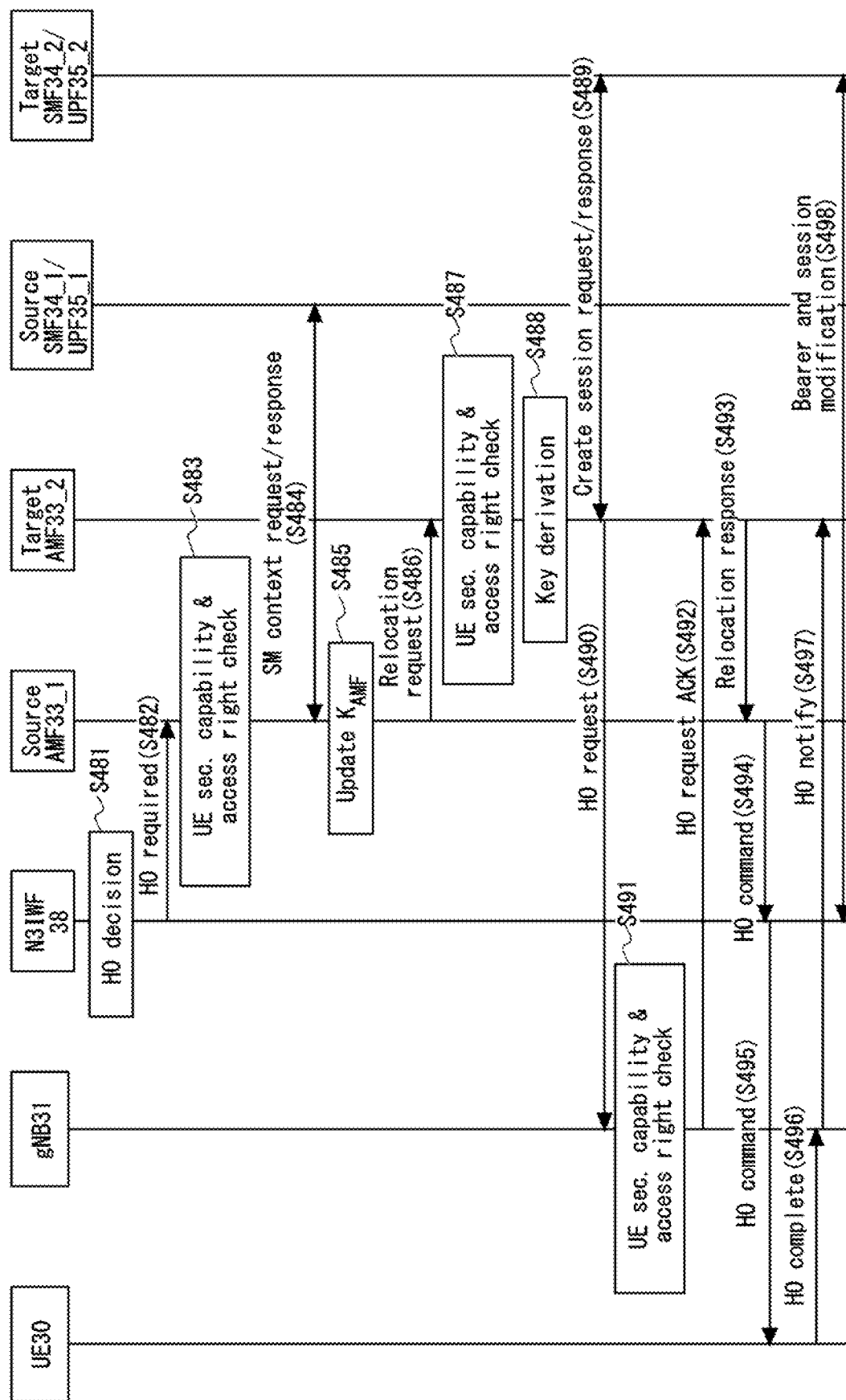
FIG. 60 is a diagram showing a flow of handover processing according to the fourth example embodiment.

A flow of processing of Network Initiated HO intra PLMN, intra AMF from non-3GPP to 3GPP access will be described below with reference to FIG. 60. In FIG. 60, the process executed in the gNB 31 and the process executed in the N3IWF 38 in FIG. 55 are replaced by each other. Other processes are the same as those in FIG. 55, and the detailed description thereof will not be presented.

As described above, according to the fourth example embodiment, it is possible to execute the handover between the PLMNs.

A configuration of the communication terminal 10 and the core network device 20 described in the above-described example embodiment will be described below.

Figure 61:
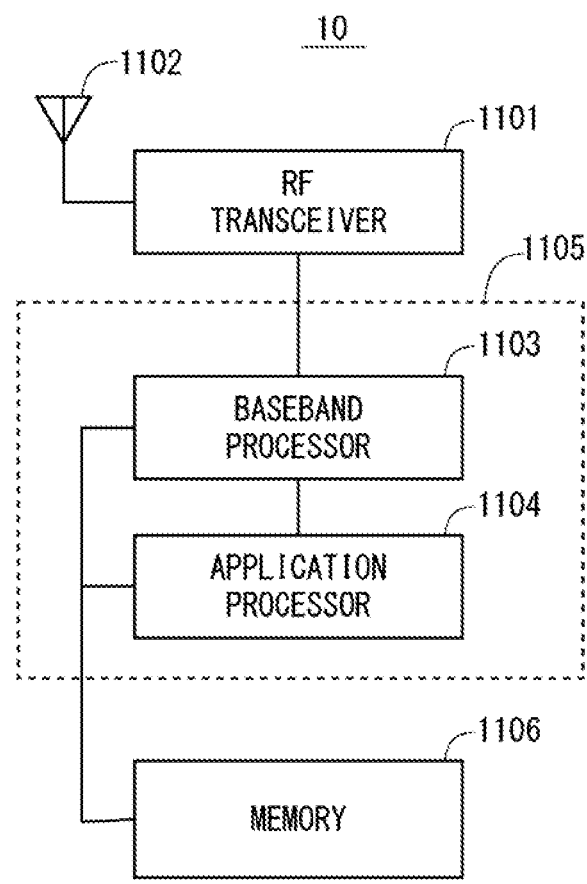
FIG. 61 is a configuration diagram of a communication terminal according to each of the embodiments.

FIG. 61 is a block diagram showing a configuration example of the communication terminal 10. A Radio Frequency (RF) transceiver 1101 performs analog RF signal processing to communicate with an AN 50. The analog RF signal processing performed by the RF transceiver 1101 includes frequency up-conversion, frequency down-conversion, and amplification. The RF transceiver 1101 is coupled to an antenna 1102 and a baseband processor 1103. In other words, the RF transceiver 1101 receives modulated symbol data from the baseband processor 1103, generates a transmission RF signal, and supplies the transmission RF signal to the antenna 1102. The modulated symbol data may be OFDM (Orthogonal Frequency Division Multiplexing) symbol data. Further, the RF transceiver 1101 generates a baseband reception signal based on a reception RF signal received by the antenna 1102, and supplies the baseband reception signal to the baseband processor 1103.

The baseband processor 1103 performs digital baseband signal processing (data plane processing) and control plane processing for radio communication. The digital baseband signal processing includes (a) data compression/decompression, (b) data segmentation/concatenation, and (c) composition/decomposition of a transmission format (transmission frame). The digital baseband signal processing further includes (d) channel coding/decoding and (e) modulation (symbol mapping)/demodulation. The digital baseband signal processing further includes (f) generation of OFDM symbol data (baseband OFDM signal) by Inverse Fast Fourier Transform (IFFT). On the other hand, the control plane processing includes communication management of layer 1, layer 2, and layer 3. The layer 1 is, for example, transmission power control. The layer 2 is, for example, radio resource management and hybrid automatic repeat request (HARQ) processing. The layer 3 is, for example, signaling relating to attach, mobility, and call management.

For example, in the case of LTE and LTE-Advanced, the digital baseband signal processing performed by the baseband processor 1103 may include signal processing of a Packet Data Convergence Protocol (PDCP) layer, a Radio Link Control (RLC) layer, a MAC layer, and a PHY layer. Further, the control plane processing performed by the baseband processor 1103 may include processing of a Non-Access Stratum (NAS) protocol, an RRC protocol, and MAC CE.

The baseband processor 1103 may include a modem processor that performs the digital baseband signal processing and a protocol stack processor that performs the control plane processing. The modem processor is, for example, a Digital Signal Processor (DSP)). The protocol stack processor, which performs the control plane processing, is a Central Processing Unit (CPU) or a Micro Processing Unit (MPU), for example. In this case, the protocol stack processor, which performs control plane processing, may be shared with an application processor 1104 described below.

The application processor 1104 is also referred to as a CPU, an MPU, a microprocessor, or a processor core. The application processor 1104 may include a plurality of processors (a plurality of processor cores). The application processor 1104 realizes various functions of the communication terminal 10 by executing a system software program and various application programs read from a memory 1106 or a memory (not shown). The system software program may be, for example, an Operating System (OS). The application programs may be, for example, a voice call application, a WEB browser, a mailer, a camera operation application, and a music player application.

In some implementations, as indicated by a dashed line (1105) in FIG. 61, the baseband processor 1103 and the application processor 1104 may be integrated on a single chip. In other words, the baseband processor 1103 and the application processor 1104 may be implemented as a single System on Chip (SoC) device 1105. The SoC device may be referred to as a system Large Scale Integration (LSI) or a chipset.

The memory 1106 is a volatile memory, a non-volatile memory, or a combination thereof. The memory 1106 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1106 may include, for example, an external memory device that can be accessed from the baseband processor 1103, the application processor 1104, and the SoC 1105. The memory 1106 may include a built-in memory device that is integrated in the baseband processor 1103, the application processor 1104, or the SoC 1105. Further, the memory 1106 may include a memory in a Universal Integrated Circuit Card (UICC).

The memory 1106 may store software modules (computer programs) including instructions and data for performing the processing by the communication terminal 10 described in the aforementioned embodiments. In some implementations, the baseband processor 1103 or the application processor 1104 may be configured to read the software modules from the memory 1106 and execute these software modules, thereby performing the processing of the communication terminal 10 described in the embodiments.

Figure 62:
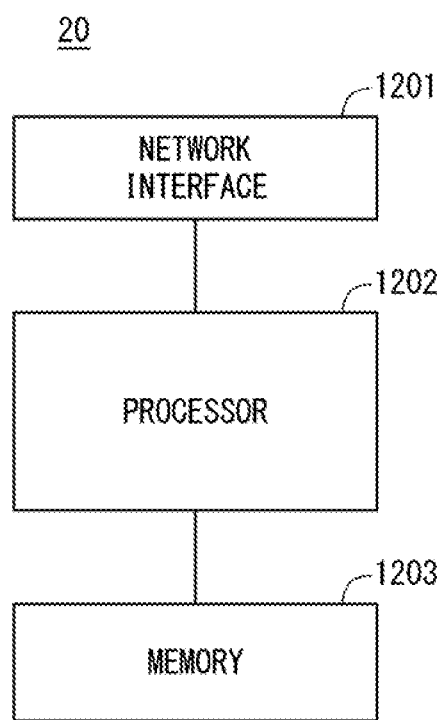
FIG. 62 is a configuration diagram of a core network device according to each of the embodiments.

FIG. 62 is a block diagram showing a configuration example of the core network device 20. Referring to FIG. 62, the core network device 20 includes a network interface 1201, a processor 1202, and a memory 1203. The network interface 1201 is used to communicate with network nodes (for example, AN 50 and SMF 30). The network interface 1201 may include, for example, a network interface card (NIC) conforming to the IEEE (Institute of Electrical and Electronics Engineers) 802.3 series.

The processor 1202 reads the software (computer program) from the memory 1203 and executes the software to perform the processing of the AMF 20 described using the procedure diagram and the flowchart in the above example embodiments. The processor 1202 may be, for example, a microprocessor, an MPU, or a CPU. The processor 1202 may include multiple processors.

The memory 1203 is configured by a combination of a volatile memory and a non-volatile memory. The memory 1203 may include a storage located away from the processor 1202. In this case, the processor 1202 may access the memory 1203 via an I/O interface (not shown).

In the example of FIG. 62, the memory 1203 is used to store a software module group. The processor 1202 can perform the processing of the AMF 20 described in the above example embodiments by reading the software module group from the memory 1203 and executing the read software module group.

As described above with reference to FIGS. 61 to 62, each of the processors included in the communication terminal 10 and the core network device 20 according to the above-described example embodiments executes one or more programs including a group of instructions to cause a computer to perform the algorithm described with reference to the drawings. The program can be stored and provided to a computer using various types of non-transitory computer readable media. Non-transitory computer readable media include various types of tangible storage media. Examples of non-transitory computer readable media include magnetic storage media, optical magnetic storage media (for example, magneto-optical disks), Compact Disc Read Only Memory (CD-ROM), CD-R, CD-R/W, and semiconductor memories. The magnetic storage media may be flexible disks, magnetic tapes, or hard disk drives. The semiconductor memories may be, for example, mask ROM, Programmable ROM (PROM), Erasable PROM (EPROM), flash ROM, and Random Access Memory (RAM)). The program may be provided to a computer using various types of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

Note that the present disclosure is not limited to the above-described example embodiments and may be changed as appropriate without departing from the spirit of the present disclosure. The present disclosure may be implemented by combination of the embodiments as appropriate.

While the application invention has been described above with reference to the embodiments, the application invention is not limited to the embodiments. Various changes that may be understood by those skilled in the art within the scope of the invention may be made to the configurations and details of the application invention.

Some or all of the above-described example embodiments may be described as in the following supplementary notes, but are not limited thereto.

(Supplementary Note 1)

A communication terminal including: a communication unit configured to communicate with gateway devices disposed in a preceding stage of a core network device via an Untrusted Non-3GPP Access; and a key derivation unit configured to derive a second security key used for security processing of a message transmitted using a defined protocol with the gateway device, from a first security key used for security processing of a message transmitted using a defined protocol with the core network.

(Supplementary Note 2)

The communication terminal according to Supplementary Note 1, wherein the communication unit communicates with a first gateway device disposed in a preceding state of the core network device via the Untrusted Non-3GPP Access, and communicates with a second gateway device disposed in a preceding stage of the core network device via the Untrusted Non-3GPP Access or an Untrusted Non-3GPP Access different from the Untrusted Non-3GPP Access, and the key derivation unit derives the second security key different for each of the gateway devices.

(Supplementary Note 3)

The communication terminal according to Supplementary Note 1 or 2, wherein the key derivation unit derives the second security key using identification information of an access network.

(Supplementary Note 4)

The communication terminal according to any one of Supplementary Notes 1 to 3, wherein the key derivation unit derives, from the first security key, a third security key used for security processing of a NAS message transmitted between the key derivation unit and the core network device via the Untrusted Non-3GPP Access and the gateway device.

(Supplementary Note 5)

The communication terminal according to Supplementary Note 4, wherein the communication unit communicates with a first gateway device disposed in a preceding state of the core network device via the Untrusted Non-3GPP Access, and communicates with a second gateway device disposed in a preceding stage of the core network device via the Untrusted Non-3GPP Access or an Untrusted Non-3GPP Access different from the Untrusted Non-3GPP Access, and the key derivation unit derives the third security key different for each of the gateway devices.

(Supplementary Note 6)

The communication terminal according to Supplementary Note 4 or 5, wherein the key derivation unit derives the third security key using identification information of an access network.

(Supplementary Note 7)

A core network device including:

a communication unit configured to communicate with a communication terminal via gateway devices disposed in a preceding stage of a core network device and an Untrusted Non-3GPP Access; and a key derivation unit configured to derive a second security key used for security processing of a message transmitted using a protocol defined between the communication terminal and the gateway device, from a first security key used for security processing of a message transmitted using a defined protocol with the communication terminal.

(Supplementary Note 8)

The core network device according to Supplementary Note 7, wherein the communication unit communicates with the communication terminal via a first gateway device and the Untrusted Non-3GPP Access, and further communicates with the communication terminal via a second gateway device and the Untrusted Non-3GPP Access or an Untrusted Non-3GPP Access different from the Untrusted Non-3GPP Access, and the key derivation unit derives the second security key different for each of the gateway devices.

(Supplementary Note 9)

The core network device according to Supplementary Note 7 or 8, wherein the key derivation unit derives the second security key using identification information of an access network.

(Supplementary Note 10)

The core network device according to any one of Supplementary Notes 7 to 9, wherein the key derivation unit derives, from the first security key, a third security key used for security processing of a NAS message transmitted between the key derivation unit and the communication terminal via the Untrusted Non-3GPP Access and the gateway device.

(Supplementary Note 11)

The core network device according to Supplementary Note 10, wherein the communication unit communicates with the communication terminal via the first gateway device and the Untrusted Non-3GPP Access, and further communicates with the communication terminal via the second gateway device and the Untrusted Non-3GPP Access or an Untrusted Non-3GPP Access different from the Untrusted Non-3GPP Access, and the key derivation unit derives the third security key different for each of the gateway devices.

(Supplementary Note 12)

The core network device according to Supplementary Note 10 or 11, wherein the key derivation unit derives the third security key using identification information of an access network.

(Supplementary Note 13)

A key deriving method including:

communicating with gateway devices disposed in a preceding stage of a core network device via an Untrusted Non-3GPP Access; and deriving a second security key used for security processing of a message transmitted using a defined protocol with the gateway device, from a first security key used for security processing of a message transmitted using a defined protocol with the core network device.

(Supplementary Note 14)

A key deriving method including:

communicating with a communication terminal via gateway devices disposed in a preceding stage of a core network device and an Untrusted Non-3GPP Access; and deriving a second security key used for security processing of a message transmitted using a protocol defined between the communication terminal and the gateway device, from a first security key used for security processing of a message transmitted using a defined protocol with the communication terminal.

(Supplementary Note 15)

A communication terminal including:

a communication unit configured to access a network node via a first type access and a second type access; and a control unit configured to establish a first NAS connection for the first type access and a second NAS connection for the second type access with the network node in a network, wherein a parameter specific to each of the NAS connections is used to achieve independent NAS security, and the parameter includes a value associated with a unique NAS connection identifier for the first type access and the second type access.

(Supplementary Note 16)

A core network node including:

a registration unit configured to register a communication terminal via a first type access and a second type access;

a communication unit configured to have a first NAS connection for the first type access and a second NAS connection for the second type access;

a control unit configured to trigger NAS SMC (Security Mode Command) processing via the second type access; and a transmission unit configured to transmit a message including an indicator to the communication terminal during the NAS SMC processing.

(Supplementary Note 17)

A communication terminal including:

a key derivation unit configured to derive EMSK (Extended Master Session Key) during EAP-TLS (Extended Master Session Key) authentication processing; and a control unit configured to use the EMSK so as to derive a security key.

(Supplementary Note 18)

A core network node including:

an acquisition unit configured to acquire EMSK (Extended Master Session Key) during EAP-TLS (Extended Master Session Key) authentication processing; and a control unit configured to use the EMSK so as to derive a security key.

(Supplementary Note 19)

A communication terminal including:

a communication unit configured to access a first network node via a first type access and access a second network node via a second type access;

a connection establishing unit configured to establish a first NAS connection for the first type access and a second NAS connection for the second type access with the first and second network nodes; and a control unit configured to use different security contexts for each of the network nodes and establish individually the respective security contexts.

(Supplementary Note 20)

The communication terminal according to Supplementary Note 19, wherein the first and second network nodes belong to different networks.

(Supplementary Note 21)

The communication terminal according to Supplementary Note 15 or 19, wherein the first type access is 3GPP access, and the second type access is non-3GPP access.

(Supplementary Note 22)

A communication terminal including:

a communication unit configured to transmit a registration request message to a network node; and a key derivation unit configured to derive a security key using a parameter related to an access type after the registration request message is transmitted.

(Supplementary Note 23)

The communication terminal according to Supplementary Note 22, wherein the security key is derived using a KDF (Key Derivation Function) into which the parameter related to the access type is input.

(Supplementary Note 24)

A network node including:

a communication unit configured to receive a registration request message from a communication terminal; and a key derivation unit configured to derive a security key using a parameter related to an access type after the registration request message is received.

(Supplementary Note 25)

The network node according to Supplementary Note 24, wherein the security key is derived using a KDF (Key Derivation Function) into which the parameter related to the access type is input.

10: communication terminal
11: communication unit
12: key derivation unit
20: core network device
21: communication unit
22: key derivation unit
30: UE
31: gNB
31_1: gNB
31_2: gNB
32: 3GPP Access
33: AMF
33_1: Source AMF
33_2: Target AMF
34: SMF
34_1: Source SMF
34_2: Target SMF
35: UPF
36: AUSF
37: UDM
38: N3IWF
39: Data Network
40: Untrusted Non-3GPP Access
51: AMF
52: SMF
53: UPF
54: N3IWF
55: Data Network
61: gNB
62: 3GPP Access
63: AMF
64: N3IWF
65: Non-3GPP Access
71: N3IWF
72: Non-3GPP Access
73: AMF

The invention claimed is:

1. A communication terminal comprising:
   at least one processor; and
   at least one memory operatively coupled with the processor, wherein the at least one processor is configured to:
   initiate registration in a network node over 3GPP access and Non-3GPP access; and
   establish a first Non-Access Stratum (NAS) connection for the 3GPP access and a second NAS connection for the Non-3GPP access with the network node in a network,
   wherein the first NAS connection is specified by a first parameter,
   wherein the second NAS connection is specified by a second parameter,
   wherein the first parameter and the second parameter are for NAS security,
   wherein the first parameter is a first fixed value corresponding to the 3GPP access,
   wherein the second parameter is a second fixed value corresponding to the Non-3GPP access, and
   wherein the at least one processor is further configured to:
   derive a first security key using at least the first fixed value;
   derive a second security key using the first security key; and
   protect a Radio Resource Control (RRC) message using the second security key.

2. The communication terminal according to claim 1, wherein the first security key is derived using the first fixed value and a count value for NAS.

3. A method for a communication terminal, the method comprising:
   initiating registration in a network node over 3GPP access and Non-3GPP access; and
   establishing a first Non-Access Stratum (NAS) connection for the 3GPP access and a second NAS connection for the Non-3GPP access with the network node in a network,
   wherein the first NAS connection is specified by a first parameter,
   wherein the second NAS connection is specified by a second parameter,
   wherein the first parameter and the second parameter are for NAS security,
   wherein the first parameter is a first fixed value corresponding to the 3GPP access,
   wherein the second parameter is a second fixed value corresponding to the Non-3GPP access, and
   wherein the method further comprises:
   deriving a first security key using at least the first fixed value;
   deriving a second security key using the first security key; and
   protecting a Radio Resource Control (RRC) message using the second security key.

4. The method according to claim 3, wherein the first security key is derived using the first fixed value and a count value for NAS.

* * * * *